US012600087B2

(12) United States Patent
Sterle et al.

(10) Patent No.: US 12,600,087 B2
(45) Date of Patent: Apr. 14, 2026

(54) PRINT HEAD ASSEMBLY AND METHODS FOR USING THE SAME

(71) Applicant: General Electric Company, Schenectady, NY (US)

(72) Inventors: John Sterle, Clifton Park, NY (US); Vadim Bromberg, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/033,624

(22) PCT Filed: Oct. 25, 2021

(86) PCT No.: PCT/US2021/056451
§ 371 (c)(1),
(2) Date: Apr. 25, 2023

(87) PCT Pub. No.: WO2022/093691
PCT Pub. Date: May 5, 2022

(65) Prior Publication Data
US 2024/0017486 A1    Jan. 18, 2024

Related U.S. Application Data

(60) Provisional application No. 63/107,137, filed on Oct. 29, 2020.

(51) Int. Cl.
*B33Y 30/00* (2015.01)
*B29C 64/165* (2017.01)
(Continued)

(52) U.S. Cl.
CPC .......... *B29C 64/209* (2017.08); *B29C 64/165* (2017.08); *B29C 64/25* (2017.08);
(Continued)

(58) Field of Classification Search
None
See application file for complete search history.

(56) References Cited

U.S. PATENT DOCUMENTS 4,034,219 A    7/1977    Louden et al.
4,404,566 A    9/1983    Clark et al.
(Continued)

FOREIGN PATENT DOCUMENTS

CN    201815393 U    5/2011
CN    103949636 A    7/2014
(Continued)

OTHER PUBLICATIONS

US 9,744,592 B1, 08/2017, Schmitt et al. (withdrawn)
(Continued)

*Primary Examiner* — Mohammad M Ameen
(74) *Attorney, Agent, or Firm* — Dinsmore & Shohl LLP

(57) ABSTRACT

Additive manufacturing assemblies, printing assemblies, and methods for utilizing same are provided. A method includes providing a linear traversing stage (212) movable in a direction transverse to a rail (104) extending along a working axis of the additive manufacturing apparatus, and coupling a printing assembly (150) to the linear traversing stage (212) such that the printing assembly is movable along the linear traversing stage in a direction transverse to the working axis. In embodiments, the printing assembly includes a housing (201) including a printing head (154). At least one adjustment member (232) may be extended or retracted through a yaw bar (224) to rotate the housing. In embodiments, a printing head receptacle (502) may be provided for coupling the printing assembly to the rail. In embodiments, the yaw bar (224) may be provided between
(Continued)

the housing and the printing head receptacle (502) for rotating the printing assembly relative to the printing head receptacle.

5 Claims, 26 Drawing Sheets

(51) Int. Cl.

| | |
|---|---|
| B29C 64/209 | (2017.01) |
| B29C 64/25 | (2017.01) |
| B29C 64/295 | (2017.01) |
| B29C 64/364 | (2017.01) |
| B33Y 10/00 | (2015.01) |
| B33Y 40/00 | (2020.01) |

(52) U.S. Cl.
CPC .......... *B29C 64/295* (2017.08); *B29C 64/364* (2017.08); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 4,680,895 | A | 7/1987 | Roestenberg |
| 4,722,824 | A | 2/1988 | Wiech, Jr. |
| 5,012,260 | A | 4/1991 | Yoshimura et al. |
| 5,204,055 | A | 4/1993 | Sachs et al. |
| 5,387,380 | A | 2/1995 | Cima et al. |
| 6,007,318 | A | 12/1999 | Russell et al. |
| 6,092,887 | A | 7/2000 | Tanino et al. |
| 6,159,085 | A | 12/2000 | Hara |
| 6,375,874 | B1 | 4/2002 | Russell et al. |
| 6,454,811 | B1 | 9/2002 | Sherwood et al. |
| 6,607,572 | B2 | 8/2003 | Gammack et al. |
| 6,657,155 | B2 | 12/2003 | Abe et al. |
| 6,764,636 | B1 | 7/2004 | Allanic et al. |
| 6,824,714 | B1 | 11/2004 | Turck et al. |
| 6,835,222 | B2 | 12/2004 | Gammack |
| 6,945,638 | B2 | 9/2005 | Teung et al. |
| 6,989,115 | B2 | 1/2006 | Russell et al. |
| 7,034,246 | B2 | 4/2006 | Muylaert et al. |
| 7,037,382 | B2 | 5/2006 | Davidson et al. |
| 7,204,684 | B2 | 4/2007 | Ederer et al. |
| 7,225,803 | B2 | 6/2007 | Boyadjieff |
| 7,281,785 | B2 | 10/2007 | Palifka et al. |
| 7,291,002 | B2 | 11/2007 | Russell et al. |
| 7,296,990 | B2 | 11/2007 | Devos et al. |
| 7,357,629 | B2 | 4/2008 | Weiskopf et al. |
| 7,387,359 | B2 | 6/2008 | Hernandez et al. |
| 7,389,154 | B2 | 6/2008 | Hunter et al. |
| 7,435,368 | B2 | 10/2008 | Davidson et al. |
| 7,585,450 | B2 | 9/2009 | Wahlstrom et al. |
| 7,686,995 | B2 | 3/2010 | Davidson et al. |
| 7,690,909 | B2 | 4/2010 | Wahlstrom |
| 7,820,241 | B2 | 10/2010 | Perret et al. |
| 7,824,001 | B2 | 11/2010 | Fienup et al. |
| 7,850,271 | B2 | 12/2010 | Gothait et al. |
| 7,879,123 | B2 | 2/2011 | Lundquist et al. |
| 7,971,991 | B2 | 7/2011 | Davidson et al. |
| 7,979,152 | B2 | 7/2011 | Davidson |
| 8,017,055 | B2 | 9/2011 | Davidson et al. |
| 8,033,812 | B2 | 10/2011 | Collins et al. |
| 8,105,527 | B2 | 1/2012 | Wahlstrom |
| 8,167,395 | B2 | 5/2012 | Fienup et al. |
| 8,185,229 | B2 | 5/2012 | Davidson |
| 8,322,821 | B2 | 12/2012 | Tsai et al. |
| 8,951,033 | B2 | 2/2015 | Hchsmann et al. |
| 8,956,144 | B2 | 2/2015 | Grasegger et al. |
| 8,997,799 | B2 | 4/2015 | Hodson et al. |
| 9,027,378 | B2 | 5/2015 | Crump et al. |
| 9,346,127 | B2 | 5/2016 | Buller et al. |
| 9,403,235 | B2 | 8/2016 | Buller et al. |
| 9,446,448 | B2 | 9/2016 | Mccoy et al. |
| 9,586,290 | B2 | 3/2017 | Buller et al. |
| 9,636,870 | B2 | 5/2017 | Kuzusako et al. |
| 9,912,915 | B2 | 3/2018 | Sinclair |
| 9,919,474 | B2 | 3/2018 | Napadensky |
| 9,989,396 | B2 | 6/2018 | Gold et al. |
| 10,022,794 | B1 | 7/2018 | Redding et al. |
| 10,093,103 | B2 | 10/2018 | Araki et al. |
| 10,166,603 | B2 | 1/2019 | Kawada et al. |
| 10,183,330 | B2 | 1/2019 | Buller et al. |
| 10,189,267 | B2 | 1/2019 | Sakai et al. |
| 10,195,693 | B2 | 2/2019 | Buller et al. |
| 10,232,443 | B2 | 3/2019 | Myerberg et al. |
| 10,259,044 | B2 | 4/2019 | Buller et al. |
| 10,272,492 | B2 | 4/2019 | Gibson et al. |
| 10,272,525 | B1 | 4/2019 | Buller et al. |
| 10,286,452 | B2 | 5/2019 | Buller et al. |
| 10,286,571 | B2 | 5/2019 | Hchsmann et al. |
| 10,336,053 | B2 | 7/2019 | Sasaki |
| 10,343,725 | B2 | 7/2019 | Martin et al. |
| 10,350,682 | B2 | 7/2019 | Myerberg et al. |
| 10,406,262 | B2 | 9/2019 | Bonassar et al. |
| 10,414,089 | B2 | 9/2019 | Maier |
| 10,449,696 | B2 | 10/2019 | Elgar et al. |
| 10,486,361 | B2 | 11/2019 | Kawabata |
| 10,486,363 | B2 | 11/2019 | Sachs et al. |
| 10,569,331 | B2 | 2/2020 | Kawada et al. |
| 10,632,675 | B2 | 4/2020 | Chanclon et al. |
| 10,695,981 | B2 | 6/2020 | Hchsmann et al. |
| 11,167,454 | B2 | 11/2021 | Rockstroh et al. |
| 2002/0043055 | A1 | 4/2002 | Conrad |
| 2002/0079601 | A1* | 6/2002 | Russell .................. B33Y 30/00 |
| | | | 425/375 |
| 2002/0116907 | A1 | 8/2002 | Gammack et al. |
| 2004/0194250 | A1 | 10/2004 | Conrad et al. |
| 2006/0158456 | A1* | 7/2006 | Zinniel .................. B33Y 70/00 |
| | | | 345/589 |
| 2006/0219163 | A1 | 10/2006 | Merot et al. |
| 2006/0221127 | A1* | 10/2006 | Lee ........................ H04N 1/504 |
| | | | 347/42 |
| 2007/0077323 | A1 | 4/2007 | Stonesmith et al. |
| 2008/0111271 | A1 | 5/2008 | Khoshnevis |
| 2008/0117240 | A1 | 5/2008 | Sheinman |
| 2008/0200104 | A1 | 8/2008 | Chuang |
| 2008/0284819 | A1 | 11/2008 | Owaki et al. |
| 2008/0303882 | A1 | 12/2008 | Silverbrook et al. |
| 2008/0303883 | A1 | 12/2008 | Miyazawa |
| 2010/0043698 | A1 | 2/2010 | Bolt |
| 2012/0018032 | A1 | 1/2012 | Von Essen |
| 2013/0004607 | A1 | 1/2013 | Hoechsmann et al. |
| 2014/0240396 | A1 | 8/2014 | Rosati et al. |
| 2015/0029255 | A1* | 1/2015 | Ohnishi ............. B41J 11/00244 |
| | | | 347/102 |
| 2015/0110911 | A1 | 4/2015 | Snyder |
| 2015/0298394 | A1 | 10/2015 | Sheinman |
| 2015/0343533 | A1 | 12/2015 | Park et al. |
| 2016/0052054 | A1 | 2/2016 | Orange et al. |
| 2016/0096360 | A1 | 4/2016 | Zetzl et al. |
| 2016/0114533 | A1 | 4/2016 | Grasegger et al. |
| 2016/0151973 | A1 | 6/2016 | Juan Jover et al. |
| 2016/0339640 | A1 | 11/2016 | Juan et al. |
| 2016/0361874 | A1 | 12/2016 | Park et al. |
| 2016/0368054 | A1 | 12/2016 | Ng et al. |
| 2017/0050378 | A1 | 2/2017 | Ederer et al. |
| 2017/0106443 | A1 | 4/2017 | Karlsson |
| 2017/0106595 | A1 | 4/2017 | Gnther et al. |
| 2017/0120521 | A1 | 5/2017 | Sakura et al. |
| 2017/0144374 | A1 | 5/2017 | Ono |
| 2017/0182717 | A1 | 6/2017 | Byun et al. |
| 2017/0203514 | A1 | 7/2017 | McCoy et al. |
| 2017/0217104 | A1 | 8/2017 | Cortes I Herms et al. |
| 2017/0239725 | A1 | 8/2017 | Ufton |
| 2017/0246808 | A1 | 8/2017 | Hchsmann et al. |
| 2017/0252975 | A1 | 9/2017 | Park |
| 2017/0266880 | A1 | 9/2017 | Matsubara |
| 2017/0334138 | A1 | 11/2017 | Vilajosana et al. |
| 2017/0334144 | A1 | 11/2017 | Fish et al. |
| 2018/0001567 | A1 | 1/2018 | Juan et al. |
| 2018/0009110 | A1 | 1/2018 | Langford et al. |
| 2018/0056582 | A1 | 3/2018 | Matusik et al. |
| 2018/0111194 | A1 | 4/2018 | Buller et al. |

(56) References Cited

U.S. PATENT DOCUMENTS

| | | | |
|---|---|---|---|
| 2018/0111196 A1 | 4/2018 | Brezoczky et al. | |
| 2018/0236504 A1 | 8/2018 | Pourcher et al. | |
| 2018/0297283 A1 | 10/2018 | Hagedorn et al. | |
| 2018/0304364 A1 | 10/2018 | Myerberg et al. | |
| 2018/0339467 A1 | 11/2018 | Donovan et al. | |
| 2018/0345541 A1 | 12/2018 | Cuyt et al. | |
| 2019/0001413 A1 | 1/2019 | Golz et al. | |
| 2019/0070779 A1 | 3/2019 | Chen et al. | |
| 2019/0084231 A1 | 3/2019 | Chanclon Fernandez et al. | |
| 2019/0134705 A1 | 5/2019 | Sheinman et al. | |
| 2019/0152148 A1 | 5/2019 | Kremer | |
| 2019/0160733 A1 | 5/2019 | Mirkin et al. | |
| 2019/0201982 A1 | 7/2019 | Lombardo et al. | |
| 2019/0210277 A1 | 7/2019 | Sachs et al. | |
| 2019/0210282 A1 | 7/2019 | Sugiura et al. | |
| 2019/0217385 A1 | 7/2019 | Bonilla Gonzalez et al. | |
| 2019/0218501 A1 | 7/2019 | Kamen et al. | |
| 2019/0240732 A1 | 8/2019 | Koch et al. | |
| 2019/0358901 A1 | 11/2019 | Dugan | |
| 2019/0366626 A1 | 12/2019 | Swartz et al. | |
| 2020/0147885 A1 | 5/2020 | Gimenez Manent et al. | |
| 2020/0282461 A1 | 9/2020 | Fang | |
| 2020/0298474 A1 | 9/2020 | Gimenez et al. | |
| 2020/0324467 A1 | 10/2020 | Tjellesen et al. | |
| 2020/0361224 A1 * | 11/2020 | Navas | B41J 11/002 |

FOREIGN PATENT DOCUMENTS

| | | | |
|---|---|---|---|
| CN | 103862045 B | 1/2017 | |
| CN | 106738907 A | 5/2017 | |
| CN | 206528076 U | 9/2017 | |
| CN | 109366982 A | 2/2019 | |
| CN | 208745355 U | 4/2019 | |
| CN | 109732916 A | 5/2019 | |
| CN | 110076991 A | 8/2019 | |
| CN | 209851598 U | 12/2019 | |
| CN | 210211384 U | 3/2020 | |
| CN | 210880916 U | 6/2020 | |
| DE | 197 438 04 A1 * | 4/1999 | |
| DE | 19846478 A1 | 4/2000 | |
| DE | 102009036153 A1 | 2/2011 | |
| DE | 202013009787 U1 | 12/2013 | |
| EP | 1704989 A2 | 9/2006 | |
| EP | 1847370 A2 | 10/2007 | |
| EP | 1776910 B1 | 4/2013 | |
| EP | 2782743 A1 | 10/2014 | |
| EP | 2091718 B1 | 8/2016 | |
| EP | 2986405 B1 | 2/2017 | |
| EP | 3456518 A1 | 3/2019 | |
| EP | 3461574 A1 | 4/2019 | |
| EP | 3475057 A1 | 5/2019 | |
| EP | 3492244 A1 | 6/2019 | |
| EP | 3511094 A1 | 7/2019 | |
| EP | 3560714 A1 | 10/2019 | |
| EP | 3566869 A2 | 11/2019 | |
| EP | 3463817 B1 | 4/2021 | |
| EP | 3575064 B1 | 8/2021 | |
| GB | 2550339 A | 11/2017 | |
| JP | 2002292751 A | 10/2002 | |
| JP | 2006511365 A | 4/2006 | |
| JP | 2006248076 A | 9/2006 | |
| JP | 2009136758 A | 6/2009 | |
| JP | 2010 149 318 A * | 7/2010 | |
| JP | 2013193222 A | 9/2013 | |
| JP | 2015522438 A | 8/2015 | |
| JP | 2016215421 A | 12/2016 | |
| JP | 2017193124 A | 10/2017 | |
| JP | 2018001414 A | 1/2018 | |
| JP | 2018047562 A | 3/2018 | |
| JP | 2018144037 A | 9/2018 | |
| JP | 2020093259 A | 6/2020 | |
| KR | 1020120100188 A | 9/2012 | |
| WO | 2010055751 A1 | 5/2010 | |
| WO | 2011005690 A1 | 1/2011 | |
| WO | 2013182913 A2 | 12/2013 | |
| WO | 2014006877 A1 | 1/2014 | |
| WO | 2014044676 A1 | 3/2014 | |
| WO | WO-2014/096177 A1 * | 6/2014 | |
| WO | 2015112885 A1 | 7/2015 | |
| WO | 2015141779 A1 | 9/2015 | |
| WO | 2016040453 A1 | 3/2016 | |
| WO | 2016055523 A1 | 4/2016 | |
| WO | 2016083234 A1 | 6/2016 | |
| WO | 2017017272 A1 | 2/2017 | |
| WO | 2017088897 A1 | 6/2017 | |
| WO | 2017152142 A1 | 9/2017 | |
| WO | 2017180314 A1 | 10/2017 | |
| WO | 2018017117 A1 | 1/2018 | |
| WO | 2018149544 A1 | 8/2018 | |
| WO | 2018181334 A1 | 10/2018 | |
| WO | 2018183396 A1 | 10/2018 | |
| WO | 2018191667 A1 | 10/2018 | |
| WO | 2018194446 A1 | 10/2018 | |
| WO | 2018194685 A1 | 10/2018 | |
| WO | 2018197888 A1 | 11/2018 | |
| WO | 2019063741 A1 | 4/2019 | |
| WO | 2019076705 A1 | 4/2019 | |
| WO | 2019089497 A1 | 5/2019 | |
| WO | 2019094269 A1 | 5/2019 | |
| WO | 2019094283 A1 | 5/2019 | |
| WO | 2019094367 A1 | 5/2019 | |
| WO | 2019113412 A1 | 6/2019 | |
| WO | 2019136222 A1 | 7/2019 | |
| WO | 2019139742 A1 | 7/2019 | |
| WO | 2019140000 A1 | 7/2019 | |
| WO | 2019157074 A2 | 8/2019 | |
| WO | 2019182618 A1 | 9/2019 | |
| WO | 2019194826 A1 | 10/2019 | |
| WO | 2019209881 A1 | 10/2019 | |
| WO | 2019236074 A1 | 12/2019 | |
| WO | 2020007891 A1 | 1/2020 | |
| WO | 2020013828 A1 | 1/2020 | |
| WO | 2020068101 A1 | 4/2020 | |
| WO | 2020115468 A1 | 6/2020 | |
| WO | 2020146416 A2 | 7/2020 | |
| WO | 2020159507 A1 | 8/2020 | |
| WO | 2020237118 A1 | 11/2020 | |
| WO | 2020237119 A1 | 11/2020 | |
| WO | 2020237120 A1 | 11/2020 | |
| WO | 2020237122 A1 | 11/2020 | |
| WO | 2020237123 A1 | 11/2020 | |
| WO | 2020237138 A1 | 11/2020 | |
| WO | 2020237142 A1 | 11/2020 | |
| WO | 2020237143 A1 | 11/2020 | |
| WO | 2020237144 A1 | 11/2020 | |
| WO | 2020237161 A1 | 11/2020 | |
| WO | 2020237163 A1 | 11/2020 | |
| WO | 2020237165 A1 | 11/2020 | |
| WO | 2020237166 A1 | 11/2020 | |
| WO | 2022086867 A1 | 4/2022 | |
| WO | 2022086868 A1 | 4/2022 | |
| WO | 2022087043 A1 | 4/2022 | |
| WO | 2022087044 A1 | 4/2022 | |
| WO | 2022087046 A1 | 4/2022 | |
| WO | 2022087048 A1 | 4/2022 | |

OTHER PUBLICATIONS

International Search Report for Appln. No. PCT/US2021/055457 mailed Jan. 27, 2022, 20 pages.

International Search Report for Appln. No. PCT/US2021/055458 mailed Jan. 27, 2022, 15 pages.

International Search Report for Appln. No. PCT/US2021/055716 mailed Mar. 22, 2022, 21 pages.

International Search Report for Appln. No. PCT/US2021/055717 mailed Dec. 20, 2021, 16 pages.

International Search Report for Appln. No. PCT/US2021/055719 mailed Jan. 18, 2022, 17 pages.

International Search Report for Appln. No. PCT/US2021/055722 mailed Jan. 3, 2022, 14 pages.

International Search Report for Appln. No. PCT/US2021/056828 mailed Feb. 23, 2022, 11 pages.

(56) References Cited

OTHER PUBLICATIONS

International Search Report for Appln. No. PCT/US2021/056451 mailed Apr. 4, 2022, 33 pages.
International Search Report for Appln. No. PCT/US2021/056827 mailed Feb. 11, 2022, 15 pages.
International Search Report for Appln. No. PCT/US2021/056789 mailed Jan. 18, 2022, 18 pages.
International Search Report for Appln. No. PCT/US2021/056787 mailed Aug. 2, 2022, 12 pages.
International Search Report for Appln. No. PCT/US2021/057517 mailed Sep. 6, 2022, 21 pages.
International Preliminary Report for Appln. No. PCT/US2021/055457 mailed May 4, 2023, 14 pages.
International Preliminary Report for Appln. No. PCT/US2021/055458 mailed May 4, 2023, 10 pages.
International Preliminary Report for Appln. No. PCT/US2021/055716 mailed May 4, 2023, 16 pages.
International Preliminary Report for Appln. No. PCT/US2021/055717 mailed May 4, 2023, 11 pages.
International Preliminary Report for Appln. No. PCT/US2021/055719 mailed May 4, 2023, 12 pages.
International Preliminary Report for Appln. No. PCT/US2021/055722 mailed May 4, 2023, 10 pages.
International Preliminary Report for Appln. No. PCT/US2021/056828 mailed May 11, 2023, 8 pages.
International Preliminary Report for Appln. No. PCT/US2021/056451 mailed May 11, 2023, 23 pages.
International Preliminary Report for Appln. No. PCT/US2021/056827 mailed May 11, 2023, 9 pages.
International Preliminary Report for Appln. No. PCT/US2021/056789 mailed May 11, 2023, 11 pages.
International Preliminary Report for Appln. No. PCT/US2021/056787 mailed May 11, 2023, 8 pages.
International Preliminary Report for Appln. No. PCT/US2021/057517 mailed May 11, 2023, 15 pages.
Shanjani "Material Spreading and Compaction in Powder-Based Solid Freeform Fabrication Methods: Mathematical Modeling" Department of Mechanical and Mechatronic Engineering, University of Waterloo, Sep. 10, 2008.
Japanese Office Action for Application No. 2023-521818 dated Feb. 16, 2020 (5 pages with English Translation).
Japanese Office Action for Application No. 2023-521819 dated Feb. 20, 2024 (5 pages with English Translation).
European Patent Office Action for Application No. 21807388.0 dated Mar. 22, 2023 (8 pages).
Japanese Notice of Allowance for Application No. 2023-521819 dated Jul. 23, 2024 (2 pages with English Translation).

* cited by examiner

PRINT HEAD ASSEMBLY AND METHODS FOR USING THE SAME

CROSS-REFERENCE TO RELATED APPLICATION APPLICATIONS

This application is a National Stage Entry under 35 U.S.C. § 371 of International Patent Application No. PCT/US2021/056451, filed Oct. 25, 2021, which claims the benefit of U.S. Provisional Patent Application No. 63/107,137, filed Oct. 29, 2020, for "Printing Assemblies and Methods for Using the Same," which is hereby incorporated by reference in its entirety including the drawings.

TECHNICAL FIELD

The present specification generally relates to printing assemblies and, more specifically, to printing assemblies for manufacturing apparatuses and methods for using the same.

BACKGROUND

Printing assemblies may be utilized to "build" an object from build material, such as three-dimensional objects or parts, in a layer-wise manner. Early iterations of printing assemblies were used for prototyping three-dimensional parts. However, as printing assembly technology has improved, there is an increased interest in utilizing printing assemblies for large-scale commercial production of parts. Issues of scaling printing assemblies to commercial production may include, but are not limited to, allowing for positioning and alignment of the printing assemblies relative to a build area, detecting irregularities in the build area, and preventing contamination to components of the printing assemblies.

Generally, printing assemblies utilized in various contexts, including, for example, manufacturing applications, jet printing applications, and other printing types include parallel issues to those described above. For example, manufacturing apparatuses generally include printing assemblies, also referred to as printhead devices, which deposit binder materials through an array of jet nozzles during a manufacturing process. These printhead devices will repeatedly pass over previously deposited layers of build material in a build area and deposit additional layers of binder material with each pass. However, if the build material in the build area is too high, this may result in the printhead devices dragging excess build material away from the build area and contaminating the components within the printhead devices. Further, these printhead devices do not permit individual control over the positioning and alignment of the printhead devices or individual print heads of the printhead devices. Without this independent control, individual print heads may be in an undesirable position or out of alignment, which may result in an inability to print the desired object.

Accordingly, a need exists for alternative printing assemblies and components thereof which prevent contamination of components within the printing assembly and independent control of the print heads of the printing assembly. Further, a need exists for improved printing assemblies having increased maintainability, serviceability, and compactness.

SUMMARY

A first aspect A1 is directed to a printing assembly translatable along a working axis, the printing assembly comprising: a housing; a printing head provided within the housing, the printing head comprising a plurality of print heads; a base plate positioned proximate a bottom end of the housing, the base plate having a plurality of openings, each of the plurality of print heads provided within a corresponding one of the plurality of openings; and at least one adjustment block fixed to the base plate adjacent a corresponding one of the plurality of openings, the at least one adjustment block configured to adjust a position of a corresponding one of the plurality of print heads.

A second aspect A2 includes the printing assembly according to aspect A1, further comprising: a support bracket coupled to the housing; and a yaw bar including at least one adjustment member extendable toward and retractable away from the support bracket to rotate the housing about a central axis extending through the housing normal to the working axis.

A third aspect A3 includes the printing assembly according to aspect A2, further comprising a central pivot extending through the support bracket and a linear traversing stage along the central axis, wherein the support bracket is pivotally fixed to the linear traversing stage, the yaw bar is fixed to the linear traversing stage.

A fourth aspect A4 includes the printing assembly according to aspect A2, wherein the housing is rotatable relative to the yaw bar +/−3 degrees.

A fifth aspect A5 includes the printing assembly according to any of the foregoing aspects A1-A4, further comprising a manifold assembly provided within the housing, the manifold assembly configured to provide binder material to the plurality of print heads and receive binder material from the plurality of print heads.

A sixth aspect A6 includes the printing assembly according to aspect A5, further comprising a holding bracket configured to secure the manifold assembly within the housing.

A seventh aspect A7 includes the printing assembly according to any of the foregoing aspects A1-A6, further comprising: a plurality of print head interface boards within the housing, each of the plurality of print head interface boards coupled to a corresponding one of the plurality of print heads; and at least one printing head interface board provided within the housing and electrically coupled to at least one of the plurality of print head interface boards.

An eight aspect A8 includes the printing assembly according to any of the foregoing aspects A1-A7, wherein the printing head is translatable relative to the housing in a direction transverse to the working axis.

A ninth aspect A9 includes the printing assembly according to any of the foregoing aspects A1-A8, further comprising an imaging device provided on the printing assembly and directed toward a build surface extending below the printing assembly, the imaging device configured to scan across the build surface as the printing head moves along the working axis to identify an irregularity on the build surface.

A tenth aspect A10 is direct to a printing assembly translatable along a working axis, the printing assembly comprising: a housing; a printing head provided within the housing, the printing head comprising a plurality of print heads; and a heating system mounted to a build side wall of the housing, the heating system comprising at least one energy source for directing heat below the printing assembly.

An eleventh aspect A11 includes the printing assembly according to aspect A10, wherein the heating system further comprises a pair of energy sources extending parallel to one another along the build side wall of the housing.

A twelfth aspect A12 includes the printing assembly according to any of the foregoing aspects A10-A11, further comprising an air distribution system for delivering air across the at least one energy source, the at least one energy source provided within an enclosure, the air distribution system providing air through the enclosure.

A thirteenth aspect A13 includes the printing assembly according to aspect A12, wherein the air distribution system is configured to cool the energy sources.

A fourteenth aspect A14 includes the printing assembly according to any of the foregoing aspects A10-A13, further comprising: a printing head receptacle coupling the housing to a linear traversing stage and enabling motion of the housing relative to the printing head receptacle in a direction transverse to the working axis.

A fifteenth aspect A15 includes the printing assembly according to aspect A14, further comprising at least one hydraulic damper configured to absorb shock during loading of the housing onto the printing head receptacle.

A sixteenth aspect A16 includes the printing assembly according to any of the foregoing aspects A10-A15, further comprising a manifold assembly provided within the housing, the manifold assembly configured to provide binder material to the plurality of print heads and receive binder material from the plurality of print heads.

A seventeenth aspect A17 includes the printing assembly according to aspect A16, further comprising a holding bracket configured to secure the manifold assembly within the housing and prevent separation of an inlet manifold and an outlet manifold of the manifold assembly.

An eighteenth aspect A18 includes the printing assembly according to any of the foregoing aspects A10-A17, further comprising: a plurality of print head interface boards within the housing, each of the plurality of print head interface boards coupled to a corresponding one of the plurality of print heads; and at least one printing head interface board provided within the housing and electrically coupled to at least one of the plurality of print head interface boards, the at least one printing head interface board being pivotally attached to the printing head to permit access to the plurality of print heads.

A nineteenth aspect A19 includes the printing assembly according to any of the foregoing aspects A10-A18, further comprising an imaging device provided on the printing assembly and directed toward a build surface extending below the printing assembly, the imaging device configured to scan across the build surface as the printing head moves along the working axis to identify an irregularity on the build surface.

A twentieth aspect A20 discloses a printing assembly translatable along a working axis, the printing assembly comprising: a housing comprising an aperture formed at a bottom end thereof; a base plate positioned at the bottom end of the housing within the aperture, the base plate including a plurality of openings; a plurality of print heads positioned within the housing, wherein a printing face of each of the plurality of print heads is exposed via a corresponding one of the plurality of openings in the base plate; and a pair of flexible bellows extending between the base plate to which the plurality of print heads is mounted and the housing, the pair of flexible bellows deforming to account for movement of the base plate within the housing as the base plate moves in a direction transverse to the working axis.

A twenty-first aspect A21 includes the printing assembly according to aspect A20, wherein each of the pair of flexible bellows extends between one of a pair of end walls of the housing and an adjacent end of the base plate.

A twenty-second aspect A22 includes the printing assembly according to any of the foregoing aspects A20-A21, further comprising a gasket positioned about one of the plurality of openings of the base plate and compressed between the base plate and the print head received by the aperture about which the gasket is positioned.

A twenty-third aspect A23 includes the printing assembly according to any of the foregoing aspects A20-A22, further comprising a powder plow configured to prevent build material from contacting the plurality of print heads, the powder plow provided proximate a side wall of the base plate, the powder plow movable between a lowered position in which a bottom edge of the powder plow extends below the base plate, and a raised position in which the bottom edge of powder plow is above the bottom end of the base plate.

A twenty-fourth aspect A24 includes the printing assembly according to aspect A23, wherein the powder plow comprises a coating at least partially covering the powder plow, the coating having a coefficient of friction equal to or less than 0.2.

A twenty-fifth aspect A25 includes the printing assembly according to any of the foregoing aspects A23-A24, further comprising: a plow guide along which the powder plow moves between the lowered position and the raised position; and a hard stop coupled to the plow guide to limit vertical movement of the powder plow.

A twenty-sixth aspect A26 includes the printing assembly according to any of the foregoing aspects A23-A25, wherein the printing assembly comprises a sensor for detecting a position of the powder plow with respect to the bottom end of the housing.

A twenty-seventh aspect A27 includes the printing assembly according to any of the foregoing aspects A20-A26, further comprising: at least one electronic component provided on a top surface of each of the plurality of print heads; and a plurality of covers, each of the plurality of covers covering the at least one electronic component of a corresponding one of the plurality of print heads.

A twenty-eighth aspect A28 includes the printing assembly according to any of the foregoing aspects A20-A27, further comprising a deflector plate removably coupled to the base plate and extending in a direction opposite the base plate, a dimension of the deflector plate in a transverse direction perpendicular to the working axis is greater than a dimension of the base plate in the transverse direction.

A twenty-ninth aspect A29 includes the printing assembly according to aspect A28, wherein a bottom surface of the deflector plate lies in a plane with a bottom surface of the base plate.

A thirtieth aspect A30 includes the printing assembly according to aspect A29, wherein the bottom surface of the deflector plate has a surface roughness of equal to or less than 125 Ra (Roughness average).

A thirty-first aspect A31 includes the printing assembly according to any of the foregoing aspects A28-A30, further comprising a seal extending along an interface between the deflector plate and the base plate.

A thirty-second aspect A32 includes the printing assembly according to any of the foregoing aspects A29-A31, wherein the bottom surface of the deflector plate comprises has a coating at least partially covering the deflector plate, the coating having a coefficient of friction equal to or less than 0.2.

A thirty-third aspect A33 includes the printing assembly according to aspect A32, wherein the coating is formed from polytetrafluoroethylene.

A thirty-fourth aspect A34 includes the printing assembly according to any of the foregoing aspects A20-A33, further comprising a calibration guide removably coupled to the base plate of the printing head, the calibration guide comprising a first section at a first vertical position and a second section at a second vertical position, wherein the first section extends between the base plate and the second section when the printing assembly is mounted along the working axis, a step formed between the first section and the second section having a forward facing surface and a downward facing surface extending parallel to the first section.

A thirty-fifth aspect A35 includes the printing assembly according to aspect A34, wherein the calibration guide is removably mounted to the base plate of the printing head.

A thirty-sixth aspect A34 is directed to a printing assembly translatable along a working axis, the printing assembly comprising: a housing comprising an aperture formed at a bottom end thereof; a base plate positioned at the bottom end of the housing within the aperture, the base plate including a plurality of openings; a plurality of print heads positioned within the housing, wherein a printing face of each of the plurality of print heads is exposed via a corresponding one of the plurality of openings in the base plate; and a powder plow provided proximate a side wall of the housing, the powder plow movable between a lowered position in which a bottom edge of the powder plow extends below the bottom end of the housing, and a raised position in which the bottom edge of powder plow is above the bottom end of the housing.

A thirty-seventh aspect A37 includes the printing assembly according to aspect A36, wherein each of the plurality of print heads are rigidly mounted to the base plate.

A thirty-eighth aspect A38 includes the printing assembly according to any of the foregoing aspects A36-A37, wherein the powder plow comprises a coating at least partially covering the powder plow, the coating having a coefficient of friction equal to or less than 0.2.

A thirty-ninth aspect A39 includes the printing assembly according to any of the foregoing aspects A36-A38, further comprising: a plow guide along which the powder plow moves between the lowered position and the raised position; and a hard stop coupled to the plow guide to limit vertical movement of the powder plow.

A fortieth aspect A40 includes the printing assembly according to any of the foregoing aspects A36-A39, wherein the printing assembly comprises a sensor for detecting a position of the powder plow with respect to the bottom end of the housing.

A forty-first aspect A41 includes the printing assembly according to any of the foregoing aspects A36-A40, further comprising: at least one electronic component provided on a top surface of each of the plurality of print heads; and a plurality of covers, each of the plurality of covers covering the at least one electronic component of a corresponding one of the plurality of print heads.

A forty-second aspect A42 includes the printing assembly according to any of the foregoing aspects A36-A41, further comprising a deflector plate removably coupled to the base plate and extending in a direction opposite the base plate, a dimension of the deflector plate in a transverse direction perpendicular to the working axis is greater than a dimension of the base plate in the transverse direction.

A forty-third aspect A43 includes the printing assembly according to aspect A42, wherein a bottom surface of the deflector plate lies in a plane with a bottom surface of the base plate.

A forty-fourth aspect A44 includes the printing assembly according to aspect A43, wherein the bottom surface of the deflector plate has a surface roughness of equal to or less than 125 Ra (Roughness average).

A forty-fifth aspect A45 includes the printing assembly according to any of the foregoing aspects A42-A44, further comprising a seal extending along an interface between the deflector plate and the base plate.

A forty-sixth aspect A46 includes the printing assembly according to any of the foregoing aspects A43-A45, wherein the bottom surface of the deflector plate comprises has a coating at least partially covering the deflector plate, the coating having a coefficient of friction equal to or less than 0.2.

A forty-seventh aspect A47 includes the printing assembly according to aspect A46, wherein the coating is formed from polytetrafluoroethylene.

A forty-eighth aspect A48 includes the printing assembly according to any of the foregoing aspects A45-A47, further comprising a calibration guide removably coupled to the base plate, the calibration guide comprising a first section at a first vertical position and a second section at a second vertical position, wherein the first section extends between the base plate and the second section when the printing assembly is mounted along the working axis, a step formed between the first section and the second section having a forward facing surface and a downward facing surface extending parallel to the first section.

A forty-ninth aspect A49 includes the printing assembly according to aspect A48, wherein the calibration guide is removably mounted to the base plate of the printing head.

A fiftieth aspect A50 is directed to a printing assembly for use in an additive manufacturing apparatus, the printing assembly comprising: a housing; a printing head comprising a plurality of print heads, the printing head provided within the housing; and at least one utility port provided through the housing and accessible from an exterior thereof.

A fifty-first aspect A51 includes the printing assembly according to aspect A50, further comprising at least one printing head interface board within the housing.

A fifty-second aspect A52 includes the printing assembly according to aspect A51, wherein the at least one printing head interface board is hingedly attached within the housing.

A fifty-third aspect A53 includes the printing assembly according to any of the foregoing aspects A51-A52, wherein the at least one utility port comprises at least one electrical quick connect arrangement coupled to the at least one printing head interface board.

A fifty-fourth aspect A54 includes the printing assembly according to any of the foregoing aspects A50-A53, further comprising a manifold assembly provided within the housing, the manifold assembly configured to provide binder material to the plurality of print heads and receive binder material from the plurality of print heads.

A fifty-fifth aspect A55 includes the printing assembly according to aspect A54, wherein the at least one utility port comprises at least one pneumatic quick connect arrangement coupled to the manifold assembly.

A fifty-sixth aspect A56 includes the printing assembly according to any of the foregoing aspects A54-A55, wherein the at least one utility port comprises a binder supply quick connect fitting and a binder return quick connect fitting provided on the housing for coupling a reservoir to the manifold assembly.

A fifty-seventh aspect A57 includes the printing assembly according to any of the foregoing aspects A50-A56, further comprising: a track positioned along an inside surface of the housing; and at least one track roller slidable along the track, the at least one track roller coupled to a base plate to which the plurality of print heads are mounted to enable movement of the base plate within the housing.

A fifty-eighth aspect A58 includes the printing assembly according to any of the foregoing aspects A50-A57, further comprising at least one lifting handle provided on the housing proximate a top end of the housing.

A fifty-ninth aspect A59 is directed to an additive manufacturing apparatus comprising: a rail extending along a working axis; a linear traversing stage coupled to and moveable along the rail; and the printing assembly according to any of the foregoing aspects A50-A58 coupled to the linear traversing stage and translatable along the working axis.

A sixtieth aspect A60 includes the additive manufacturing apparatus according to aspect A59, further comprising a printing head receptacle fixed to the linear traversing stage, wherein the housing is removably coupled to the printing head receptacle, the housing translatable relative to the printing head receptacle in a direction transverse to the working axis.

A sixty-first aspect A61 includes the additive manufacturing apparatus according to any of the foregoing aspects A60, wherein one of the printing head receptacle and the printing assembly comprises at least one locking member and the other of the printing head receptacle and the printing assembly comprises an engaging member, the locking member configured to engage the engaging member to removably lock the printing assembly to the printing head receptacle.

A sixty-second aspect A62 includes the additive manufacturing apparatus according to any of the foregoing aspects A60-A61, wherein the printing head receptacle comprises a plurality of roller bearings for receiving the printing assembly.

A sixty-third aspect A63 is directed to a method utilizing a printing assembly of an additive manufacturing apparatus, the method comprising: providing a linear traversing stage movable in a direction transverse to a rail extending along a working axis of the additive manufacturing apparatus; coupling a printing assembly to the linear traversing stage such that the printing assembly is movable along the linear traversing stage in a direction transverse to the working axis, the printing assembly comprising a housing including a printing head; and coupling at least one utility of the additive manufacturing apparatus to the printing assembly via a utility port through the housing.

A sixty-fourth aspect A64 includes the method according to aspect A63, wherein the printing assembly is cantilevered from the rail in a direction orthogonal to the working axis.

A sixty-fifth aspect A65 includes the method according to any of aspect A64, wherein the housing of the printing assembly is coupled to the linear traversing stage through a printing head receptacle.

A sixty-sixth aspect A66 includes the method according to any of the foregoing aspects A64-A65, further comprising: extending or retracting at least one adjustment member extending through a yaw bar to rotate the housing relative to the printing head receptacle, the yaw bar provided between the housing and the printing head receptacle.

A sixty-seventh aspect A67 includes the method according to any of the foregoing aspects A63-A66, further comprising: providing an adjustment block within a corresponding one of a plurality of openings formed in a base plate of the printing head; positioning a print head within each one of the plurality of openings; and adjusting an adjustment member of the adjustment block to engage a corresponding one of the plurality of print heads and translate the corresponding print head within a corresponding opening.

A sixty-eighth aspect A68 includes the method according to aspect A67, further comprising: attaching a calibration guide to a base plate of the printing head, the calibration guide comprising a first section at a first vertical position and a second section at a second vertical position, wherein the first vertical position is above the second vertical position and the first section extends between the housing and the second section when the printing assembly is mounted along the working axis; and adjusting a vertical position of a wiper blade of the additive manufacturing apparatus between the first section and the second section.

A sixty-ninth aspect A69 includes the method according to any of the foregoing aspects A63-A68, further comprising: generating heat from at least one energy source extending along a side wall of the printing assembly; and blowing air across the at least one energy source to heat the air and direct the heated air below the printing assembly.

A seventieth aspect A70 includes the method according to any of the foregoing aspects A67-A69, further comprising: actuating a powder plow provided proximate a side wall of a base plate of the printing assembly between a lowered position in which a bottom edge of the powder plow extends below a bottom end of the base plate, and a raised position in which the bottom edge of powder plow is above the bottom end of the base plate.

A seventy-first aspect A71 is directed to a method utilizing a printing assembly of an additive manufacturing apparatus, the method comprising: providing a linear traversing stage movable in a direction transverse to a rail extending along a working axis of the additive manufacturing apparatus; coupling a printing assembly to the linear traversing stage such that the printing assembly is movable along the linear traversing stage in a direction transverse to the working axis, the printing assembly comprising a housing including a printing head; and extending or retracting at least one adjustment member extending through a yaw bar to rotate the housing relative to a printing head receptacle coupling the printing assembly to the rail, the yaw bar provided between the housing and the printing head receptacle.

A seventy-second aspect A71 is directed to a method utilizing a printing assembly of an additive manufacturing apparatus, the method comprising: providing a linear traversing stage movable in a direction transverse to a rail extending along a working axis of the additive manufacturing apparatus; coupling a printing assembly to the linear traversing stage such that the printing assembly is movable along the linear traversing stage in a direction transverse to the working axis, the printing assembly comprising a housing including a printing head; attaching a calibration guide to a base plate of the printing head, the calibration guide comprising a first section at a first vertical position and a second section at a second vertical position, wherein the first vertical position is above the second vertical position and the first section extends between the housing and the second section when the printing assembly is mounted along the working axis; and adjusting a vertical position of a wiper blade of the additive manufacturing apparatus between the first section and the second section.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 8:
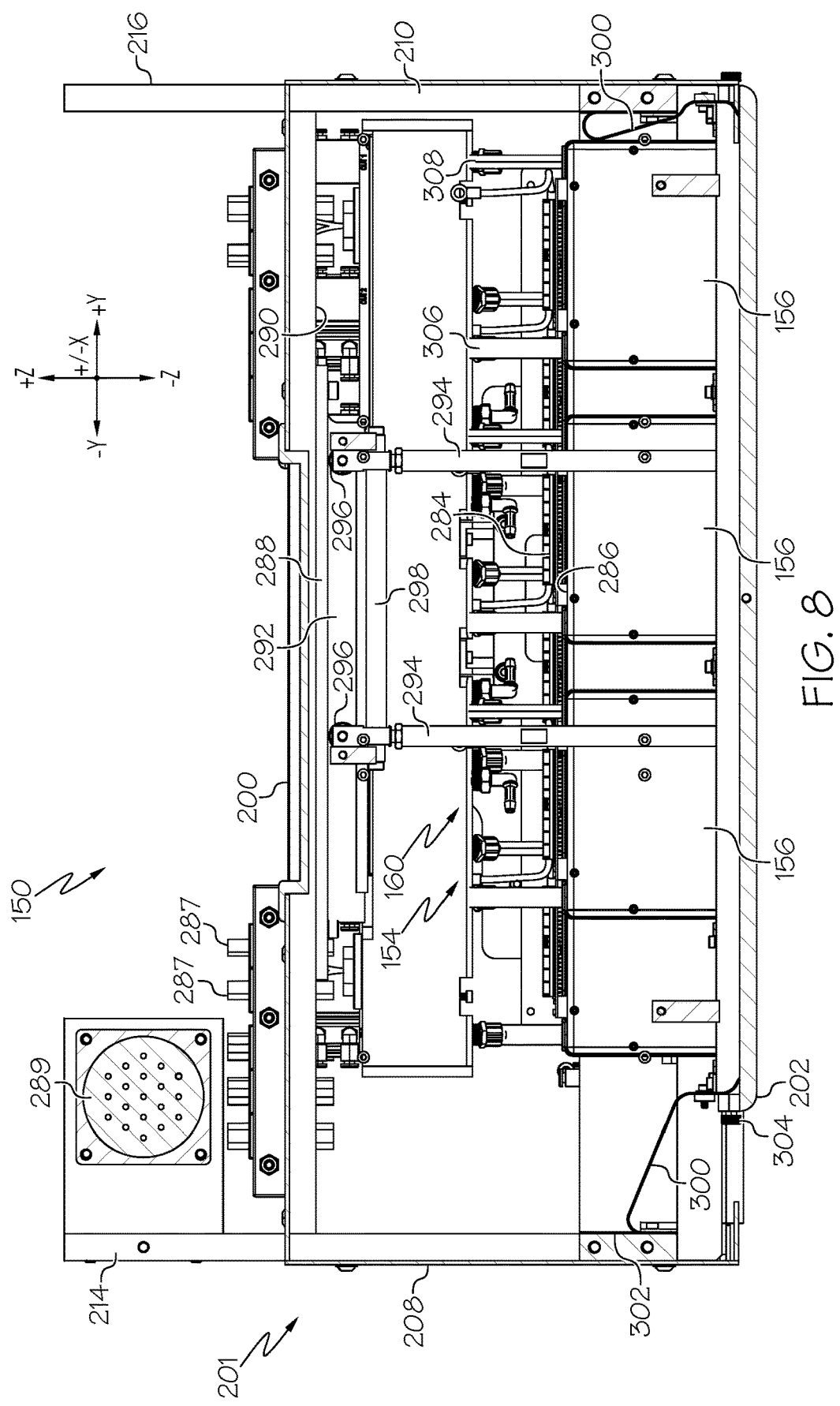
FIG. 8 schematically depicts a partial perspective view of a printing assembly of the manufacturing apparatus according to one or more embodiments shown and described herein.

Reference will now be made in detail to embodiments of manufacturing apparatuses, and components thereof, examples of which are illustrated in the accompanying drawings. Whenever possible, the same reference numerals will be used throughout the drawings to refer to the same or like parts. Embodiments of a printing assembly, an example of which is schematically depicted in FIG. 8, include a housing comprising a top end, a print home side wall, a build side wall opposing the print home side wall, and a pair of end walls extending between the print home side wall and the build side wall. A support bracket is coupled to the printing head coupling the printing assembly to a rail such that the printing assembly traverses the rail along a working axis.

Various embodiments of printing assemblies for manufacturing apparatuses, manufacturing apparatuses comprising the printing assemblies, and methods for using the same are described in further detail herein with specific reference to the appended drawings. It should be understood that the embodiments of the manufacturing apparatuses shown and described herein may be configured and operable to build three-dimensional and/or non-three dimensional objects or parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Directional terms as used herein, for example up, down, right, left, front, back, top, above, bottom, forward, reverse, and return are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an," and "the" include plural referents unless the context clearly dictates otherwise. Thus, for example, reference to "a" component includes aspects having two or more such components, unless the context clearly indicates otherwise.

Manufacturing Apparatus

Embodiments described herein are directed to manufacturing apparatuses and components for manufacturing apparatuses. As discussed herein, the manufacturing apparatuses are referred to herein as additive manufacturing apparatuses, specifically printing assemblies for depositing binder and other jettable materials. However, it is to be understood that this is just one illustrative embodiment and the present disclosure is not limited to the additive manufacturing apparatus. For example, the features of the manufacturing apparatuses described herein may be applicable to manufacturing apparatuses including print head devices that use, for example, energy sources for material consolidation, e.g., melting, sintering, and the like, rather than binder jets. Various embodiments described herein may be implemented to allow, for example, positioning and aligning printing assemblies relative to a build area, detecting irregularities in the build area, and preventing contamination to components of printing assemblies. It is understood that technology developed and described herein relates to manufacturing, however, aspects of the technology may have applications in related industries such as 2-D printing or the like.

Figure 1:
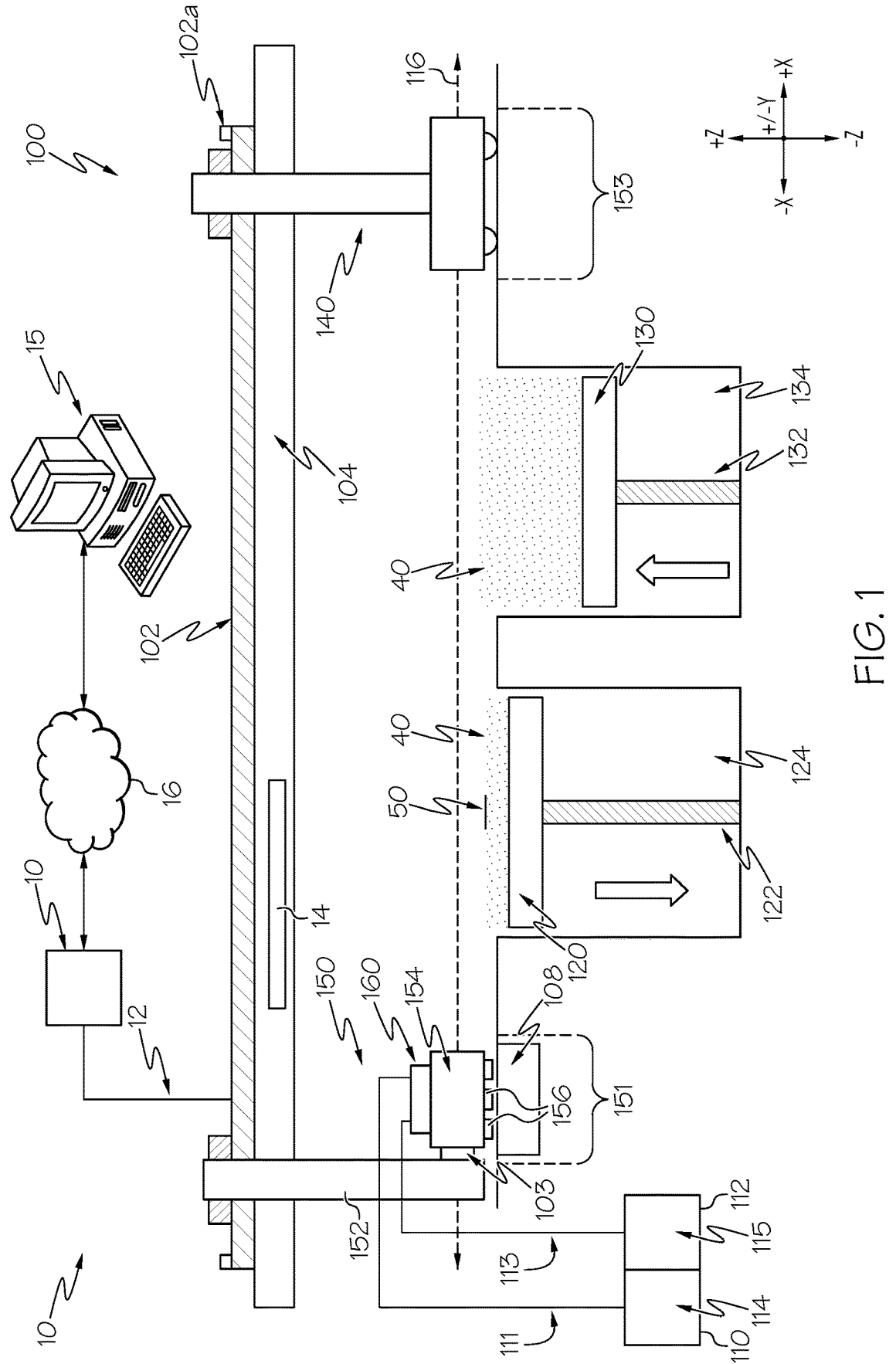
FIG. 1 schematically depicts an embodiment of a manufacturing apparatus according to one or more embodiments shown and described herein.

Referring now to FIG. 1, an embodiment of a manufacturing apparatus 100 is schematically depicted. The manufacturing apparatus 100 includes a cleaning station 108, a build area 120, a supply platform 130, a recoat assembly 140, and a printing assembly 150. The recoat assembly 140 and the printing assembly 150 are coupled to a rail 104 of the manufacturing apparatus 100 and are configured to translate along the rail 104 in response to an actuation of a first actuator assembly 102. The first actuator assembly 102 may be constructed to facilitate independent control of the recoat assembly 140 and the printing assembly 150 along a working axis 116 of the manufacturing apparatus 100. The working axis 116 is also referred to herein as the "longitudinal axis" (i.e., extending along the +/−X axis of the coordinate axes as depicted in the figures). This allows for the recoat assembly 140 and the printing assembly 150 to traverse the working axis 116 of the manufacturing apparatus 100 in the same direction and/or in opposite directions and for the recoat assembly 140 and the printing assembly 150 to traverse the working axis 116 of the manufacturing apparatus 100 at different speeds and/or the same speed.

In the embodiments described herein, the cleaning station 108, the build area 120, the supply platform 130, the recoat assembly 140, and the printing assembly 150 are positioned in series along the working axis 116 of the manufacturing apparatus 100 between a home position 151 of the printing assembly 150, located proximate an end of the working axis 116 in the −X direction, and a home position 153 of the recoat assembly 140, located proximate an end of the working axis 116 in the +X direction. In embodiments, the build area 120 is positioned between the cleaning station 108 and the supply platform 130 along the working axis 116 of the manufacturing apparatus 100.

In embodiments, a second actuator assembly 103 may be constructed to facilitate independent control of the printing assembly 150 along a latitudinal axis (i.e., extending along the +/−Y axis of the coordinate axes as depicted in the figures), which is generally perpendicular to the longitudinal axis (i.e., the working axis 116). The first actuator assembly 102 and the second actuator assembly 103 are generally referred to as a printing head position control assembly. That is, the printing head position control assembly includes the first actuator assembly 102 configured to move the printing head along the longitudinal axis and a second actuator assembly 103 configured to move the printing head along a latitudinal axis. The printing head position control assembly may be controlled via signals generated by a control system 10 such as an electronic control unit. The electronic control unit may include a processor and a non-transitory computer readable memory.

The printing assembly 150 comprises, among other features, a support bracket 152, a printing head 154, and a plurality of print heads 156. In embodiments, the support bracket 152 is movably coupled to the rail 104 and the first actuator assembly 102 of the manufacturing apparatus 100 while the printing head 154 is movably coupled to the support bracket 152 via the second actuator assembly 103. The support bracket 152 includes an upper frame 213 and a pair of side arms 214, 216, only one is shown in FIG. 1. The support bracket 152 is coupled to the rail 104 via a linear traversing stage 212. As such, the linear traversing stage 212 extends between the upper frame 213 and the rail 104. The linear traversing stage 212 is configured to slide along the rail 104 via the first actuator assembly 102, as discussed herein, in order to move the printing head 154 along the working axis 116.

Each print head 156 comprises one or more jet nozzles. When a plurality of jet nozzles are incorporated into a print head 156, the plurality of jet nozzles are spaced apart from one another. The plurality of jet nozzles are spaced apart from one another in a direction transverse to a longitudinal axis, where a distance from a first jet nozzle to a second jet nozzle positioned adjacent the first jet of the plurality of jets defines a jet-spacing. By way of example only, each of the print heads 156 may include a plurality of jet nozzles from about 5,000 nozzles to about 6,000 nozzles, with each jet nozzle spaced apart from another by about 1/1150 inch from one another. Other jet nozzle spacing is possible and contemplated.

The recoat assembly 140 is constructed to facilitate a distribution of a build material over the build area 120 and the supply platform 130. The build area 120 is coupled to a build platform actuator 122 to facilitate raising and lowering the build area 120 relative to the working axis 116 of the manufacturing apparatus 100 in a vertical direction (i.e., a direction parallel to the +/−Z axis of the coordinate axes depicted in the figures). The build area 120 and build platform actuator 122 are positioned in a build receptacle 124 located below the working axis 116 (i.e., in the −Z direction of the coordinate axes depicted in the figures) of the manufacturing apparatus 100. During operation of the manufacturing apparatus 100, the build area 120 is retracted into the build receptacle 124 by action of the build platform actuator 122 after each layer of binder material 50 is deposited on the build material 40 located on the build area 120.

Still referring to FIG. 1, the supply platform 130 is coupled to a supply platform actuator 132 to facilitate raising and lowering the supply platform 130 relative to the working axis 116 of the manufacturing apparatus 100 in a vertical direction (i.e., a direction parallel to the +/−Z axis of the coordinate axes depicted in the figures). The supply platform 130 and supply platform actuator 132 are positioned in a supply receptacle 134 located below the working axis 116 (i.e., in the −Z direction of the coordinate axes depicted in the figures) of the manufacturing apparatus 100. During operation of the manufacturing apparatus 100, the supply platform 130 is raised relative to the supply receptacle 134 and towards the working axis 116 of the manufacturing apparatus 100 by action of the supply platform actuator 132 after a layer of build material 40 is distributed from the supply platform 130 to the build area 120, as will be described in further detail herein. However, it should be understood that, in other embodiments, the manufacturing apparatus 100 does not include a supply platform 130, such as in embodiments where build material is supplied to the build area 120 with, for example and without limitation, a build material hopper.

As will be described in greater detail herein, the printing assembly 150 is constructed to facilitate a deposition of a binder material 50 and/or other jettable materials (e.g., ink, fluid medium, colorant, nanoparticles, fluorescing particles, sintering aids, anti-sintering aids, etc.) over the layer of build material 40 in the build area 120 as the printing assembly 150 traverses the build area 120 along the working axis 116 of the manufacturing apparatus 100.

Still referring to FIG. 1, the cleaning station 108 is positioned proximate one end of the working axis 116 of the manufacturing apparatus 100 and is co-located with the home position 151 where the printing assembly 150 is located or "parked" before and after depositing a binder material 50 on a layer of build material 40 positioned on the build area 120. The cleaning station 108 may include one or more cleaning sections to facilitate cleaning the printing assembly 150, and in particular a plurality of print heads 156 of the printing assembly 150 between depositing operations. The cleaning sections may include, for example and without limitation, a soaking station containing a cleaning solution for dissolving excess binder material 50 from the plurality of print heads 156, a wiping station for removing excess binder material 50 from the plurality of print heads 156, a jetting station for purging binder material 50 and cleaning solution from the plurality of print heads 156, a capping station for maintaining moisture in a plurality of jet nozzles of the plurality of print heads 156, or various combinations thereof. The printing assembly 150 may be transitioned between the cleaning sections by the first actuator assembly 102. In embodiments, the manufacturing apparatus 100 may include a jetting test area positioned proximate to one end of the working axis 116 adjacent to the cleaning station 108 and/or the home position 151. Although not shown, it should be understood that the jetting test area of the manufacturing apparatus 100 may be configured to facilitate a binder material deposition by the printing assembly 150 prior to performing a deposition along the build area 120. Additional information on cleaning stations in manufacturing apparatuses can be found in PCT Application No. PCT/US20/34144, filed on May 22, 2020, and entitled "Cleaning Systems for Additive Manufacturing Apparatuses and Methods for Using the Same," the entirety of which is hereby incorporated by reference.

Still referring to FIG. 1, the manufacturing apparatus 100 may further include a control system 10 communicatively coupled to the first actuator assembly 102, the second actuator assembly 103, the recoat assembly 140, and/or the printing assembly 150. As described in greater detail herein, in embodiments the control system 10 may be particularly coupled to one or more valves of a manifold assembly 160 of the printing assembly 150. In the embodiments, the control system 10 is coupled to the manufacturing apparatus 100 via a communication conduit 12, however, it should be understood that in other embodiments the control system 10 may be communicatively coupled to the manufacturing apparatus 100 via various other means or systems, such as, for example, through a wireless connection. The control system 10, which may also be referred to as an electronic control unit, comprises a processor and a non-transitory memory that includes computer readable and executable instructions stored thereon. Any action of the manufacturing apparatus 100, including the actions described herein, may be caused to be performed by the computer readable and executable instructions (e.g., opening and closing valves within the manifold assembly 160) stored in the non-transitory memory of the control system 10 when executed by the processor of the control system 10. For example, one or more actuators may be actuated by the computer readable and executable instructions stored in the non-transitory memory of the control system 10 when executed by the processor of the control system 10 to cause the valves of the manifold assembly 160 to operate in the manner described herein.

In embodiments, the control system 10 may be further communicatively coupled to a computing device 15, optionally via a network 16, or directly via a communication link such as a wired or wireless connection. The computing device 15 may be configured to carry out processes such as generating executable instruction for building a component with the manufacturing apparatus 100, such as by implementing CAD or other related three-dimensional drafting and rendering systems as well as a slicing engine or the like.

As shown in FIG. 1, the manufacturing apparatus 100 further includes at least one supply reservoir 110 and at least one return reservoir 112 fluidly coupled to the manifold assembly 160 of the printing assembly 150 via one or more conduit lines 111, 113, respectively. In embodiments, the supply reservoir 110 is highly pressurized to force binder material into the printing head 154. Although the supply reservoir 110 and the return reservoir 112 are illustrated and discussed herein as being separate components for storing binder material, in embodiments, the supply reservoir 110 and the return reservoir 112 may be the same reservoir, such that binder material from the supply reservoir 110 is circulated back to the supply reservoir 110 instead of to a separate return reservoir 112.

As discussed in more detail hereinbelow, the manifold assembly 160 includes an inlet reservoir and an outlet reservoir for storing the binder material. Each of the inlet reservoir and the outlet reservoir are operated to be in fluid communication with the plurality of print heads 156. In particular, the supply reservoir 110 and the return reservoir 112 are fluidly coupled to each of the plurality of print heads 156 disposed within the printing head 154 of the printing assembly 150 via the manifold assembly 160. The plurality of print heads 156 are recirculation-ready, such that binder material is initially delivered to the plurality of print heads 156 and any binder material that is not dispensed through the print heads 156 is drawn back out of the plurality of print heads 156. As will be discussed in greater detail below, the binder material is initially delivered to the inlet reservoir of the manifold assembly 160 from the supply reservoir 110 and, subsequently, delivered to the plurality of print heads 156 from the inlet reservoir of the manifold assembly 160. Any binder material that is not dispensed through the print heads 156 is then drawn out of the plurality of print heads 156 and into the outlet reservoir of the manifold assembly 160. Thereafter, the binder material is drawn out of the outlet reservoir and delivered into the return reservoir 112.

Imaging Device Assembly

Figure 2:
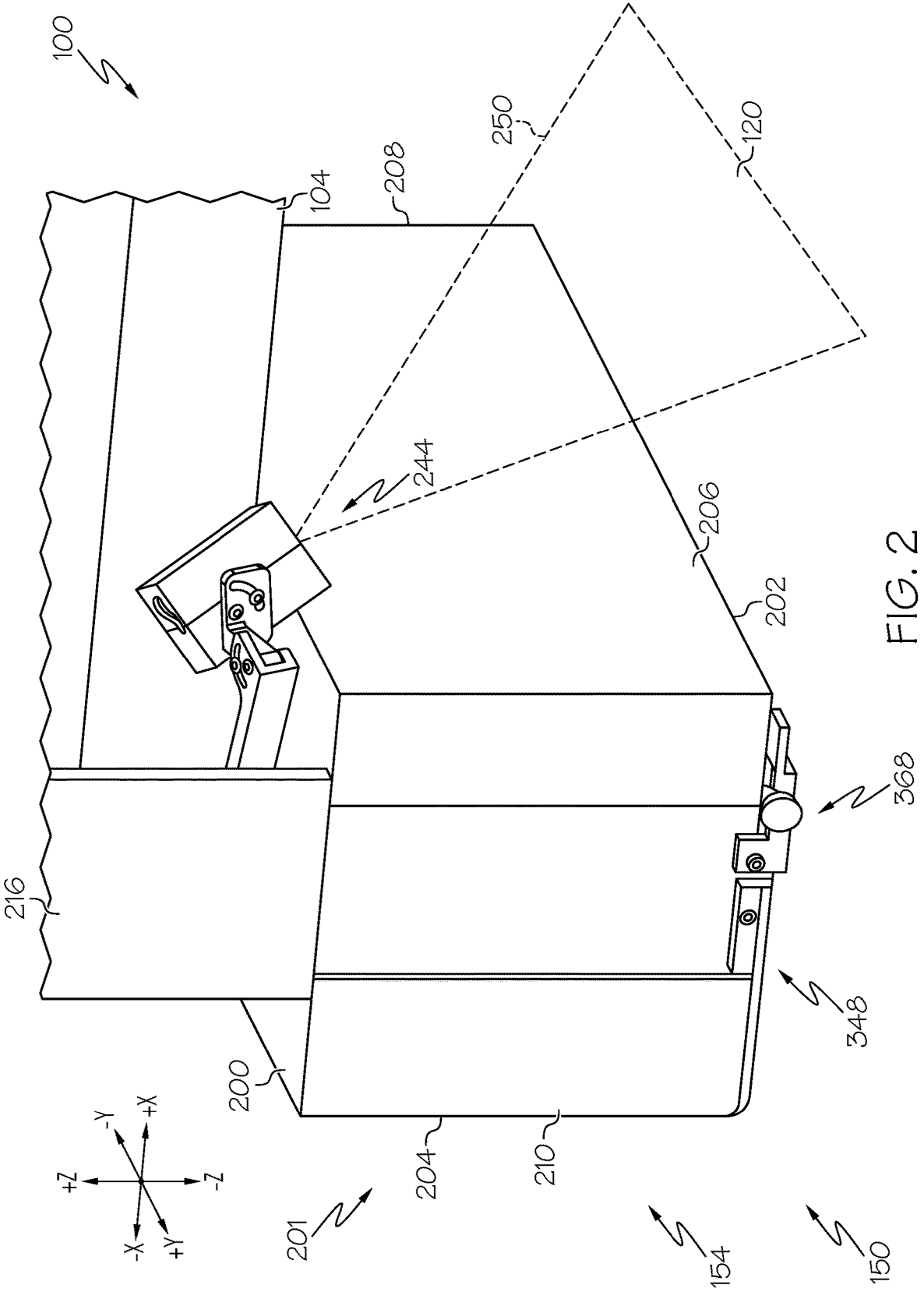
FIG. 2 schematically depicts a partial perspective view of the manufacturing apparatus including an imaging device assembly according to one or more embodiments shown and described herein.

Referring now to FIG. 2, the printing assembly 150 is illustrated below the rail 104. The printing assembly 150 includes a housing 201, in which the printing head 154 and the manifold assembly 160 are provided, as described in more detail herein. The housing 201 comprises a top end 200, a print home side wall 204, a build side wall 206 opposing the print home side wall 204, and a pair of end walls 208, 210 extending between the print home side wall 204 and the build side wall 206. As discussed herein, the support bracket 152 is movably coupled to the rail 104 via the linear traversing stage 212 while the printing assembly 150 is positioned along an opposite end of the support bracket 152. The side arms 214, 216 of the support bracket 152 extend between the housing 201 and the upper frame 213 defining a void 218. The linear traversing stage 212 is coupled between an underside 220 of the upper frame 213 and an upper surface 222 of the rail 104, which extends through the void 218 of the support bracket 152.

In embodiments, the printing assembly 150 further includes an imaging device assembly 244 for scanning the build area 120 and capturing an image of various areas of the manufacturing apparatus 100 depicted in FIG. 1. For example, the imaging device assembly 244 may be configured to scan across the build area 120 and capture an image of the build area 120 to detect an irregularity, which may then be communicated to the control system 10. The manufacturing apparatus 100 may then be operated accordingly in any suitable manner discussed herein to address the irregularity such as, for example, pausing the printing assembly 150 to clean, purge, or de-clog the print heads 156, recoat the build area 120 from build material from the recoat assembly 140, or apply an extra layer of binder material to the build area 120 from the print heads 156.

In embodiments, the imaging device assembly 244 is provided on the printing assembly 150. The imaging device assembly 244 may be provided on the housing 201 or, alternatively, the support bracket 152. As shown, the imaging device assembly 244 is mounted to the support bracket 152. The imaging device assembly 244 includes a housing 246 in which an imaging device 248 is enclosed. The imaging device 248 has a field of view 250 extending at least as wide as the build area 120 extending transverse to the working axis 116 such that the imaging device 248 can capture an image of the entire build area 120, or at least a substantial portion thereof, as the printing assembly 150 traverses the rail 104.

Figure 3:
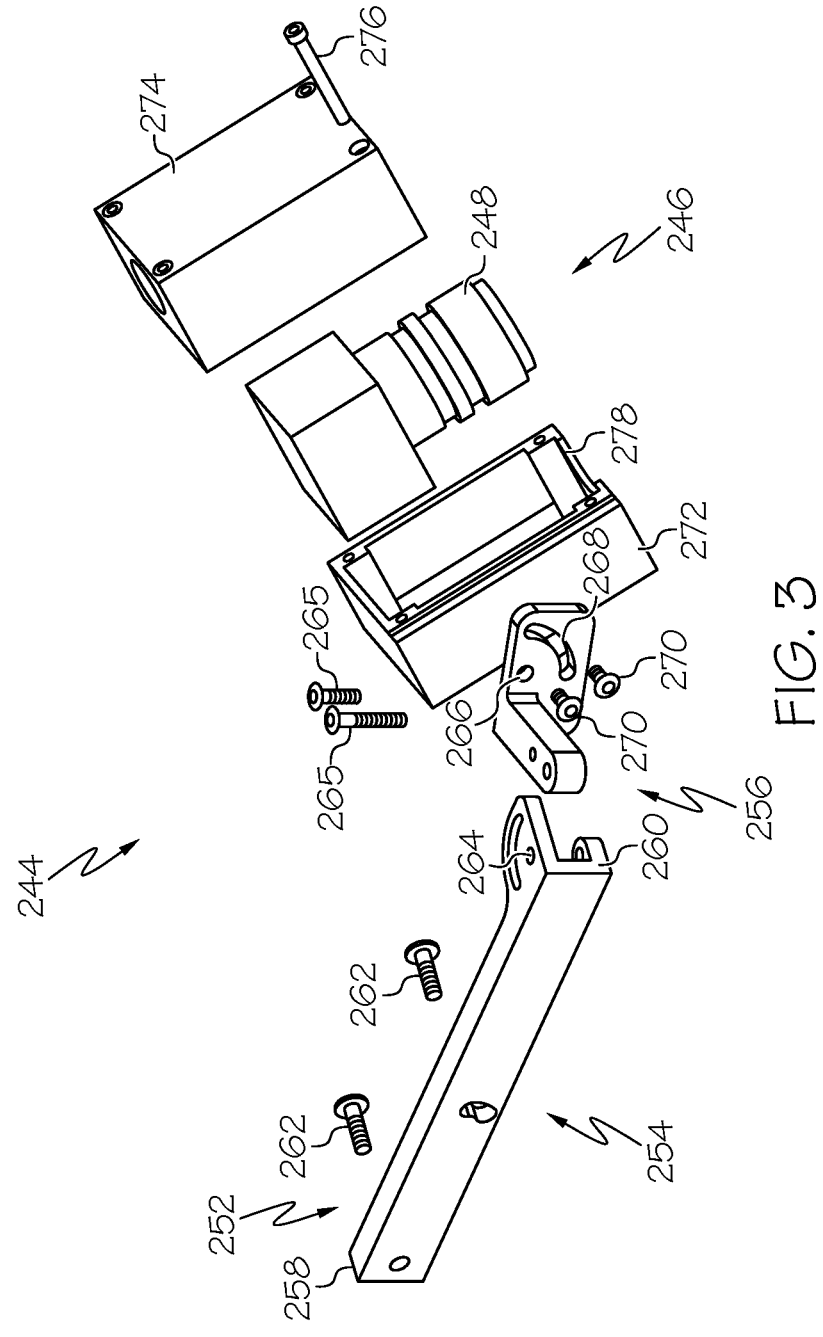
FIG. 3 schematically depicts an exploded view of the imaging device assembly according to one or more embodiments shown and described herein.

As shown in FIG. 3, the imaging device assembly 244 includes the imaging device 248 for capturing an image of the build area 120 and a mount 252 for securing the imaging device 248 to the printing assembly 150. The imaging device 248 may be any suitable image capture device for detecting and identifying characteristics and/or irregularities of the build area 120. The mount 252 includes a mounting bracket 254, a rotating coupler 256 rotatably attached to the mounting bracket 254, and the housing 246 rotatably attached to the rotating coupler 256. The mounting bracket 254 includes a first end 258 and a second end 260. The mounting bracket 254 is secured to the printing assembly 150, such as support bracket 152, by at least one fastener 262. The fastener 262 can be, as a non-limiting example, a screw, bolt, rivet, or the like. A pair of fasteners 262 are shown for preventing inadvertent downward rotation of the imaging device 248 when mounted. The rotating coupler 256 is rotatably attached to the mounting bracket 254 by at least one fastener 265 extending through a pivot hole 264 proximate the second end 260 of the mounting bracket 254 to allow the rotating coupler 256 to rotate horizontally about the pivot hole 264. The rotating coupler 256 includes a pivot hole 266 and a curved slot 268 formed in a side thereof. A fastener 270 extends through each of the pivot hole 266 and the curved slot 268 of the rotating coupler 256 to rotatably attach the rotating coupler 256 to the housing 246. The fastener 270 can be, as a non-limiting example, a screw, bolt, rivet, or the like. Accordingly, the housing 246 rotates in a vertical direction about the pivot hole 266 of the rotating coupler 256 as the fastener 270 moves along the curved slot 268 of the rotating coupler 256. To adjust the vertical orientation of the housing 246, the fastener 270 in the curved slot 268 may be loosened and the housing 246 rotated until a desired orientation is achieved, at which point the fastener 270 is tightened to lock the housing 246 in place relative to the rotating coupler 256.

The housing 246 includes a first portion 272 and a second portion 274 for encasing the imaging device 248. The first portion 272 and the second portion 274 may be configured to secure the imaging device 248 therebetween in any suitable manner. For example, the first portion 272 and the second portion 274 may be pivotally attached to one another to open and receive the imaging device 248. The first portion 272 and the second portion 274 may include any suitable locking mechanism to secure the first portion 272 to the second portion 274 and prevent the imaging device 248 from being removed. In embodiments, at least one fastener 276 may extend through the first portion 272 and the second portion 274 to lock the two portions 272, 274 together. The fastener 276 can be, as a non-limiting example, a screw, bolt, rivet, or the like. As shown, a plurality of fasteners 276 are provided. In embodiments, at least one of the first portion 272 and the second portion 274 include a viewing port 278 formed therein through which the imaging device 248 is directed to avoid obstructing the field of view 250 when utilized.

Although various embodiments of the imaging device assembly 244 were described as being incorporated or coupled to the printing assembly 150, it is contemplated that the imaging device assembly 244 can be independent of the printing assembly 150 and provided at any other suitable location such as, for example, on the rail 104 or other support structure independent of the printing assembly 150.

Pivotable Printing Head

Figure 4:
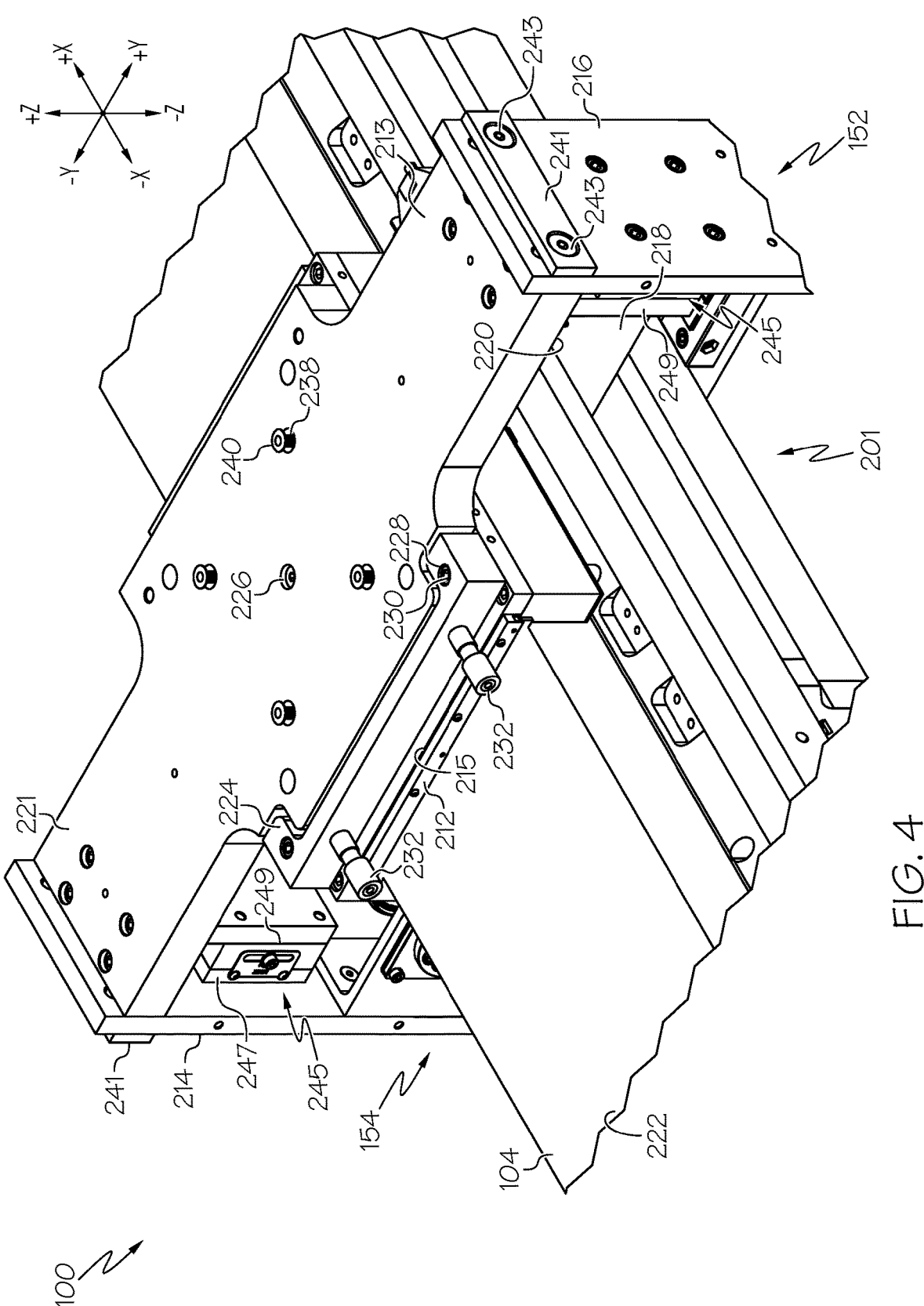
FIG. 4 schematically depicts a partial perspective view of the manufacturing apparatus including a yaw bar according to one or more embodiments shown and described herein.
Figure 5:
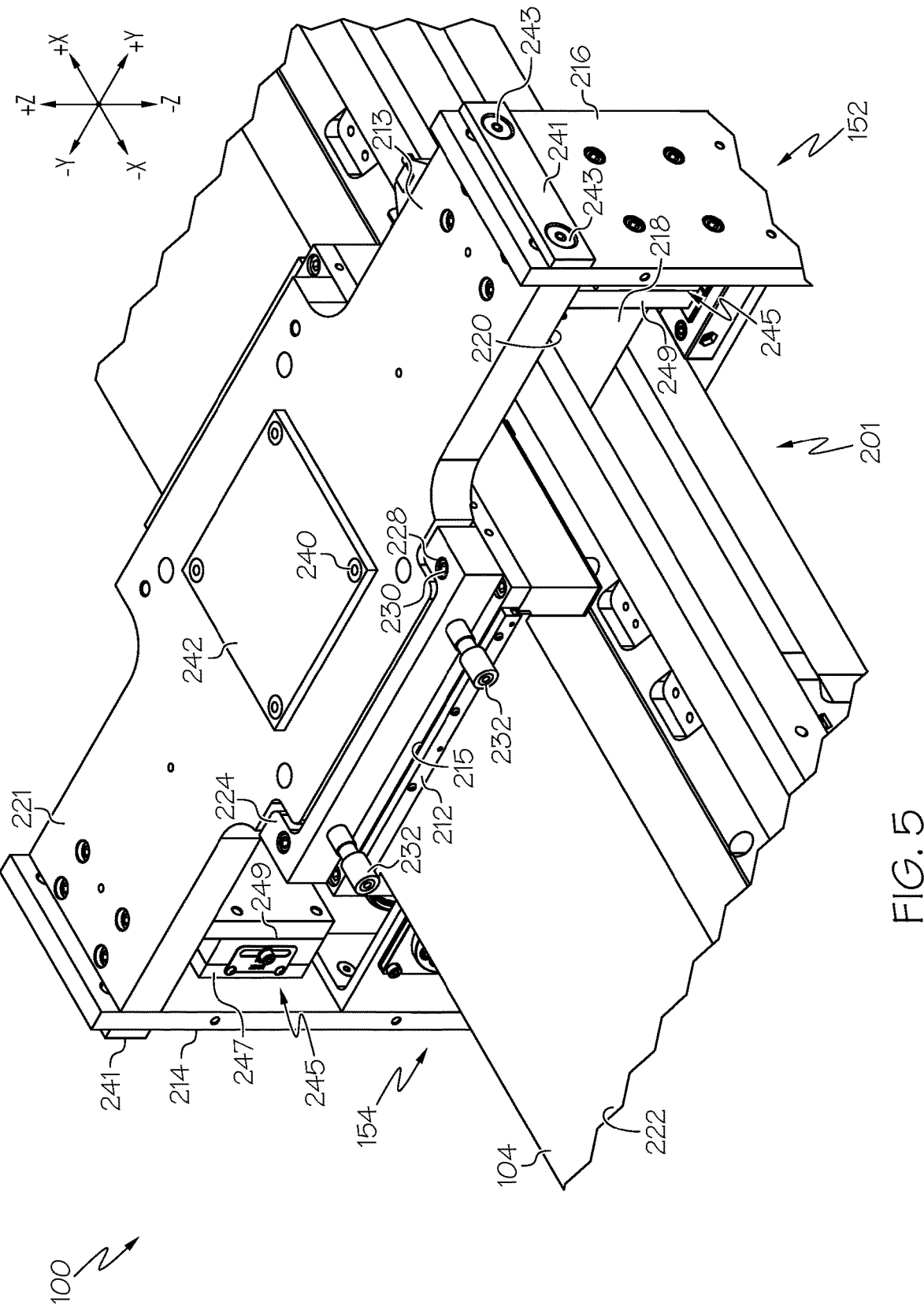
FIG. 5 schematically depicts a partial perspective view of the manufacturing apparatus including the yaw bar and a clamp plate according to one or more embodiments shown and described herein.

Referring now to FIGS. 4 and 5, the printing assembly 150 is illustrated coupled to the linear traversing stage 212 and the rail 104 by the support bracket 152. In embodiments, the printing assembly 150 includes a yaw bar 224 fixed to the linear traversing stage 212 and configured to engage the upper frame 213 to pivot the support bracket 152 and, thus, the housing 201 about a pivot pin 226, as shown in FIG. 4. The yaw bar 224 is provided to improve print quality of the printing assembly 150 by facilitating rotation of the printing head 154 and precise control over the position and orientation of the print heads 156 relative to the build area 120. More particularly, the support bracket 152 and the housing 201 pivot about a central axis relative to the rail 104 and the linear traversing stage 212 to which the yaw bar 224 is fixed. As shown in FIG. 4, the yaw bar 224 is an elongated member extending across a width of the linear traversing stage 212 and transverse to the working axis 116. In embodiments, the yaw bar 224 includes a pair of holes 228 formed in opposite ends thereof with each hole 228 receiving a fastener 230 to secure the yaw bar 224 to the linear traversing stage 212. As shown, a pair of fasteners 230 extend through the holes 228 proximate opposite ends of the yaw bar 224 to fix the yaw bar 224 to an upper surface 215 of the linear traversing stage 212 with a respective fastener 230. The fasteners 230 can be, as a non-limiting example, a screw, bolt, rivet, or the like. In other embodiments, the yaw bar 224 may be provided in any other suitable location, such as fixed to a side or an end of the linear traversing stage 212.

The yaw bar 224 also includes at least one adjustment member 232 for engaging the support bracket 152 and pivoting the support bracket 152 and the printing head 154. The adjustment member 232 may be, as a non-limiting example, a retractable pin, a threaded fastener, or the like. In embodiments, the adjustment member 232 extends through the yaw bar 224 toward the upper frame 213 in the direction of the working axis 116. The adjustment member 232 is operable between an extended position in which the adjustment member 232, or at least a portion thereof, extends in a direction toward the support bracket 152, and a retracted position in which the adjustment member 232, or at least a portion thereof, retracts in a direction away from the support bracket 152. In embodiments, an end of the adjustment member 232 proximate the support bracket 152 may be fixed to the support bracket 152 for pivoting the support bracket 152 when the adjustment member 232 moves from the extended position toward the retracted position. Alternatively, in embodiments in which the yaw bar 224 includes a pair of adjustment members 232, each adjustment member 232 may alternatively contact and apply a force to the support bracket 152 to pivot the support bracket 152 in a respective direction when moving from the retracted position to the extended position. In embodiments, the at least one adjustment member 232 is configured to engage at least one of the side arms 214, 216 of the support bracket 152 to rotate the support bracket 152 and, thus, the printing head 154. In embodiments, one of the adjustment members 232 is a manual adjustment member, such as an adjustment screw, and the other adjustment member 232 is a biasing member, such as a spring. As such, only one adjustment member 232 is manually extended or retracted, and the other adjustment member 232 maintains a constant tension between the manual adjustment member 232 and the yaw bar 224. This eliminates the need to operate both adjustment members 232.

As discussed herein, the adjustment member 232 may be any suitable device for extending and retracting at least a portion thereof to pivot the support bracket 152, such as a differential adjuster, a retractable pin, a hex adjustment screw, a micrometer screw, or the like. In embodiments in which only a portion of the adjustment member 232 extends, the adjustment member 232 may include an extendable portion 234 and an adjustment portion 236 coupled to the extendable portion 234 for controlling the amount of extension and retraction of the extendable portion 234 relative to the adjustment portion 236 of the adjustment member 232. The adjustment member 232 may be manually operable or, in embodiments, may be operated by the control system 10.

As shown in FIG. 4, the at least one adjustment member 232 of the yaw bar 224 is configured to pivot the support bracket 152 about the pivot pin 226. The pivot pin 226 extends through the upper frame 213 and the linear traversing stage 212 and allows the upper frame 213 of the support bracket 152 to pivot relative to the linear traversing stage 212. At least one hole 238 is formed in the upper frame 213 and receives a restricting pin 240 extending through the upper frame 213 and the linear traversing stage 212. The diameter of the hole 238 formed in the upper frame 213 is larger than the diameter of the restricting pin 240 to allow for a limited amount of movement between the restricting pin 240 and the hole 238 in the upper frame 213 as the support bracket 152 pivots about the pivot pin 226. Any number of holes 238 are contemplated. As shown, a plurality of holes 238 are formed in the upper frame 213 with each hole 238 receiving a respective restricting pin 240. It should be appreciated that the degree of pivoting permitted is directly related to the difference between the diameter of the holes 238 formed in the upper frame 213 relative to the diameter of the restricting pins 240. Thus, in embodiments in which a greater degree of pivoting of the support bracket 152 and the housing 201 is desired, the size of the holes 238 formed in the upper frame 213 may be larger to allow for a greater range of motion between the restricting pins 240 and the holes 238. It should be appreciated that without the restricting pins 240, the support bracket 152 may be permitted to pivot to a point at which the side arms 214, 216 of the support bracket 152 contact the linear traversing stage 212 or the rail 104. However, doing so may result in damage to the side arms 214, 216, the linear traversing stage 212, and/or the rail 104. Thus, the restricting pins 240 limit pivoting of the support bracket 152 to a predetermined degree. In embodiments, the degree of maximum rotation of the support bracket 152 relative to the rail 104 is 20 degrees in either direction, or +/−20 degrees. In embodiments, the degree of maximum rotation of the support bracket 152 relative to the rail 104 is 10 degrees in either direction, or +/−10 degrees. In embodiments, the degree of maximum rotation of the support bracket 152 relative to the rail 104 is 5 degrees either direction, or +/−5 degrees. In embodiments, the degree of maximum rotation of the support bracket 152 relative to the rail 104 is 3 degrees in either direction, or +/−3 degrees. In embodiments, the degree of maximum rotation of the support bracket 152 relative to the rail 104 is 2 degrees in either direction, or +/−2 degrees.

As shown in FIG. 5, in embodiments, a clamp plate 242 is provided on an upper surface 221 of the upper frame 213 and is fixed to the restricting pins 240. Thus, contrary to the restricting pins 240 moving relative to the upper frame 213, as discussed herein, the clamp plate 242 does not move relative to the restricting pins 240. Instead, the clamp plate 242 provides a clamp load against the linear traversing stage 212 to maintain the position of the upper frame 213 in the +/−Z axis of the coordinate axes depicted in the figures on the linear traversing stage 212 and against the rail 104.

Figure 7:
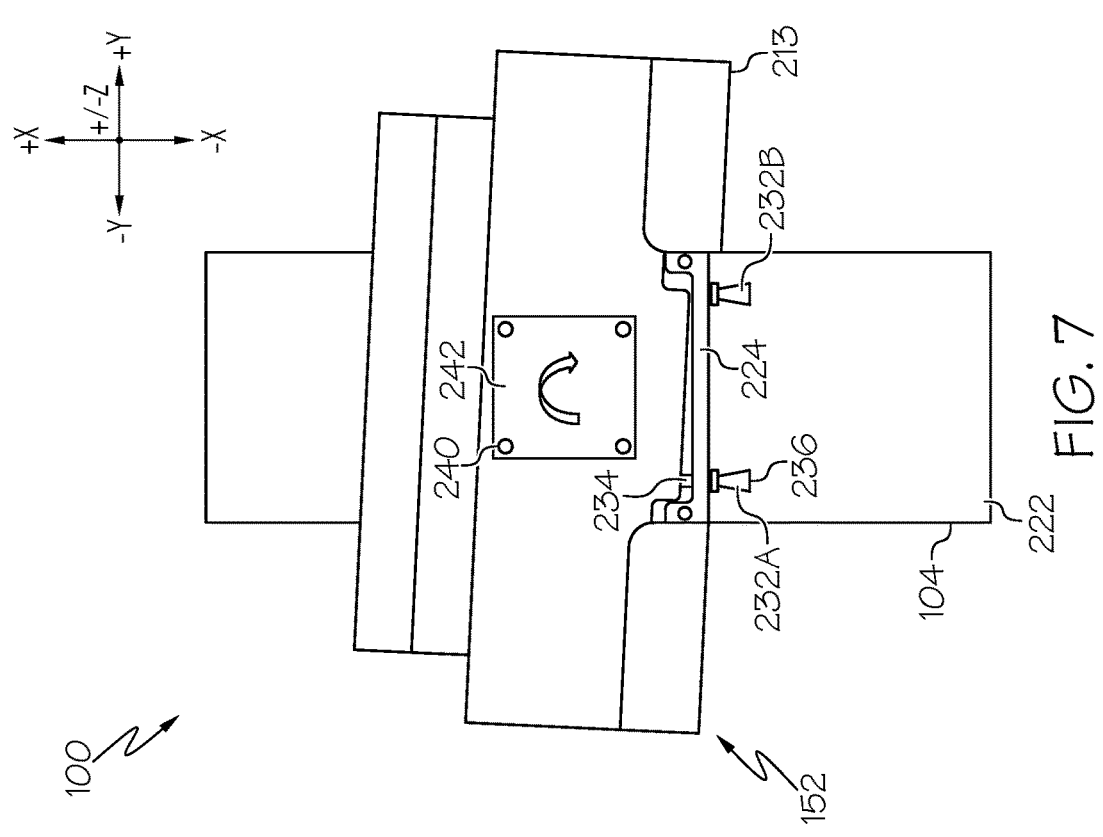
FIG. 7 schematically depicts a partial top view of the manufacturing apparatus with the printing assembly rotated in a second direction according to one or more embodiments shown and described herein.
Figure 6:
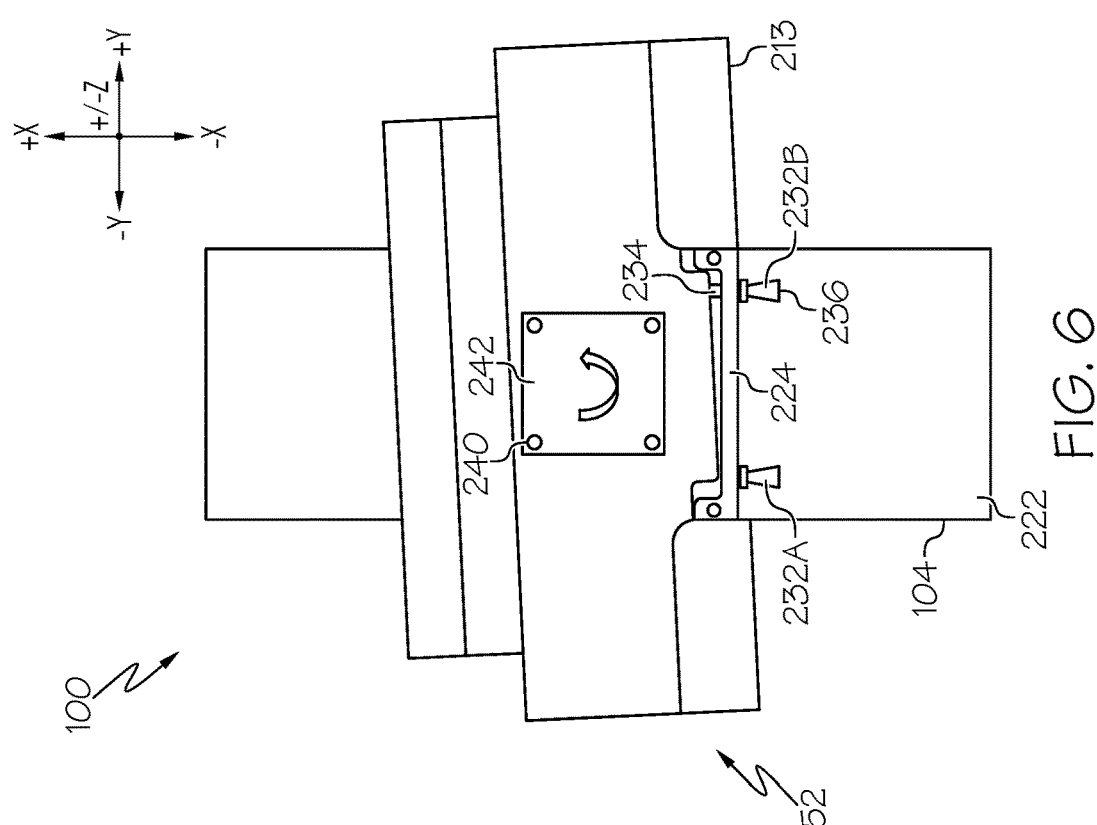
FIG. 6 schematically depicts a partial top view of the manufacturing apparatus with the printing assembly rotated in a first direction according to one or more embodiments shown and described herein.

Referring now to FIGS. 6 and 7, operation of the yaw bar 224 to pivot the support bracket 152 and the printing head 154 is illustrated. As shown, the yaw bar 224 includes a pair of adjustment members 232, which may individually be referred to as a first adjustment member 232A and a second adjustment member 232B. In embodiments, as discussed herein, each adjustment member 232 includes an extendable portion 234 and an adjustment portion 236 coupled to the extendable portion 234. The extendable portion 234 extends through the yaw bar 224 and is operable to extend and retract based on operation of the adjustment portion 236. To pivot the support bracket 152 in a first direction about the pivot pin 226, as shown in FIG. 6, the first adjustment member 232A is operated to move from the retracted position toward the extended position to pivot the support bracket 152 in the first direction about the pivot pin 226. In this instance, the second adjustment member 232B is either already in the retracted position or may be simultaneously moved toward the retracted position by the force of the upper frame 213 against the second adjustment member 232B. The support bracket 152 may be pivoted until the restricting pins 240 contact an edge of the holes 228 formed in the upper frame 213 to prevent further pivoting of the support bracket 152. Alternatively, to pivot the support bracket 152 in an opposite second direction about the pivot pin 226, as shown in FIG. 7, the second adjustment member 232B is operated to move from the retracted position toward the extended position to pivot the support bracket 152 in the second direction about the pivot pin 226. In this instance, the first adjustment member 232A is either already in the retracted position or may be simultaneously moved toward the retracted position by the force of the upper frame 213 against the first adjustment member 232A. Similarly, the support bracket 152 may be pivoted in the second direction until the restricting pins 240 contact an edge of the holes 238 formed in the upper frame 213 to prevent further pivoting of the support bracket 152.

It should be appreciated that by pivoting the support bracket 152 in the manner discussed herein, the position of each of the print heads 156 (FIG. 1) within the housing 201 of the printing assembly 150 may be adjusted as necessary to adjust the location of binder material being deposited from each print head 156. Accordingly, the position of the print heads 156 may be precisely controlled by the yaw bar 224 to improve print quality of the printing assembly 150 and control the deposition of binder material onto the build area 120.

General Printing Head Structure

Referring now to FIG. 8, the printing head 154 of the printing assembly 150 is illustrated as being positioned within the housing 201 of the printing assembly 150. The housing 201 is coupled to the side arms 214, 216 of the support bracket 152. As discussed herein, the housing 201 includes a top end 200, a print home side wall 204, a build side wall 206 opposing the print home side wall 204, and a pair of end walls 208, 210 extending between the print home side wall 204 and the build side wall 206. The housing 201 encases the components of the printing head 154 to provide protection from powder, fluid and other debris. This serves to improve the reliability of the printing head 154 and reduce the need for maintenance and servicing by protecting the internal components of the printing head 154. The print home side wall 204 is omitted in FIG. 8 to better illustrate the interior components of the printing assembly 150, such as the printing head 154, including the print heads 156, and the manifold assembly 160. As shown, the printing head 154 includes a plurality of print heads 156 in fluid communication with the manifold assembly 160 to facilitate delivery of binder material from the manifold assembly 160 to each of the print heads 156, and recycling of binder material from each of the print heads 156 back to the manifold assembly 160, as described in more detail herein. The printing head 154 also includes a base plate 202 positioned at a bottom end of the print heads 156 for receiving the print heads 156 therein.

The printing head 154 includes a first row of print heads 156 and a second row of print heads 156. In embodiments, the printing head 154 may include additional or fewer rows of print heads 156 than the embodiment shown in FIG. 8. For example, in embodiments, the printing head 154 of the printing assembly 150 may include one row of print heads 156 or three or more rows of print heads 156. Accordingly, it should be understood that the printing head 154 can include one or more rows of print heads 156, each having one or more print heads 156. Additionally, each of the first row and the second row can include greater or fewer print heads 156 than as shown. The print heads 156 each include a print head interface board 284 such as, for example, circuit boards, processors, memory, sensors, and the like, provided on a top surface 286 of the print heads 156 opposite the base plate 202 of the printing head 154.

Figure 9:
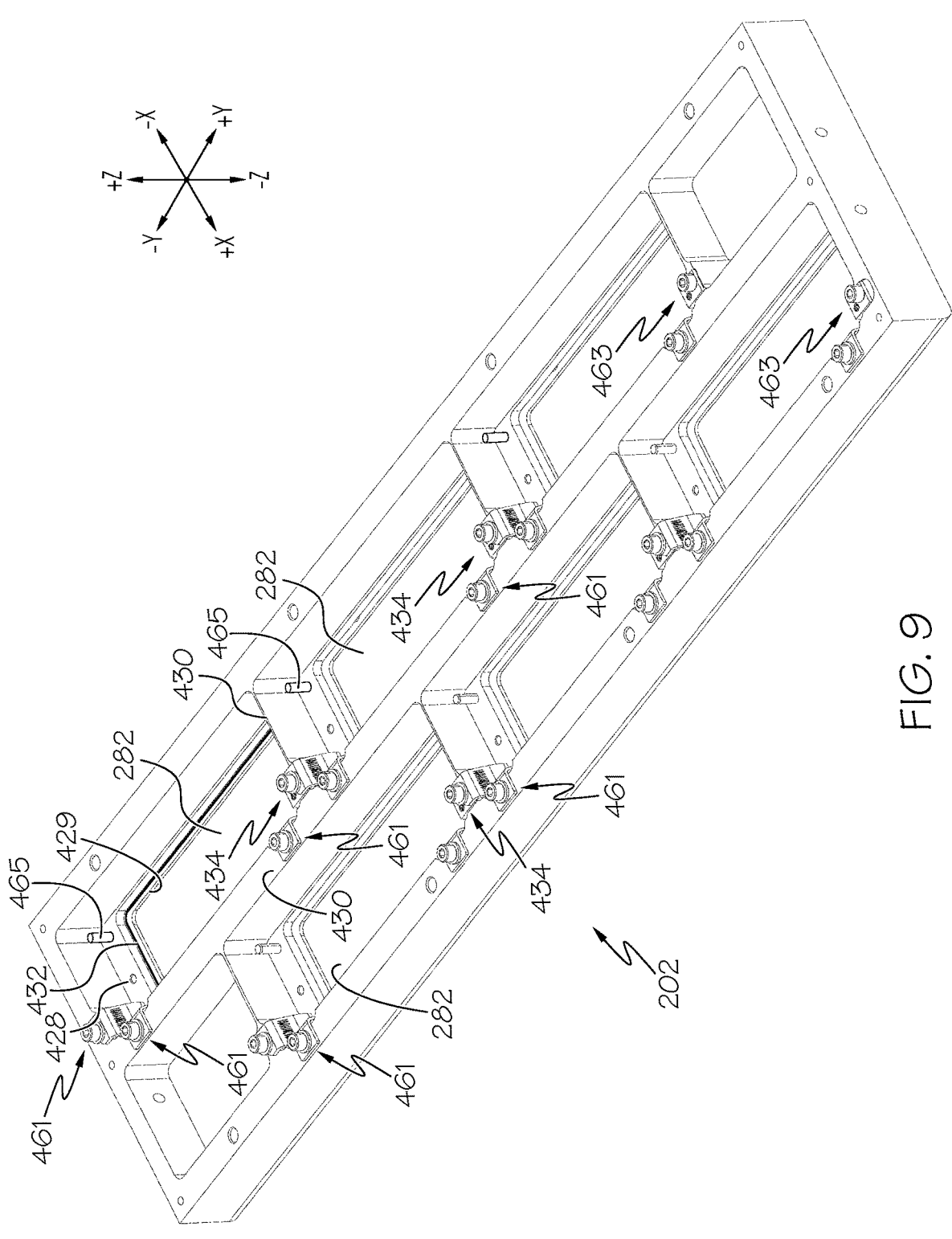
FIG. 9 schematically depicts a perspective view of a base plate of the printing assembly according to one or more embodiments shown and described herein.

As shown in FIGS. 8 and 9, the base plate 202 includes a plurality of openings 282, each of which is configured to receive a bottom end of a print head 156. In embodiments, the plurality of print heads 156 are aligned with the base plate 202 such that the bottom end of each print head 156 is flush with the base plate 202. In embodiments, the plurality of print heads 156 may be positioned offset relative to one another and, thus, the openings 282 formed in the base plate 202 are also offset so as to receive the print heads 156 therein.

Each opening 282 in the base plate 202 of the printing head 154 is defined by a lip 428 extending from separating walls 430 between each opening 282. Thus, each print head 156 is dimensioned to sit on the lip 428 and positioned within the separating walls 430 defining a respective opening 282. In embodiments, the lip 428 has a recess or groove 429 formed therein which receives a gasket 432 for creating a seal between the print head 156 and the lip 428. The seal limits the amount of binder material, build material, debris, and the like that may accumulate on the lip 428, thereby entering the print heads 156 and causing damage to the print head 156 or other components of the printing assembly 150. Although a gasket 432 is only illustrated on the lip 428 defining one of the openings 282, it should be appreciated that a gasket 432 may be provided on each lip 428 defining an associated opening 282. As described in more detail herein, a plurality of adjustment blocks 434 may be provided for adjusting a position of a print head 156 within a corresponding opening 282 of the base plate 202. The adjustment blocks 434 are provided to improve print quality of the printing assembly 150 by facilitating adjustment of the printing head 154 and precise control over the position of the print heads 156 relative to the base plate 202, and thus the build area 120.

General Manifold Assembly

Figure 10:
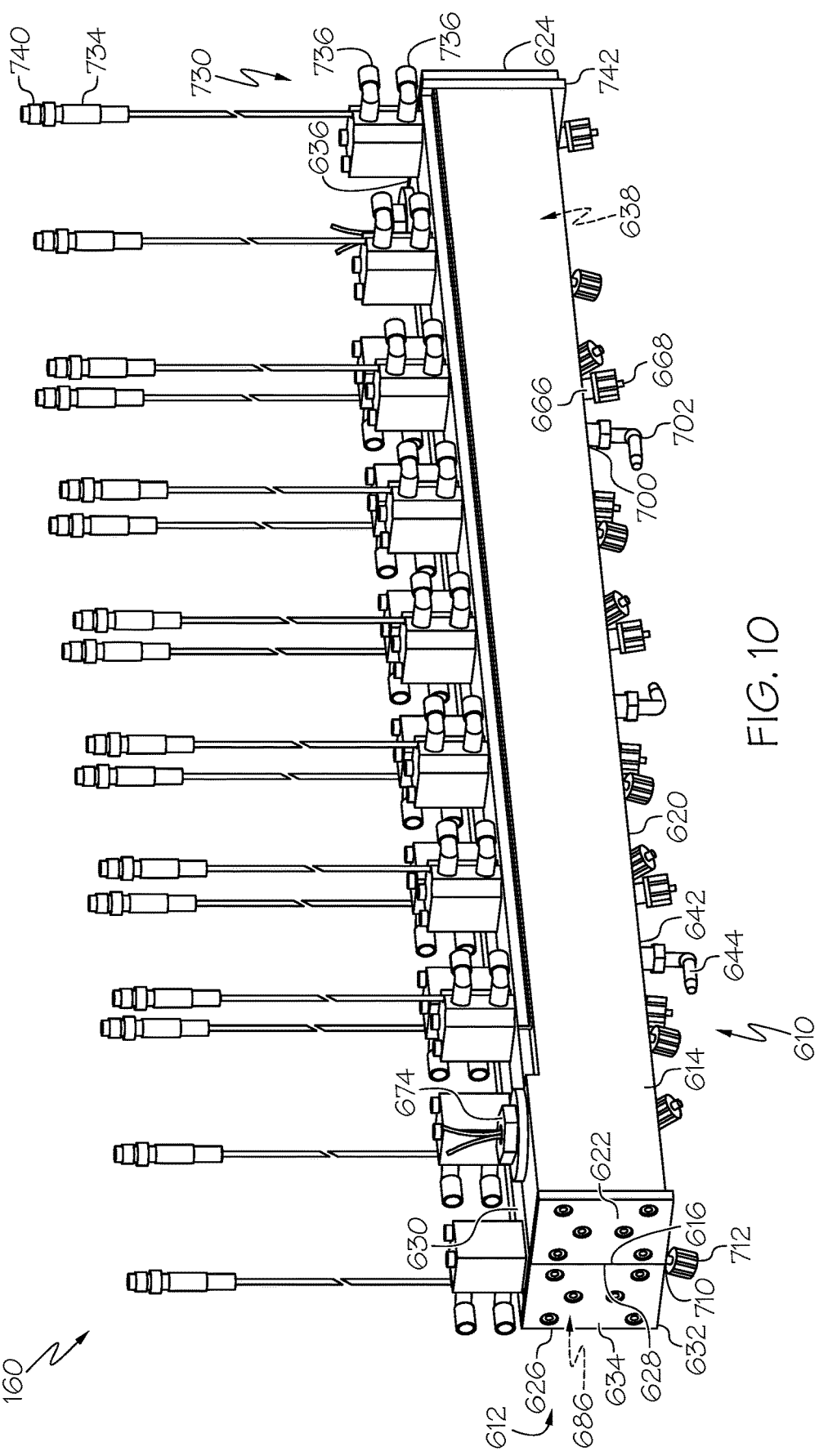
FIG. 10 schematically depicts a perspective view of a manifold assembly of the printing assembly according to one or more embodiments shown and described herein.
Figure 11:
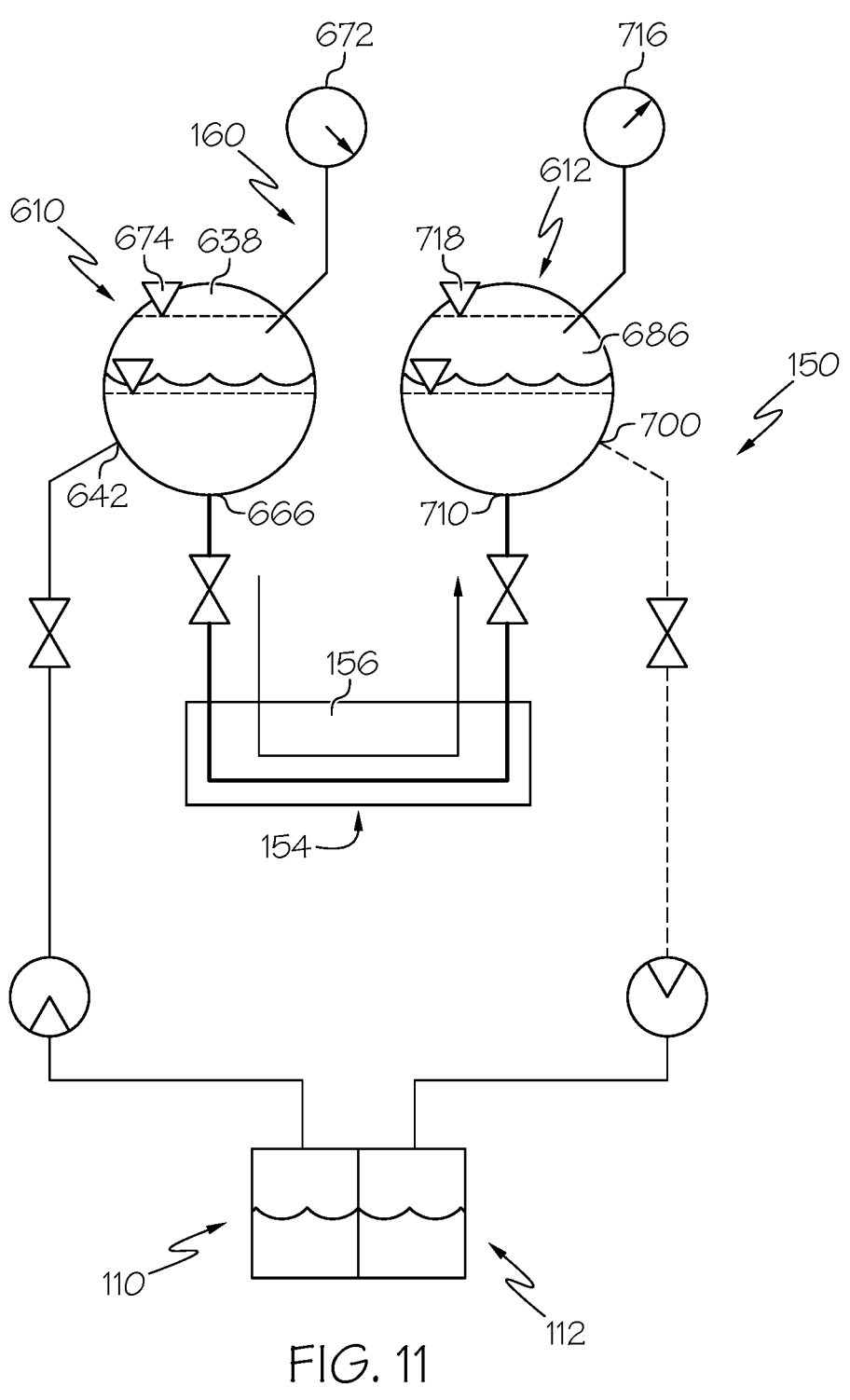
FIG. 11 schematically depicts a diagram of the printing assembly including the manifold assembly according to one or more embodiments shown and described herein.

Referring now to FIGS. 10 and 11, the manifold assembly 160 generally includes an inlet manifold 610 and an outlet manifold 612 provided within the housing 201. By providing the manifold assembly 160 within the housing 201 rather than outside of the housing 201, pressure fluctuations due to spatial separation between the print heads 156 and the manifold assembly 160 may be minimized. More specifically, in embodiments in which the printing head 154 indexes within the housing 201, the manifold assembly 160 is positionally fixed to the print heads 156 such that the manifold assembly 160 indexes with the print heads 156 within the housing 201. This serves to improve print quality by ensuring that a consistent amount of binder material is provided to the print heads 156 from the manifold assembly 160. The inlet manifold 610 includes a first wall 614, a second wall 616, a top wall 618, a bottom wall 620, and a pair of end walls 622, 624. Similarly, the outlet manifold 612 includes a first wall 626, a second wall 628, a top wall 630, a bottom wall 632, and a pair of end walls 634, 636. Each of the inlet manifold 610 and the outlet manifold 612 may be a substantially one-piece, monolithic structure, such as may be formed through additive manufacturing or injection molding having one or more common walls, or may be formed separately and then sealed together. In embodiments in which the inlet manifold 610 and the outlet manifold 612 are sealed to one another (e.g., each manifold 610, 612 includes its own first wall, second wall, and pair of end walls and has no walls in common), leaks between the inlet manifold 610 and the outlet manifold 612 may be minimized. Moreover, it is contemplated that, in some such embodiments, the inlet manifold 610 and the outlet manifold 612 may be separable from one another, thus allowing for either one of the inlet manifold 610 and the outlet manifold 612 to be replaced or repaired without manipulating the other of the inlet manifold 610 and the outlet manifold 612. However, it should be appreciated that, in embodiments, the inlet manifold 610 and the outlet manifold 612 may be permanently fixed to one another or formed from a single part. In some such embodiments, the inlet manifold 610 and the outlet manifold 612 may share a common wall that separates the inlet manifold 610 from the outlet manifold 612.

The inlet manifold 610 of the manifold assembly 160 generally includes an inlet reservoir 638 defined by the first wall 614, the second wall 616, the top wall 618, the bottom wall 620, and the pair of end walls 622, 624 of the inlet manifold 610. A supply port 642 is formed in the bottom wall 620 of the inlet manifold 610 and is in fluid communication with the inlet reservoir 638. A supply fitting 644 is coupled to the supply port 642. As used herein, the term "port" refers to an aperture or orifice formed through a surface or wall of a structure, and the term "fitting" refers to any suitable connecting member provided at the port and connectable to a tube or conduit line for placing the tube in fluid communication with an interior of the structure. The inlet manifold 610 also includes at least one inlet port 666 formed in the bottom wall 620 of the inlet manifold 610 in fluid communication with the inlet reservoir 638. An inlet fitting 668 is coupled to the inlet port 666. In embodiments, the inlet manifold 610 may include a plurality of inlet ports 666 formed in the bottom wall 620 of the inlet manifold 610 and in fluid communication with the inlet reservoir 638.

In use, binder material flows out of the inlet reservoir 638 through the inlet port 666 and the inlet fitting 668, and to a respective print head 156 via an inlet tube 306 (FIG. 8). An inlet fitting 668 may be coupled to each inlet port 666 and connected to a respective print head 156 via an associated inlet tube 306 for allowing binder material to flow from the inlet reservoir 638 to each of the print heads 156. To normalize and/or supply pressure within the inlet reservoir 638 and provide ventilation, an inlet vacuum 672 is provided in the top wall 618 of the inlet manifold 610 and in fluid communication with the inlet reservoir 638.

As shown in FIG. 10, in embodiments, the inlet manifold 610 also includes at least one fluid level float 674 provided within the inlet reservoir 638. As described in more detail herein, the at least one fluid level float 674 in the inlet manifold 610 is configured to sense a level of binder material within the inlet reservoir 638 and is configured to send a signal to the control system 10 of the manufacturing apparatus 100 to perform an action and/or alarm function when the level of binder material within the inlet reservoir 638 falls below or rises above a predetermined threshold. As a non-limiting example of an action or alarm function, the signal may instruct the printing assembly 150 to cease the printing or build operation for a predetermined period of time to permit recovery or maintenance.

Similar to the inlet manifold 610, the outlet manifold 612 includes an outlet reservoir 686 defined by the first wall 626, the second wall 628, the top wall 630, the bottom wall 632, and the pair of end walls 634, 636. The outlet reservoir 686 stores binder material received from the print heads 156. A return port 700 is formed in the bottom wall 632 of the outlet manifold 612 and in fluid communication with the outlet reservoir 686. A return fitting 702 is coupled to the return port 700. The outlet manifold 612 also includes at least one outlet port 710 formed in the bottom wall 632 of the outlet manifold 612 in fluid communication with the outlet reservoir 686. An outlet fitting 712 is coupled to the outlet port 710. In embodiments, the outlet manifold 612 may include a plurality of outlet ports 710 formed in the bottom wall 620 of the outlet manifold 612 and in fluid communication with the outlet reservoir 686.

In use, binder material flows from a respective print head 156 via an outlet tube 308 (FIG. 8) to the outlet reservoir 686 through the outlet port 710 and the outlet fitting 712. An outlet fitting 712 may be coupled to each outlet port 710 and connected to a respective print head 156 via an associated outlet tube 308 for allowing binder material to flow from the outlet reservoir 686 to each of the print heads 156. To normalize and/or supply pressure within the inlet reservoir 638 and provide ventilation, an outlet vacuum 716 is provided in the top wall 618 of the outlet manifold 612, as shown in FIG. 11, and in fluid communication with the outlet reservoir 686.

The inlet vacuum 672 and the outlet vacuum 716 generate a pressure differential between the inlet manifold 610 and the outlet manifold 612 to control the flow of binder material to and from each of the print heads 156 through the inlet ports 666 and the outlet ports 710. In some embodiments, during a normal operation, a normal pressure differential between the inlet manifold 610 and the outlet manifold 612 may be from greater than −1.0 pounds per square inch (psi) to less than or equal to 0.0 psi. This provides a negative pressure within the inlet manifold 610 and the outlet manifold 612 to create a vacuum. During a purging or de-clogging operation to de-clog a clogged print head 156, a purging pressure differential between the inlet manifold 610 and the outlet manifold 612 may be increased from the normal pressure differential. In some embodiments, the purging pressure differential may be up to 2.0 psi or greater. However, the particular pressure differentials may vary depending on the particular embodiment.

Similar to the inlet manifold 610, the outlet manifold 612 may include at least one fluid level float 718, as depicted in FIG. 11, provided within the outlet reservoir 686. The at least one fluid level float 718 in the outlet manifold 612 is configured to sense a level of binder material within the outlet reservoir 686 and is configured to send a signal to the control system 10 of the manufacturing apparatus 100 to perform an action an/or alarm function when the level of binder material within the outlet reservoir 686 falls below or rises above a predetermined threshold. The fluid level float 674 in the inlet manifold 610 and the fluid level float 718 in the outlet manifold 612 may be, for example, an optical device, an ultrasonic device, or the like. Further, it should be noted that the fluid level within each of the inlet manifold 610 and the outlet manifold 612 may, in addition to or in lieu of the fluid level floats 674,718, be monitored by an external sensor such as, for example, an optical device, ultrasonic device, or the like, and communicatively coupled to the control system 10.

As shown in FIG. 10, the manifold assembly 160 includes at least one valve 730 operable between an open position for permitting or controlling the flow of binder material through a portion of the manifold assembly 160, and a closed position for preventing the flow of binder material through a portion of the manifold assembly 160. As used herein the term "control" when referring to a valve controlling a flow of binder material may be understood as permitting and/or preventing the flow of binder material. Further, in embodiments, controlling the flow of binder material may refer to reducing and/or increasing a flow rate or volume of binder material. It should be appreciated that any number of valves 730 may be provided to selectively and individually permit the flow of binder material both in and out of ports of the inlet reservoir 638 and the outlet reservoir 786. In various embodiments described herein, the at least one valve 730 is provided within the manifold assembly 160.

As shown in FIG. 10, the inlet manifold 610 includes at least one valve 730 associated with a respective inlet port 666 for permitting the flow of binder material from the inlet reservoir 638 to a respective print head 156 through the inlet port 666. In embodiments, the inlet manifold 610 includes a valve 730 associated with each one of the plurality of inlet ports 666. The outlet manifold 612 also includes at least one valve 730 associated with a respective outlet port 710. In embodiments, the outlet manifold 612 includes a valve 730 associated with each one of the plurality of outlet ports 710.

The valve 730 may be configured in any one of a number of valve configurations. As shown in FIG. 10, the valve 730 generally includes a receptacle 732 and a plunger 734 received within the receptacle 732. In embodiments, the valve 730 is a pneumatic actuator including a pair of pressure ports 736, wherein a first of the pressure ports 736 is utilized for pneumatically moving the plunger 734 to a raised position, and a second of the pressure ports 736 is utilized for pneumatically moving the plunger 734 to a lowered position. In embodiments, the valve 730 is an electric actuator. When the valve 730 is in the open position, the plunger 734 is moved toward the raised position and away from an associated port to allow for binder material to flow through the port. When the valve 730 is in the closed position, the plunger 734 is moved toward the lowered position and toward an associated port to prevent binder material from flowing through the associated port. In other embodiments, the plunger 734 may be operated electronically by the control system 10 without the pair of pressure ports 736. The control system 10 may electronically operate the plunger 734 by sending a signal to cause the plunger 734 to move toward or away from a respective port, as discussed herein. In some embodiments, the valve 730 includes a proximity sensor 740 to determine whether the valve 730 is in the open position or the closed position by sensing whether the plunger 734 is in the raised position or the lowered position, respectively.

Alternatively, the valve 730 may be controlled by the control system 10 to position the valve 730 a controlled amount between the open position and the closed position. It should be appreciated that the plunger 734 of the valve 730 is provided within the inlet manifold 610 and the outlet manifold 612 and movable therein to open and close a corresponding port. However, the receptacle 732 is provided on an exterior of the inlet manifold 610 and the outlet manifold 612. Thus, the valves 730 may be accessed for purposes of repair or maintenance by removing the receptacle 732 to access the plunger 734.

The valves 730 are suitable for facilitating purging and/or de-clogging a print head 156 of the printing head 154 when at least one of the nozzles of an associated print head 156 are at least partially clogged with binder material. When a nozzle of a print head 156 is at least partially clogged with binder material, this can result in printing irregularities and unequal distribution of binder material onto a build area relative to the other print heads 156 that are not clogged.

As a non-limiting example, to unclog a print head 156 of the printing head 154 during a purging or de-clogging operation, the valve 730 associated with the inlet port 666 of the clogged print head 156 is positioned to the open position. Similarly, the valve 730 associated with the outlet port 710 of the clogged print head 156 may be positioned to the open position. In embodiments, each of the valves 730 associated with the other inlet ports 666 and outlet ports 710 of the other print heads 156 that are not clogged may be positioned to the closed position. Thereafter, a pressure differential between the inlet manifold 610 and the outlet manifold 612 resulting from operation of the inlet vacuum 672 of the inlet manifold 610 and the outlet vacuum 716 of the outlet manifold 612 is increased from a normal pressure differential to a purging pressure differential. In some embodiments, as discussed herein, a normal pressure differential during normal operation of the printing head 154 with all of the valves 730 in the open position is from greater than −1.0 psi to less than or equal to 0.0 psi. In some embodiments, during a purging or de-clogging operation, the purging pressure differential is up to 2.0 psi. Thus, as the inlet vacuum 672 and the outlet vacuum 716 increase the pressure differential between the inlet manifold 610 and the outlet manifold 612 and binder material is provided into the inlet reservoir 638 from the pressurized supply reservoir 110, the binder material is directed through only the inlet port 666 and the outlet port 710 that are in the open position, i.e., the inlet port 666 and the outlet port 710 associated with the clogged print head 156. This focuses the pressure to the inlet port 666 with the valve 730 that is in the open position. As such, that inlet port 666 and, thus, the associated print head 156, receive an increased amount of pressure relative to the amount of pressure received when each of the valves 730 at the inlet ports 666 are in the open position.

It should be appreciated that any combination of print heads 156 may be subjected to this de-clogging process by positioning some of the valves 730 to the open position and positioning other valves 730 to the closed position. For example, some of the print heads 156 may be simultaneously subjected to this de-clogging process by opening only the valves 730 of the inlet ports 666 and the outlet ports 710 associated with the print heads 156 to be de-clogged. However, it should be appreciated that the more valves 730 that are opened, the less the pressure will be flowing through each of the associated inlet ports 666, unless the overall pressure differential within the manifold assembly 160 is increased to compensate for the decrease in pressure.

Referring again to FIG. 10, in embodiments, the manifold assembly 160 may include a holding bracket 742 for securing the inlet manifold 610 and the outlet manifold 612 in a fixed position relative to the housing 201, as the holding bracket 742 is mounted to the housing 201. Thus, the holding bracket 742 prevents the inlet manifold 610 and the outlet manifold 612 from separating with respect to one another when the holding bracket 742 is utilized. Additional information on manifold assemblies in manufacturing apparatuses can be found in U.S. application Ser. No. 18/032, 263, filed on Oct. 18, 2021, and entitled "Printing Assemblies And Methods For Using The Same," the entirety of which is hereby incorporated by reference. As noted above, by providing the manifold assembly 160 within the housing 201, pressure fluctuations of binder material between the manifold assembly 160 and the print heads 156 may be minimized. This serves to improve print quality of the printing assembly.

Track Roller Support

Referring again to FIG. 8, a track 288 is fixed to an underside 290 of the top end 200 of the housing 201 proximate the manifold assembly 160. The track 288 includes a groove 292 formed therein. At least one roller bar 294 extends from the base plate 202 of the printing head 154 and includes a wheel 296 at an opposite end of the roller bar 294. In embodiments, the wheel 296 of the roller bar 294 engages the groove 292 of the track 288 and passively supports movement of the printing head 154 and, thus, the print heads 156, between end walls 208, 210 of the housing 201, i.e., in the +/−Y axis of the coordinate axes depicted in the figures. As shown, the printing head 154 includes a pair of roller bars 294 extending from the base plate 202 of the printing head 154 and engaging the groove 292 in the track 288. In addition, a roller bar joint 298 couples the pair of roller bars 294 to one another to maintain fixed spatial separation between the roller bars 294. It should be appreciated that, in embodiments, the wheel 296 and the track 288 may be a rack and pinion gear, or any other suitable mechanism for facilitating the wheel 296 traversing the track 288. In embodiments, the wheel 296 of each roller bar 294 may be controlled by the control system so that the position of the printing head 154 may be adjusted relative to the housing 201 during use of the printing assembly 150. Alternatively, an actuator (not shown) may be utilized to move or index the printing head 154 by operating the wheels 296 or controlling movement the printing head 154 in some other manner, and the roller bars 294 stabilize movement of the printing head 154.

Bellows

Figure 12:
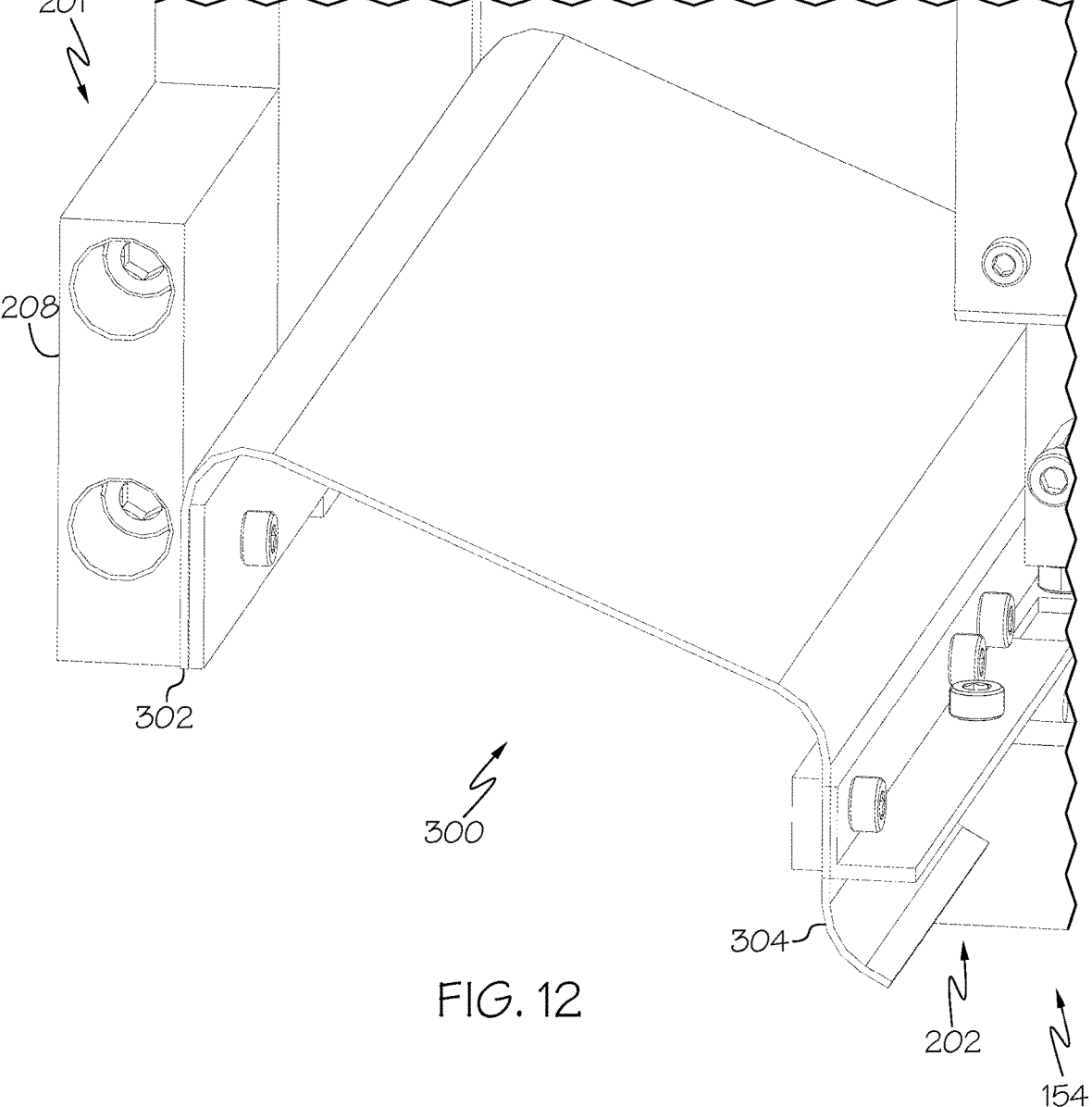
FIG. 12 schematically depicts a bellows provided between the base plate and a housing of the printing assembly according to one or more embodiments shown and described herein.

As shown in FIGS. 8 and 12, a bellows 300 is provided between the base plate 202 of the printing head 154 and each end wall 208, 210 of the housing 201 to prevent material, such as binder material, build material, or any other jettable material or debris) from entering the printing head 154 and contaminating the components provided therein. It should also be appreciated that a positive air pressure within the housing 201 of the printing assembly 150, in combination with the bellows 300, further prevents contaminants from entering the housing 201. The bellows 300 has a first end 302 fixed to one of the end walls 208, 210 of the housing 201 and a second end 304 fixed to the base plate 202 of the printing head 154. The bellows 300 is formed from any suitable, flexible material such that the bellows 300 deforms or bends to account for changes in distance between the end walls 208, 210 and the base plate 202 as the printing head 154 indexes between the end walls 208, 210 of the housing 201. The bellows 300 has a width extending between the print home side wall 204 and the build side wall 206 to eliminate any open space for material to enter the printing head 154.

Print Head Adjustment Blocks

Figure 13:
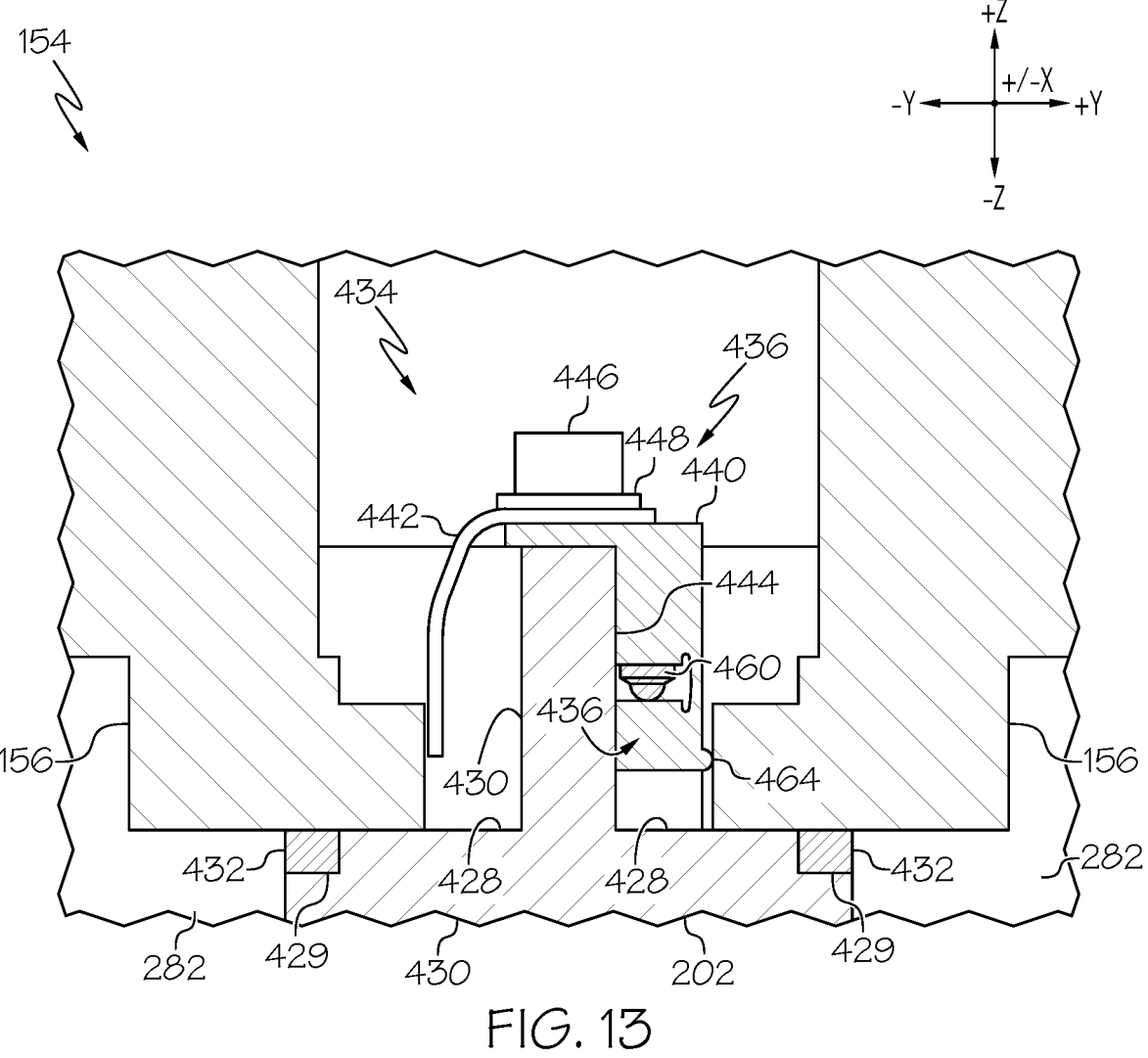
FIG. 13 schematically depicts a partial side view of a base plate of the printing head and an adjustment block according to one or more embodiments shown and described herein.
Figure 14:
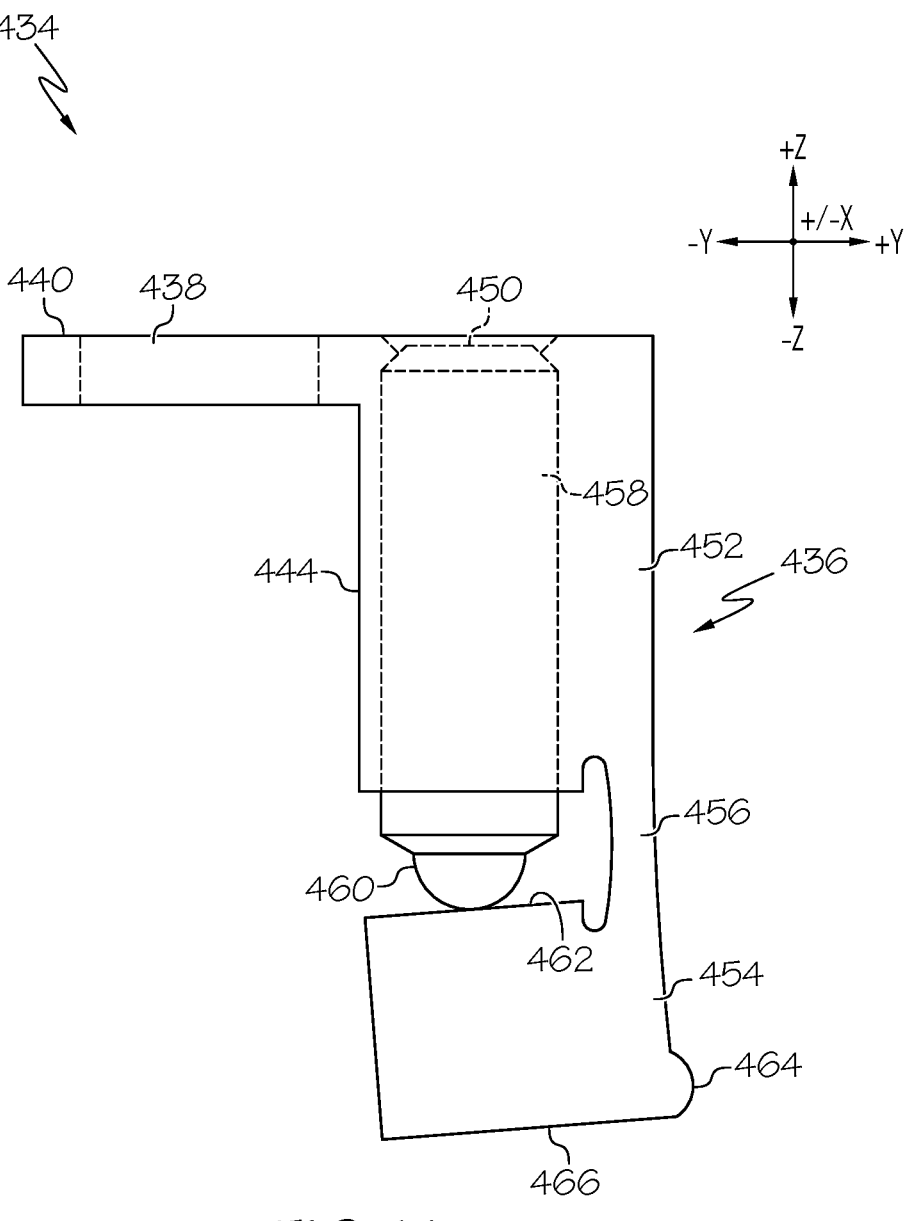
FIG. 14 schematically depicts a partial side view of the adjustment block according to one or more embodiments shown and described herein.

Referring to FIG. 8, in embodiments, the position of the print heads 156 is individually adjustable to move within each opening 282 of the base plate 202 and between the end walls 208, 210 of the printing head 154, i.e., in the +/−Y axis of the coordinate axes depicted in the figures. In this embodiment, an adjustment block 434, as shown in FIGS. 9, 13, and 14, is positioned on the separating wall 430 between two adjacent openings 282 and between two adjacent print heads 156, as well as outer walls of the base plate 202 defining a single opening 282. As discussed above, the adjustment blocks 434 are provided for adjusting a position of a print head 156 within a corresponding opening 282 of the base plate 202. It should also be appreciated that the adjustment blocks 434 are provided for purposes of aligning each print head 156 relative to one another within the base plate 202 to provide precise jetting performance. The adjustment blocks 434 improve print quality of the printing assembly 150 by facilitating adjustment of the printing head 154 and precise control over the position of the print heads 156 relative to the base plate 202, and thus the build area 120. More particularly, in embodiments, the adjustment block 434 includes a body member 436 having a first hole 438 formed in a top wall 440 thereof, and a biasing member 442 positioned over the first hole 438 and angularly extending along a first side 444 of the body member 436. The biasing member 442 may be, as a non-limiting example, a spring, resilient member, or the like. A locking pin 446 threadedly engages the first hole 438 and secures the biasing member 442 to the top wall 440 of the body member 436 and a washer 448 is provided between the locking pin 446 and the biasing member 442. The adjustment block 434 also includes a second hole 450 formed in top wall 440 thereof and extends through a portion of the body member 436. The body member 436 has a fixed portion 452 and a movable portion 454 connected to the fixed portion 452 by a hinge 456. The hinge 456 allows the movable portion 454 to move between an initial, unflexed position and a flexed position. The second hole 450 extends through the fixed portion 452, but does not extend through the movable portion 454. An adjustment screw 458 threadedly engages the second hole 450 to extend through the fixed portion 452 and toward the movable portion 454 of the body member 436.

As shown in FIG. 14, a partially transparent view of the adjustment block 434 is shown including the adjustment screw 458 extending through the second hole 450 and through the fixed portion 452 of the body member 436 to contact the movable portion 454. The position of the adjustment screw 458 through the second hole 450 and, thus, through the fixed portion 452 of the adjustment screw 458 may be adjusted by rotating the adjustment screw 458 in a first direction and an opposite second direction. As the adjustment screw 458 is rotated and moves in a first direction through the fixed portion 452 of the body member 436, an end 460 of the adjustment screw 458 comes into contact with a top surface 462 of the movable portion 454. As the adjustment screw 458 continues to extend into the fixed portion 452, the adjustment screw 458 applies a force against the top surface 462 of the movable portion 454 and the hinge 456 allows the movable portion 454 to bend or flex outwardly (i.e., in the +Y direction of the coordinate axes) relative to the fixed portion 452 from the unflexed position to the flexed position. In embodiments, the movable portion 454 has a nub 464 formed proximate a lower surface 466 thereof and extending in the +Y direction of the coordinate axes.

As shown in FIG. 13, and with reference to the adjustment screw 458 in FIG. 14, the adjustment block 434 is shown positioned on the separating wall 430 between two adjacent print heads 156 in the first print head row 155. The top wall 440 of the body member 436 is partially seated on the separating wall 430 with the fixed portion 452 and the movable portion 454 of the body member 436 extending along a side of the separating wall 430 proximate a print head 156 to be moved within an opening 282. The body member 436 is removably fixed to the separating wall 430 by the locking pin 446, which extends through the first hole 438 of the body member 436 and into the separating wall 430. As shown, the biasing member 442 is positioned on a side of the separating wall 430 opposite the fixed portion 452. As shown in FIG. 13, the biasing member 442 is configured to bias against a bottom end of the print head 156. The biasing member 442 applies a force against the print head 156 in the —Y direction of the coordinate axes to counteract the force applied by an adjustment block 434 on an opposite side of the print head 156, as described herein.

To index an individual print head 156 toward the +Y direction of the coordinate axes, the adjustment screw 458 is rotated to extend the adjustment screw 458 into the fixed portion 452 and contact the top surface 462 of the movable portion 454. Continued rotation of the adjustment screw 458 causes the end 460 of the adjustment screw 458 to push the movable portion 454 and pivot the movable portion 454 outwardly about the hinge 456 relative to the fixed portion 452. The pivoting of the movable portion 454 causes the movable portion 454, specifically the nub 464, as shown in FIG. 13, to contact a portion of the print head 156. As the movable portion 454 applies a force against the print head 156, the print head 156 is indexed within the respective opening 282 in the +Y direction of the coordinate axes.

To return the print head 156 to the original position and index the print head 156 back in the —Y direction of the coordinate axes, the adjustment screw 458 is rotated in the opposite second direction to cause the adjustment screw 458 to move in an opposite direction within the fixed portion 452 and retract out of the second hole 450. Due to the force applied by the biasing member 442 of an adjustment block 434 positioned at an opposite end of the print head 156, as discussed herein, the print head 156 is indexed back to its original position within the opening 282. Thus, the print quality of the printing assembly 150 may be improved by precisely positioning the print heads 156 relative to the base plate 202 to control deposition of binder material during operation.

As described herein, the adjustment block 434 includes the biasing member 442 and the adjustment screw 458 each provided within or coupled to the body member 436, which is mounted onto a separating wall 430 between two adjacent openings 282 configured to receive a print head 156 therein. As such the biasing member 442 and the adjustment screw 458 each extends along opposite sides of the separating wall 430 facing an adjacent print head 156 when positioned within the openings 282. However, in embodiments, the biasing member 442 and the adjustment screw 458 each have their own corresponding body member 436 such that the biasing member 442 and the adjustment screw 458 may be separately seated on the separating walls 430, rather than being a unitary adjustment block 434. A biasing member 442 including a body member 436 without an adjustment screw 458 may be referred to herein as a biasing block 461, and an adjustment screw 458 on a body member 436 without a biasing member 442 may be referred to herein as a screw block 463.

Each opening 282 in the base plate 202 includes a biasing member 442 positioned at one end of the opening 282 and an adjustment screw 458 positioned at an opposite end of the opening 282. Thus, when the adjustment screw 458 is operated and the print head 156 positioned within the opening 282 is translated in the +/−Y axis, the print head 156 biases against the biasing member 442 to maintain the position of the print head 156. Thus, in locations in which there are not two print heads 156 adjacent one another in the same row, either a biasing member 442 or an adjustment 458 may be provided without the other. For example, a biasing block 461 may be positioned on a separating wall 430, or an outer perimeter wall of the base plate 202, opposite an adjustment screw 458, and a screw block 463 may be positioned on a separating wall, or an outer perimeter wall of the base plate 202, opposite a biasing member 442.

Although not illustrated herein, it should be appreciated that an adjustment block 434, a biasing block 461, and/or a screw block 463 may also be positioned on the separating wall 430 or an outer perimeter wall of the base plate 202, which extends in the +/−Y axis, for positioning the print heads 156 in the +/−X axis. As shown, a plurality of biasing blocks 461 are positioned on the separating wall 430 and the outer perimeter wall, which extends in the +/−Y axis. Further, a plurality of dowel pins 465 extend from the lip 428 opposite an associated biasing block 461. Thus, the print heads 156 are positioned between the biasing blocks 461 and the dowel pins 465 and the biasing blocks 461 apply a biasing force against the print heads 156 toward the dowel pins 465 to position the print heads 156 in the +/−X axis.

Powder Plow

Figure 15:
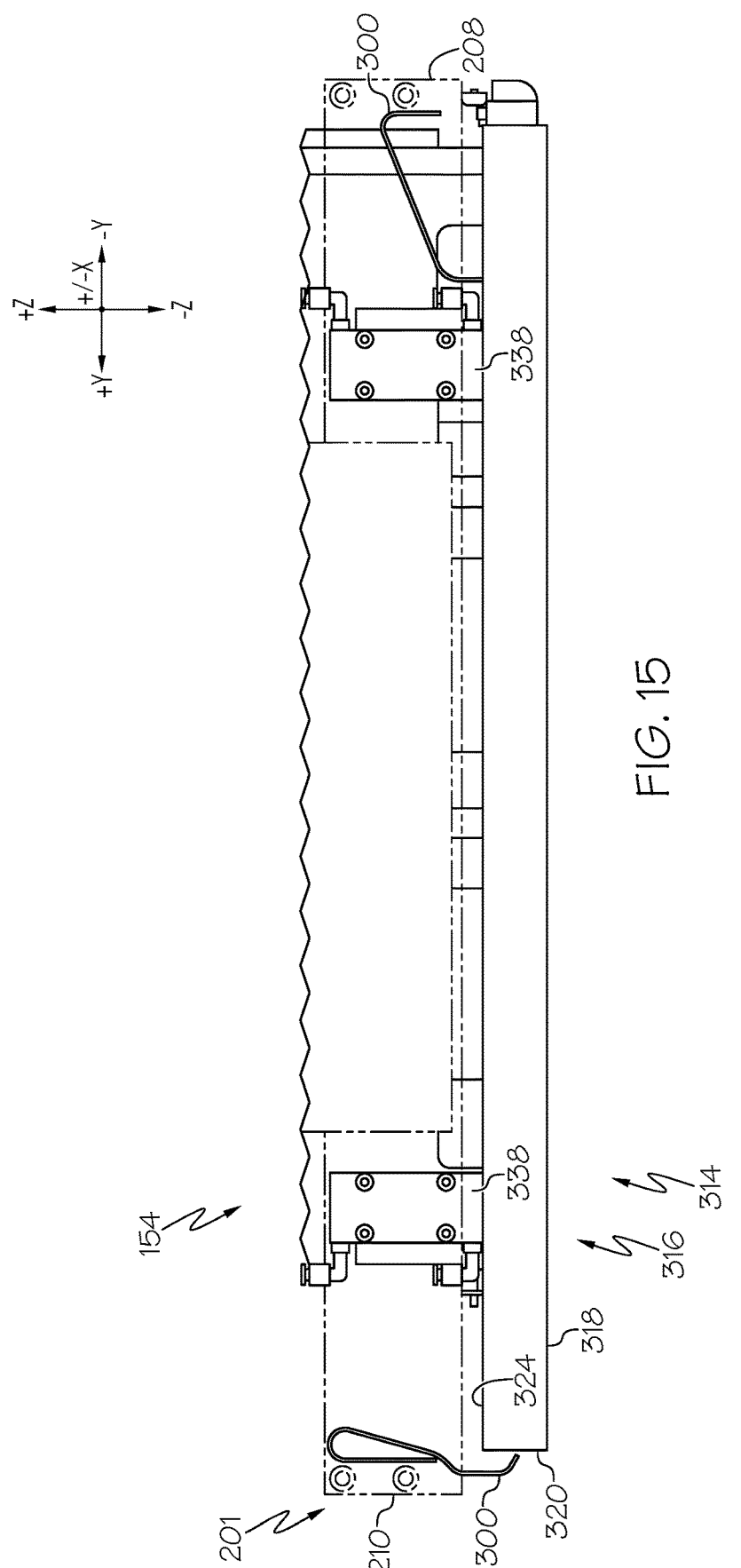
FIG. 15 schematically depicts a partial side view of the printing assembly including a powder plow assembly according to one or more embodiments shown and described herein.

Referring now to FIGS. 15-19, in embodiments, a partial view of the printing assembly 150 is shown including a powder plow assembly 314 mounted to a mounting frame 315 (FIGS. 18 and 19) within the housing 201 and on the build side wall 206 thereof. Although not described in detail herein, an indexing stage may be movably mounted to the mounting frame 315 at the build side wall 206 of the housing 201. The printing head 154 may be mounted to the indexing stage such that the indexing stage translates relative to the mounting frame 315 to move the printing head 154 between opposite ends 208, 210 of the housing 201. However, in embodiments, the powder plow assembly 314 is fixed to the mounting frame 315 directly and, thus, does not index between the housing 201 with of the indexing stage and the printing head 154. The powder plow assembly 314 minimizes external material (i.e., build material, binder material, debris, or any other jettable material) from contacting a bottom or nozzle surface of the print heads 156 as the printing assembly 150 moves across the build area 120 along the working axis 116. Further, in embodiments, the powder plow assembly 314 prevents external material from entering the printing head 154 and contaminating the print heads 156. This improves reliability and print quality of the printing assembly 150 by preventing contamination of the print heads 156 and other internal components of the printing assembly 150. In embodiments, the powder plow assembly 314 may be configured to push external material or debris away from the printing assembly 150 as the printing assembly 150 moves across the build area 120 along the working axis 116 in the +X direction of the coordinate axes depicted in the drawings. As such, the powder plow assembly 314 provides a barrier to contamination to the printing assembly 150. As shown in FIG. 15, the powder plow assembly 314 includes a powder plow 316 having a lower end 318 extending past the base plate 202 of the printing head 154 proximate the build side wall 206 of the housing 201 when in a lowered position. However, the powder plow 316 should only be lowered to contact an excess buildup of external material or debris on a surface of a powder bed, not a completed recoat powder layer ready for binder material. Although the powder plow 316 is shown as only being located proximate the build side wall 206, it should be appreciated that, in embodiments, a second powder plow assembly may be provided proximate the print home side wall 204 as well. As the powder plow assembly 314 is described herein as being operable between a lowered position and a raised position, it should be appreciated that, in some embodiments, the powder plow assembly 314 may be stationary.

Figures 16, 17:
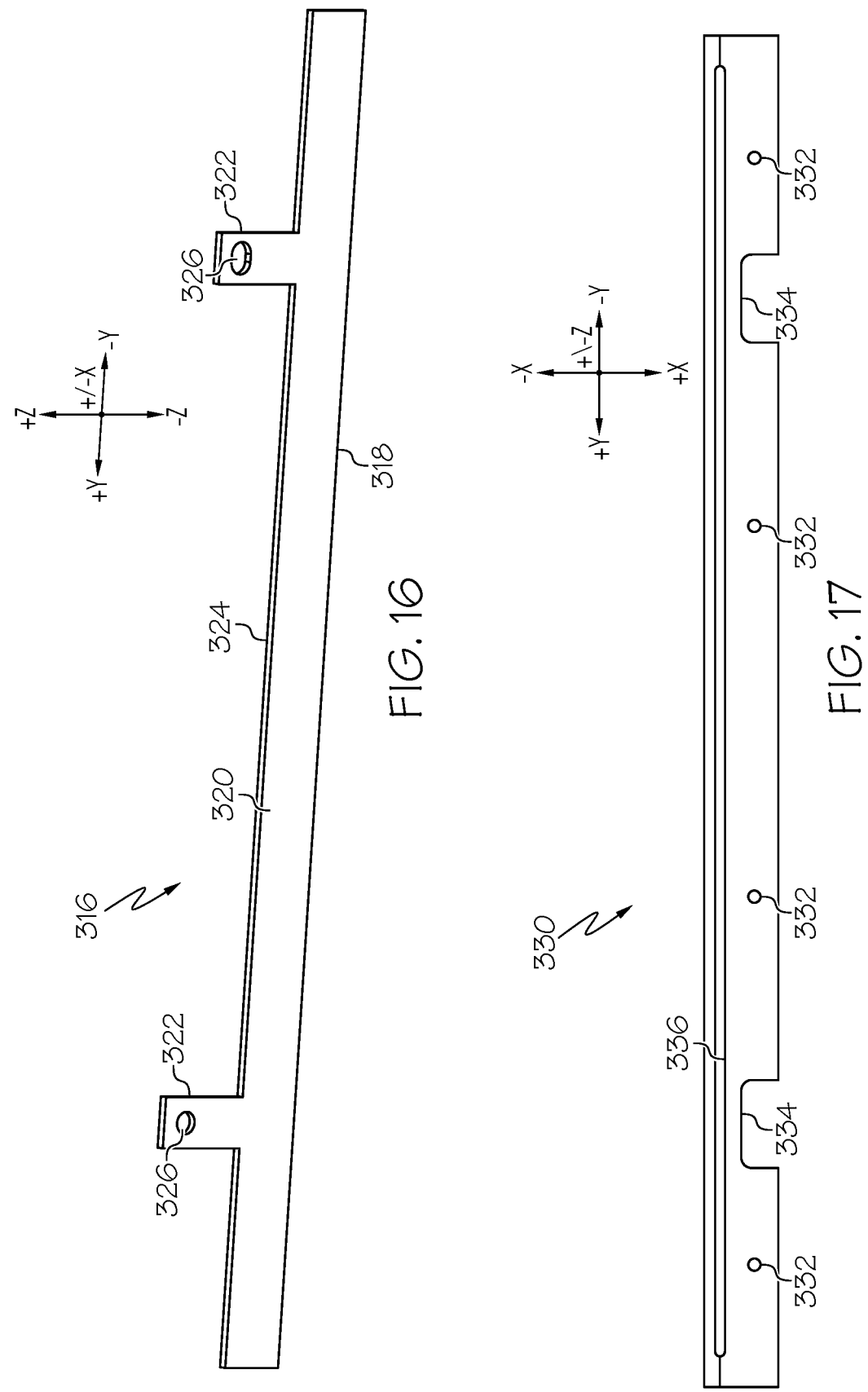
FIG. 16 schematically depicts a perspective view of a powder plow of the powder plow assembly according to one or more embodiments shown and described herein.
FIG. 17 schematically depicts a perspective view of a plow guide of the powder plow assembly according to one or more embodiments shown and described herein.

As shown in FIG. 16, the powder plow 316 includes an elongated member 320 and at least one extension 322 extending from an upper edge 324 of the elongated member 320. In embodiments, the extension 322 includes a hole 326 for receiving a fastener 328 (FIG. 18) for coupling the powder plow 316 to the mounting frame 315. The fastener 328 can be, as a non-limiting example, a screw, bolt, rivet, or the like. As shown, the powder plow 316 includes a pair of extensions 322, each having a hole 326 for receiving a fastener 328 to couple the powder plow 316 to the mounting frame 315. In embodiments, the powder plow 316 may be formed from any suitable non-stick material. In embodiments, the powder plow 316 may include a non-stick coating provided on an exterior surface of the powder plow 316. In any event, the non-stick material comprising the powder plow 316 or the non-stick coating provides a wear resistant low coefficient of friction between the powder plow 316 and the plow guide 330. In embodiments, the coefficient of friction is equal to or less than 0.4. In embodiments, the coefficient of friction is equal to or less than 0.2. In embodiments, the coefficient of friction is equal to or less than 0.1. As a non-limiting example, the powder plow 316 may be formed from electroless nickel with co-deposited polytetrafluoroethylene (PTFE) or may be electropolished. By forming the powder plow 316 from a material having a low coefficient of friction coating, it is ensures that minimal build material remains on the powder plow 316 after each pass over the build area 120 and, thus, is not carried to other locations of the manufacturing apparatus 100. As shown, the lower end 318 of the powder plow 316 is flat to push build material and debris away from the print heads 156 and reduce a height of any material or debris that may exist below the print heads 156 to permit the print heads 156 to clear the build material or debris without contact, thereby preventing damage to the print heads 156. However, in other embodiments of the powder plow 316, the lower end 318 may have any suitable geometry such as, for example, v-shaped, curved, or the like.

Figure 19:
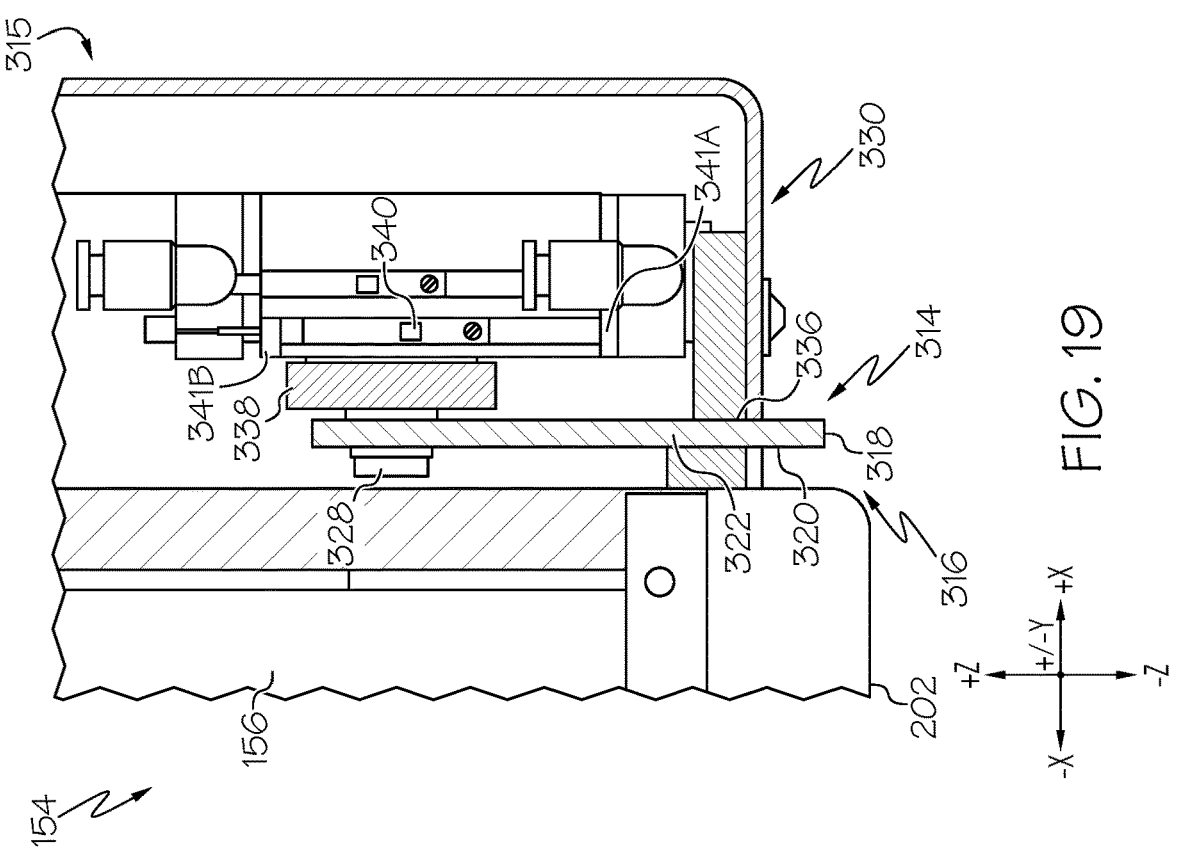
FIG. 19 schematically depicts a partial end view of the printing head showing the powder plow assembly in a raised position according to one or more embodiments shown and described herein.
Figure 18:
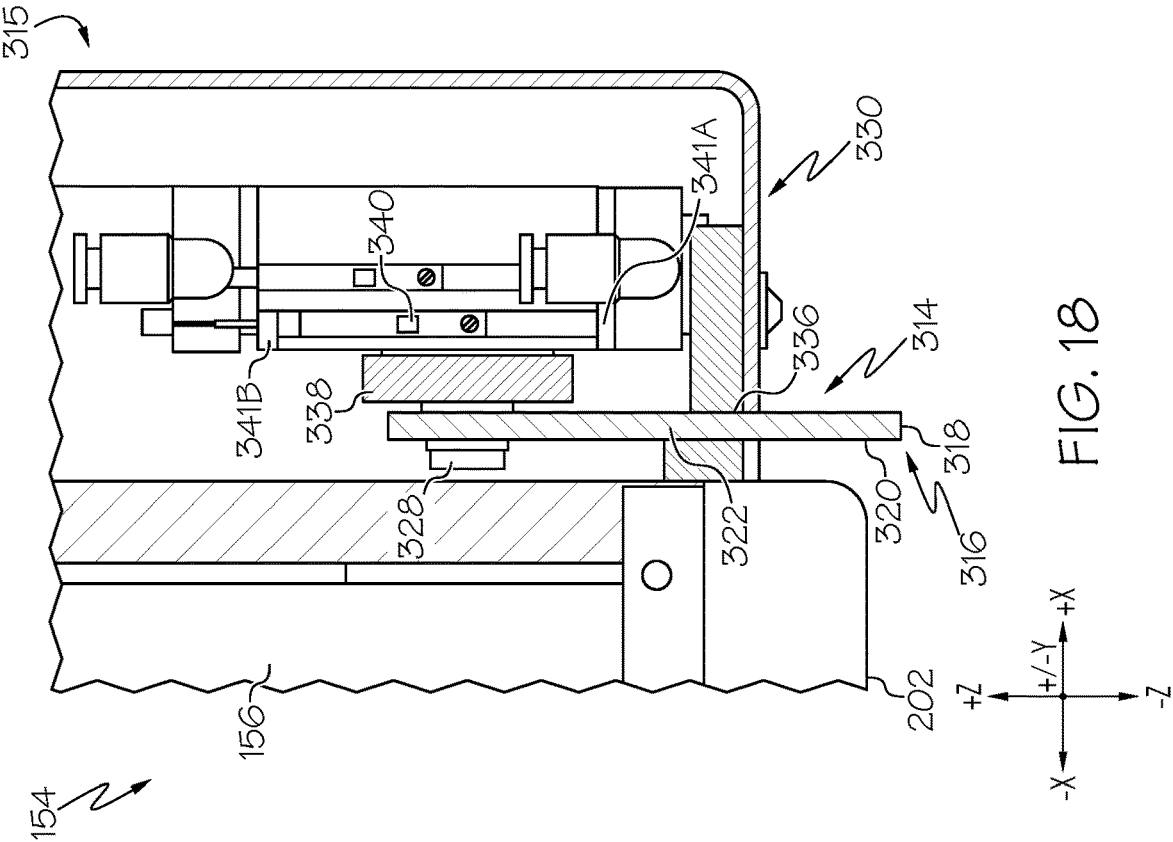
FIG. 18 schematically depicts a partial end view of the printing head showing the powder plow assembly in a lowered position according to one or more embodiments shown and described herein.

As shown in FIG. 17, in embodiments, the powder plow assembly 314 includes a plow guide 330 mounted to the mounting frame 315 to facilitate continuous alignment and guidance of the plow guide 330 relative to the printing head 154. In embodiments, the plow guide 330 includes a plurality of holes 332 through which fasteners extend to secure the plow guide 330 to the mounting frame 315. In embodiments, the plow guide 330 includes a pair of recesses 334 and a longitudinally extending slot 336 extending between opposite ends of the plow guide 330. The pair of recesses 334 provide during clearance during assembly. As shown in FIGS. 18 and 19, the powder plow assembly 314, including the powder plow 316 and the plow guide 330, are shown in position on the printing head 154 with the powder plow 316 extending through the slot 336 formed in the plow guide 330.

As shown in FIG. 15, the powder plow assembly 314 is shown as viewed from the build side wall 206 of the housing 201. In embodiments, the powder plow assembly 314 is coupled to the mounting frame 315 such that the powder plow assembly 314 may remain stationary when the printing head 154 indexes between the end walls 208, 210 of the housing 201. Thus, in this embodiment, the powder plow 316 has a length extending substantially an entire distance between the end walls 208, 210 of the printing head 154 so that the powder plow 316 shields the print heads 156 from external material regardless of the position of the printing head 154 between the end walls 208, 210.

Referring again to FIGS. 15, 18, and 19, in embodiments, the powder plow assembly 314 includes at least one actuator 338 for moving the powder plow 316 between a raised position and a lowered position. As shown in FIG. 15, the powder plow assembly 314 includes a pair of spaced apart actuators 338 for moving the powder plow 316. Any suitable actuators may be used such as, for example, electric actuators, pneumatic actuators, hydraulic actuators, spring actuators, or any other suitable actuating device. When a pair of actuators 338 are provided, each actuator 338 engages a respective extension of the powder plow 316. In embodiments, the powder plow assembly 314 includes a sensor 340 for detecting whether the powder plow 316 is in the raised position or the lowered position. The sensor 340 may be configured to detect a position of the powder plow 316 itself or, alternatively, a position of the actuator 338. Further, in embodiments, the sensor 340, or an additional sensor, may be configured to detect if the powder plow 316 contacts or pushes external material while the printing assembly 150 is moving along the working axis 116. In embodiments, a sensor, not shown, may be provided to detect if the powder plow 316 has contacted external material. In response to the sensor detecting contact with external material, an alert, such as an audible and/or visual alert, may be triggered indicating, for example, that an excess amount of build material is being applied onto the build area 120. As such, the sensor may be in contact with the control system 10 to initiate the alert. In embodiments, in response to the sensor detecting a collision, operation of the printing head 154 may be stopped to prevent damage to the printing head 154 or the print heads 156.

As shown in FIGS. 18 and 19, in embodiments, the powder plow assembly 314 includes a pair of hard stops 341A, 341B configured to limit vertical movement of the powder plow 316. The pair of hard stops 341A, 341B are mounted within or proximate the actuator 338 such that the powder plow 316 or a portion of the actuator 338 itself contacts a respective one of the hard stops 341A, 341B during operation of the powder plow assembly 314. Accordingly, a lower hard stop 341A limits a lower position of the powder plow 316 and an upper hard stop 341B limits an upper position of the powder plow 316. In embodiments, the position of each of the hard stops 341A, 341B relative to the actuator 338 may be adjustable so as to adjust the positioning limits of the powder plow 316 along the +/−Z axis of the coordinate axes depicted in the figures. In embodiments, the powder plow assembly 314 may include a spring, not shown, to maintain the powder plow 316 in the raised position in case of a power failure to ensure that the powder plow 316 does not remain in the lowered position.

When in the lowered position, as shown in FIG. 18, the lower end 318 of the powder plow 316 is positioned below the base plate 202 of the printing head 154 to shield the print heads 156 from external material during operation across the build area 120. When in the lowered position, as a non-limiting example, the lower end 318 of the powder plow 316 may be between 1 mm and 5 mm below the base plate 202 of the printing head 154. As shown in FIG. 19, the actuator 338 operates to move the powder plow 316 to the raised position in which the lower end 318 of the powder plow 316 is positioned above the base plate 202 of the printing head 154. When in the raised position, the lower end 318 of the powder plow 316 may be at least 1 mm above the base plate 202 of the printing head 154. In embodiments, the lower end 318 of the powder plow 316 may be between 1 mm and about 10 mm above the base plate 202 of the printing head 154 when in the raised position. In embodiments, the lower end 318 of the powder plow 316 may be between 4 mm and about 7 mm above the base plate 202 of the printing head 154 when in the raised position. As shown, the powder plow 316 moves through the slot 336 formed in the plow guide 330, which maintains the orientation of the powder plow 316 during movement between the raised position and the lowered position.

Although not shown, the powder plow assembly 314 may include a device for removing accumulated powder or debris therefrom. For example, the powder plow assembly 314 may include a vibrator or brush to remove powder or debris.

In use, the powder plow 316 is positioned in the lowered position when the printing head 154 moves from the home position 151 of the printing assembly 150 across the build area 120. More specifically, the powder plow 316 is positioned in the lowered position during a printing and jetting operation, as opposed to a cleaning operation as this would interfere with the cleaning station 108 (FIG. 1). After the printing head 154 passes the build area 120 in the direction opposite the home position 151 of the printing assembly 150, the powder plow 316 may be moved to the raised position by the actuator 338 to avoid moving any build material back over the build area 120 as the printing head 154 returns to the home position 151 of the printing assembly 150. The actuator 338 may be operated by the control system 10 to move the powder plow 316 between the raised position and the lowered position based on the position of the printing head 154 relative to the build area 120. In embodiments, the powder plow 316 may be rapidly and repeatedly repositioned between the raised position and the lowered position to shake off any powder accumulating on the powder plow 316. This may occur when the printing head 154 has returned to the home position 151 after crossing the build area 120 to clean off the powder plow 316 prior to a subsequent pass across the build area 120. Accordingly, the powder plow 316 improves reliability, as well as print quality, of the printing assembly 150 by ensuring that binder material does not contaminate the print heads 156 and/or enter the housing 201 of the printing assembly 150.

Deflector Plate

As discussed hereinabove and illustrated in FIG. 1, the manufacturing apparatus 100 includes a cleaning station 108 positioned proximate one end of the working axis 116 of the manufacturing apparatus 100. In embodiments, the cleaning station 108 is co-located with the home position 151 where the printing assembly 150 is located or "parked" before and after depositing a binder material 50 on a layer of build material 40 positioned on the build area 120. The cleaning station 108 may include one or more cleaning sections or members to facilitate cleaning the plurality of print heads 156 with a cleaning solution between depositing operations.

Figure 20:
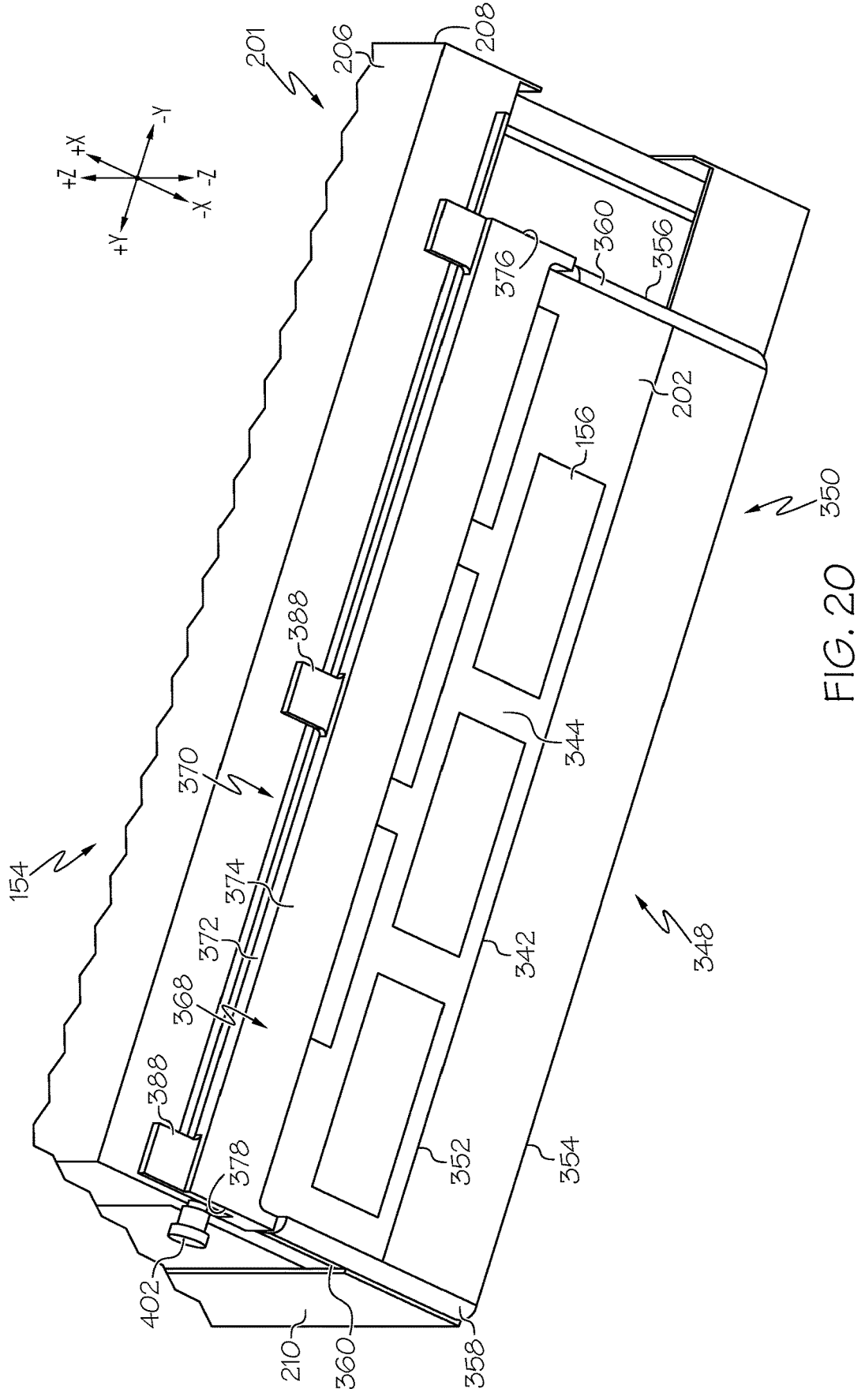
FIG. 20 schematically depicts a bottom perspective view of the printing assembly including a calibration guide and a deflector plate according to one or more embodiments shown and described herein.
Figure 21:
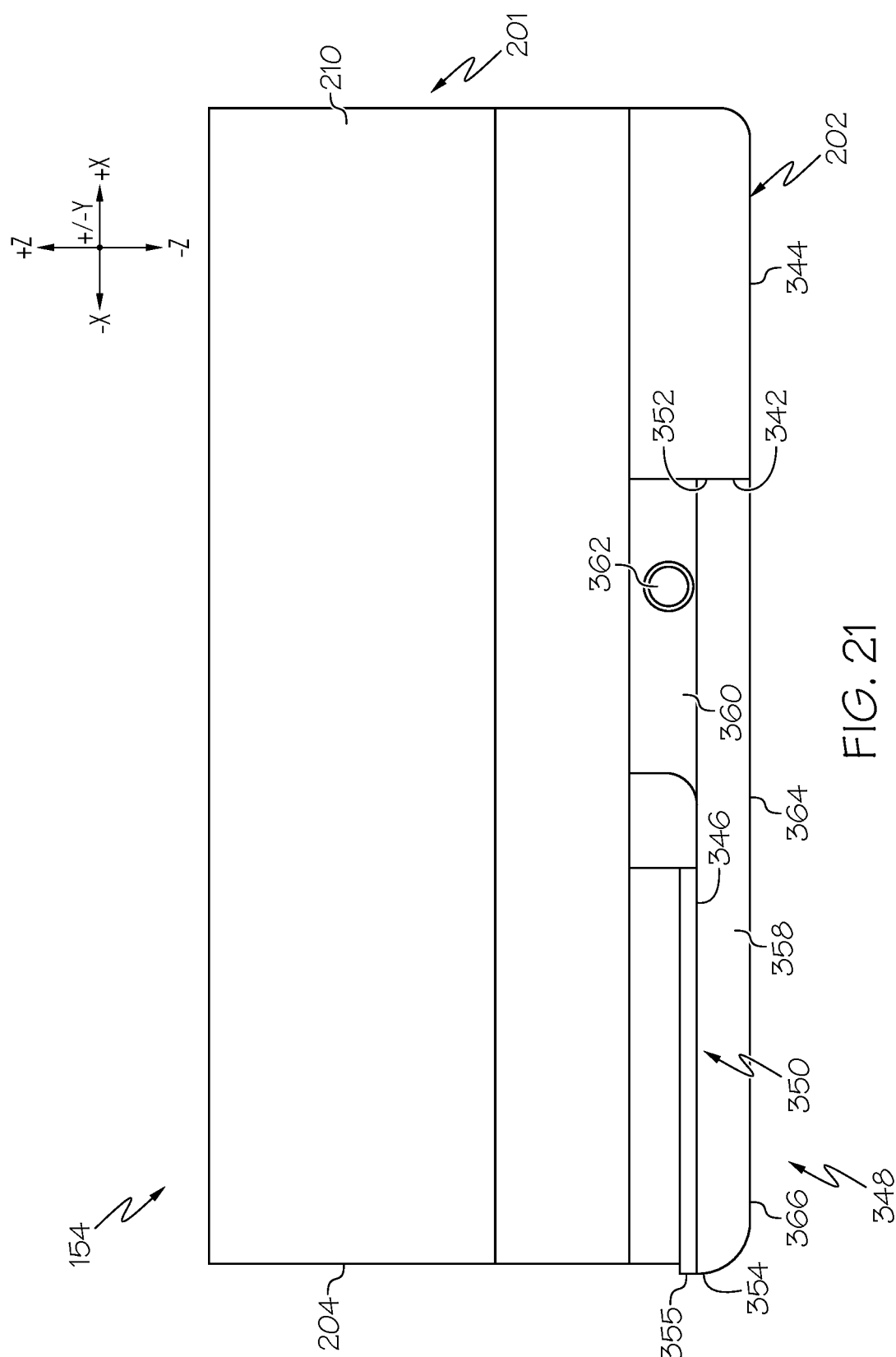
FIG. 21 schematically depicts an end view of the deflector plate on the printing assembly according to one or more embodiments shown and described herein.

In embodiments, the cleaning station 108 includes brushes, wipers, jets, or other applicators for applying the cleaning solution across the base plate 202 of the printing head 154 and, thus, across each of the print heads 156. As the printing head 154 moves along the working axis 116 toward the build area 120 to perform a subsequent operation, the cleaning station 108 applies the cleaning solution across the base plate 202 of the printing head 154 from the build side wall 206 to the print home side wall 204. However, as shown in FIGS. 20 and 21, the printing head 154 may have a step or indentation 342 formed in the base plate 202 of the printing head 154 between a first surface 344 and a second surface 346 thereof. Thus, in embodiments, the printing head 154 includes a deflector plate 348 removably fixed to the printing head 154 and positioned within the step 342 to prevent the cleaning solution from collecting on the second surface 346 of the base plate 202 of the printing head 154 and dropping onto the build area 120 as the printing head 154 passes the build area 120. Accordingly, as described in more detail herein, the deflector plate improves print quality of the printing assembly 150 by ensuring that defects are not formed in the build area 120 by cleaning solution dropping onto the build area 120 from the printing assembly 150.

As shown in FIGS. 20 and 21, the deflector plate 348 is provided proximate the print home side wall 204 of the housing 201. The deflector plate 348 includes a body 350 having a front end 352, a rear end 354, and a pair of sides 356, 358. In embodiments, each side 356, 358 of the body 350 extends past the front end 352 and includes a flange 360 extending perpendicular to the body 350 of the deflector plate 348. In embodiments, each flange 360 receives a fastener 362 engaging the printing head 154, such as the end walls 208, 210 of the printing head 154 to secure the deflector plate 348 thereto. The fastener 362 can be, as a non-limiting example, a screw, bolt, rivet, or the like.

In embodiments, the deflector plate 348 is secured to the base plate 202 of the printing head 154 such that the deflector plate 348 moves in unison with the print heads 156 as the print heads 156 are operated to index between end walls 208, 210 of the housing 201. In this embodiment, the deflector plate 348 has a width at least as great as a width of the base plate 202 of the printing head 154 to ensure that no cleaning solution accumulates on the base plate 202 of the printing head 154. In embodiments, the deflector plate 348 is fixed to end walls 208, 210 of the housing 201 so that the deflector plate 348 does not move in unison with the print heads 156 as the print heads 156 index between the end walls 208, 210 of the housing 201. Rather, the deflector plate 348 is fixed. In this embodiment, the width of the deflector plate 348 is greater than the width of the base plate 202 of the printing head 154 and extends between opposite end walls 208, 210 of the housing 201.

The deflector plate 348 is dimensioned to provide a smooth transition from the first surface 344 of the base plate 202 of the printing head 154 to a bottom surface 364 of the deflector plate 348 to prevent cleaning solution from flowing onto the printing head 154. Additionally, the rear end 354 and the sides 356, 358 of the deflector plate 348 are curved to prevent the cleaning solution from accumulating thereon and providing a smooth transition to the printing head 154.

In embodiments, the rear end 354 extends past the base plate 202 and/or the housing 201 to prevent cleaning solution from accumulating on the printing assembly 150. More specifically, the deflector plate 348 operates as a "flick plate" due to the curved rear end 354 to deflect or flick cleaning solution away from the printing assembly 150 as cleaning members from the cleaning station 108 (FIG. 1) moves across the printing assembly 150 and out of contact with the bottom surface 364 of the deflector plate 348.

In embodiments, the deflector plate 348 may be formed of polyetherimide, such as those commercially available under the trademark ULTEM™ (SABIC Innovative Plastics), which provides ease of fabrication and a high resistance to chemicals. In embodiments, the deflector plate 348 may be formed of a metal such as, for example, aluminum. When the deflector plate 348 is formed of metal, the deflector plate 348 may also be coated with electroless nickel with co-deposited PTFE to provide wear resistance and a low coefficient of friction. As shown in FIG. 21, a seal 355 may be provided at an interface between the deflector plate 348 and the base plate 202. Although only illustrated at the rear end 354 of the deflector plate 348, the seal 355 may extend along an interior perimeter of the deflector plate 348.

In embodiments, the deflector plate 348 includes an outer layer 366 attached to an underside of the body 350 of the deflector plate 348. In embodiments, the outer layer 366 has a surface roughness of equal to or less than 200 Ra (Roughness average). In embodiments, the outer layer 366 has a surface roughness of equal to or less than 125 Ra (Roughness average). In embodiments, the outer layer 366 has a surface roughness of equal to or less than 75 Ra (Roughness average). The outer layer 366 of the deflector plate 348 lies in the same plane as a first surface 344 of the base plate 202 such that the deflector plate 348 is flush with the base plate 202. The outer layer 366 may be formed of an absorbent material for absorbing cleaning solution. The outer layer 366 may be secured to the surface of the body 350 of the deflector plate 348 using any suitable attachment means such as, for example, fasteners, an adhesive, welded, or the like. In instances in which the outer layer 366 is removable from the body 350 of the deflector plate 348, the outer layer 366 may be replaced when it no longer provides adequate absorption of the cleaning solution. It should be appreciated that the entire deflector plate 348 may be removed from the printing head 154 by removing the fasteners at the flanges 360 so that the deflector plate 348 may be repaired or to replace the deflector plate 348 with a replacement deflector plate. As described herein, the deflector plate 348 prevents defects from forming in the build area 120 by cleaning solution dropping onto the build area 120 from the printing assembly 150, thereby improving the print quality of the printing assembly 150.

Calibration Guide

Figure 22:
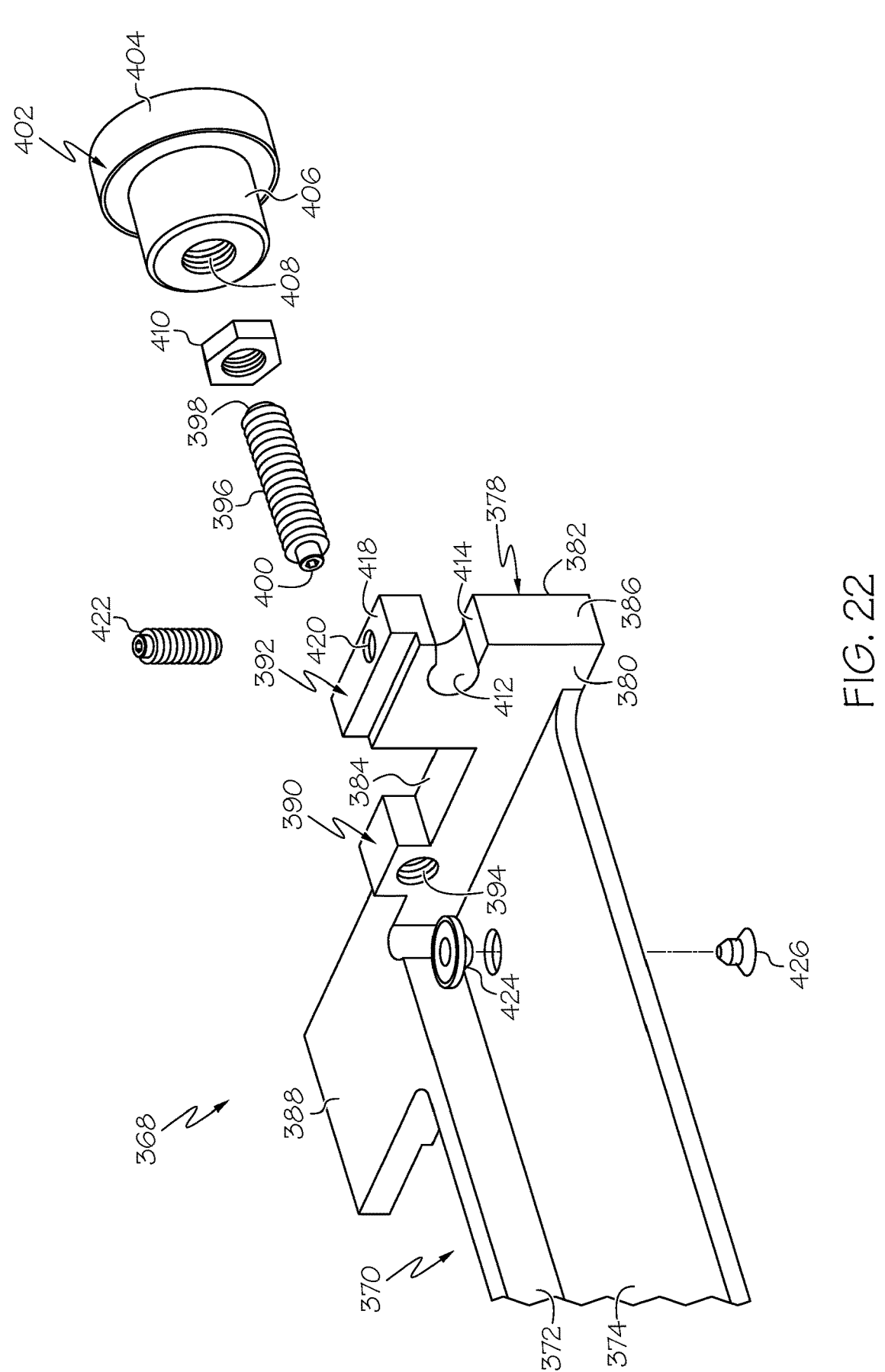
FIG. 22 schematically depicts partial exploded view of the calibration guide according to one or more embodiments shown and described herein.
Figure 23:
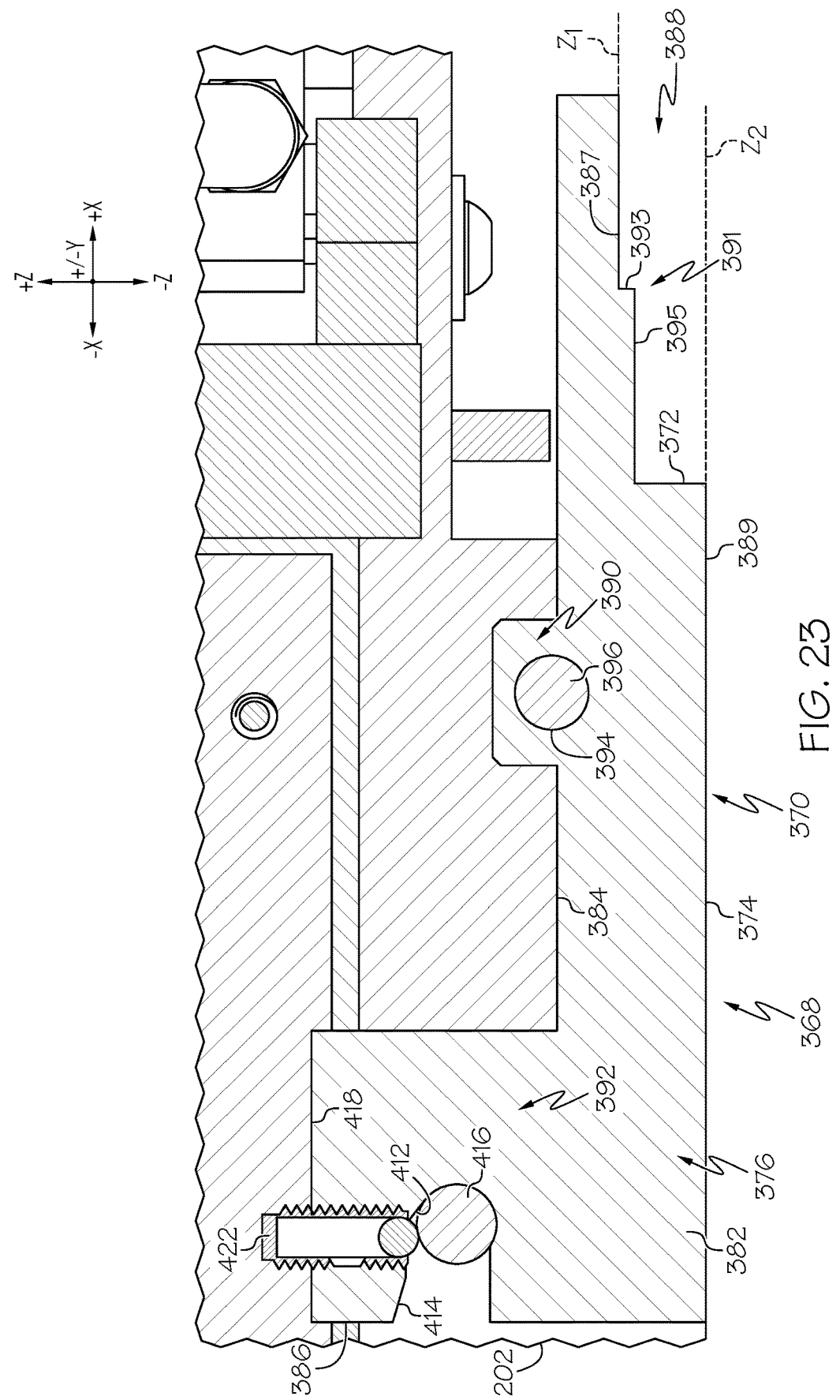
FIG. 23 schematically depicts an end view of the calibration guide according to one or more embodiments shown and described herein.

Referring now to FIGS. 20, 22, and 23, a calibration guide 368 is illustrated for facilitating alignment of the cleaning station 108 (FIG. 1) and the cleaning sections thereof with the print heads 156 of the printing head 154, as well as alignment of the print heads 156 with the build area 120. Thus, it should be appreciated that the calibration guide 368 is utilized during an initial setup operation of the printing assembly 150. As described in more detail herein, and as shown in FIG. 20, the calibration guide 368 is provided at the base plate 202 of the printing head 154 proximate the build side wall 206 of the housing 201 and opposite the deflector plate 348.

As shown in FIGS. 20 and 22, in embodiments, the calibration guide 368 includes a bracket 370 having forward wall 372, a body wall 374, and a pair of side walls 376, 378 extending from opposite ends of the body wall 374 and perpendicular to the forward wall 372. Each side wall 376, 378 includes an interior surface 380, an exterior surface 382, a distal face surface 384 opposite the body wall 374, and a distal end surface 386 opposite the forward wall 372. The distal face surface 384 and the distal end surface 386 each extend between the interior surface 380 and the exterior surface 382 of a respective side wall 376, 378. At least one tab 388 extends from the forward wall 372 opposite the body wall 374 to facilitate visual vertical alignment of the cleaning members of the cleaning station 108 relative to the calibration guide 368, as described in more detail herein. More particularly, the at least one tab 388 serves to identify a maximum vertical position of a cleaning member of the cleaning station 108 so that the cleaning member is positioned to contact the bottom end of the print heads 156 without being raised too high or lowered too low. In embodiments, at least one tab 388 extends from the forward wall 372 of the calibration guide 368. As shown, a plurality of tabs 388 extends from the forward wall 372. Although the embodiment in FIGS. 20 and 22 includes a plurality of tabs 388, in embodiments, a single tab 388 may run along the length of the forward wall 372.

In embodiments, as shown in FIG. 22, with reference to the side wall 378 of the calibration guide 368, the side wall 378 includes a first ledge 390 extending in a direction opposite the body wall 374 and provided proximate the forward wall 372, and a second ledge 392 extending in a direction opposite the body wall 374 and provided opposite the forward wall 372. The first ledge 390 includes a threaded aperture 394 extending through the interior surface 380 and the exterior surface 382 of the side wall 378, and is configured to receive a set screw 396 having a first end 398 and a second end 400. In embodiments, the second end 400 of the set screw 396 has a nylon tip formed thereon. A thumb knob 402 is provided on the first end 398 of the set screw 396. In embodiments, the thumb knob 402 includes a grip portion 404 and a shaft 406 extending from the grip portion 404 with a threaded hole 408 in the shaft 406. The first end 398 of the set screw 396 engages the threaded hole 408 of the thumb knob 402 such that rotation of the thumb knob 402 rotates the set screw 396. A locking nut 410 may be provided on the set screw 396 between the first ledge 390 and the grip portion 404 of the thumb knob 402. As the thumb knob 402 is rotated in a first direction, the set screw 396 extends toward the opposite side wall 376 of the calibration guide 368 and, thus, the thumb knob 402 moves toward the exterior surface 382 of the side wall 378. As the thumb knob 402 is rotated in the first direction, the set screw 396 extends to contact the base plate 202 of the printing head 154 when positioned thereon. Alternatively, as the thumb knob 402 is rotated in an opposite second direction, the set screw 396 extends away from the opposite side wall 376 of the calibration guide 368 and, thus, the thumb knob 402 moves away from the exterior surface 382 of the side wall 378. As the thumb knob 402 is rotated in the second direction, the set screw 396 retracts to move out of contact with the base plate 202 of the printing head 154 when positioned thereon. It should be appreciated that the calibration guide 368 may be maintained in position on the base plate 202 of the printing head 154 by adjusting the thumb knob 402 on each side wall 376, 378 to provide a clamp load between the set screws 396 and the base plate 202 of the printing head 154 to fix the calibration guide 368 on the printing head 154.

The second ledge 392 includes a recess 412 formed in the distal end surface 386 of each side wall 376, 378. With reference to the side wall 378 shown in FIG. 21, the recess 412 may have a semi-circular contour with an open end 414 for receiving a latching pin 416 coupled to the printing head 154. The second ledge 392 also includes a second ledge surface 418 extending between the exterior surface 382 and the interior surface 380 of the side wall 378 with a threaded hole 420 formed in the second ledge surface 418. A ball plunger 422 threadedly engages the hole 420 formed in the second ledge surface 418 and extends toward the recess 412.

As shown in FIG. 22, in embodiments, at least one rest button 424 is provided on the body wall 374 of the calibration guide 368 and secured thereto by a screw 426. When the calibration guide 368 is in position against the base plate 202 of the printing head 154, the rest button 424 is contacted by the base plate 202 to confirm a position of the calibration guide 368. It should be appreciated that any number of rest buttons 424 may be utilized and located at any suitable location for contacting the base plate 202 of the printing head 154.

As shown in FIG. 23, the calibration guide 368 is affixed to the base plate 202 of the printing head 154, such as through the use of bolts, clips, or another attachment mechanism. The ball plungers 422 are received within the base plate 202 of the printing head 154 and the latching pin 416 engages the recess 412 on each side wall 376, 378 to initially position the calibration guide 368 on the printing head 154. The ball plunger 422 extending from the hole 420 in the second ledge surface 418 of each side wall 376, 378 engages a receiving hole, not shown, of the base plate 202 of the printing head 154. Thereafter, the thumb knobs 402 may be each adjusted to position the calibration guide 368 relative to the base plate 202 of the printing head 154.

Referring still to FIG. 23, the tab 388 of the calibration guide 368 includes a first section 387 at a first vertical position Z1 and a second section 389 at a second vertical position Z2. A step 391 is formed between the first section 387 and the second section 389 and has a forward facing surface 393 and a downward facing wall 395 extending parallel to the first section 387. The first vertical position Z1 is vertically higher than, or above, the second vertical position Z2. In embodiments, the first section 387, the second section 389, and the forward facing surface 393 of the step 391 can have different indicia or colors to enhance visual differentiation between the first and second vertical positions Z1, Z2.

In practice, the printing head 154 may be moved over the cleaning station 108, and a member (not shown) (e.g., wet wipe blade/member, dry wipe member, or cap) is raised to an initial maximum vertical position. As used herein, the "maximum vertical position" of a member refers to the vertical position of a top edge of the member when the member is at a set maximum vertical height. The printing head 154, specifically the tab 388, may be positioned directly over the member, or the printing head 154 may be located elsewhere over the cleaning station 108 to enable visual comparison of the vertical position of the member with the calibration guide 368. The maximum vertical position Zm of the member is then adjusted such that the top edge of the member is vertically below or lower than the first vertical position Z1. In embodiments, the maximum vertical position Zm of the member is also greater than or equal to the second vertical position Z2. Put another way, the member is adjusted such that the maximum vertical position Zm of the member is Z1>Zm≥Z2. Adjustments of the maximum vertical position Zm of the member can be made by adjusting an adjustable hard stop, adjusting one or more parameters or settings of an actuator coupled to the member, or by other methods that will be known to those of skill in the art, depending on the particular embodiment. In embodiments, adjustments can be made using the calibration guide 368 to any or all of the components of the cleaning station 108. Additional information on adjustable hard stops in manufacturing apparatuses can be found in patent application Ser. No. 17/612,449, filed on May 22, 2020, and entitled "Cleaning Systems For Additive Manufacturing Apparatuses And Methods For Using The Same," the entirety of which is hereby incorporated by reference.

Modular Printing Head

Figure 24:
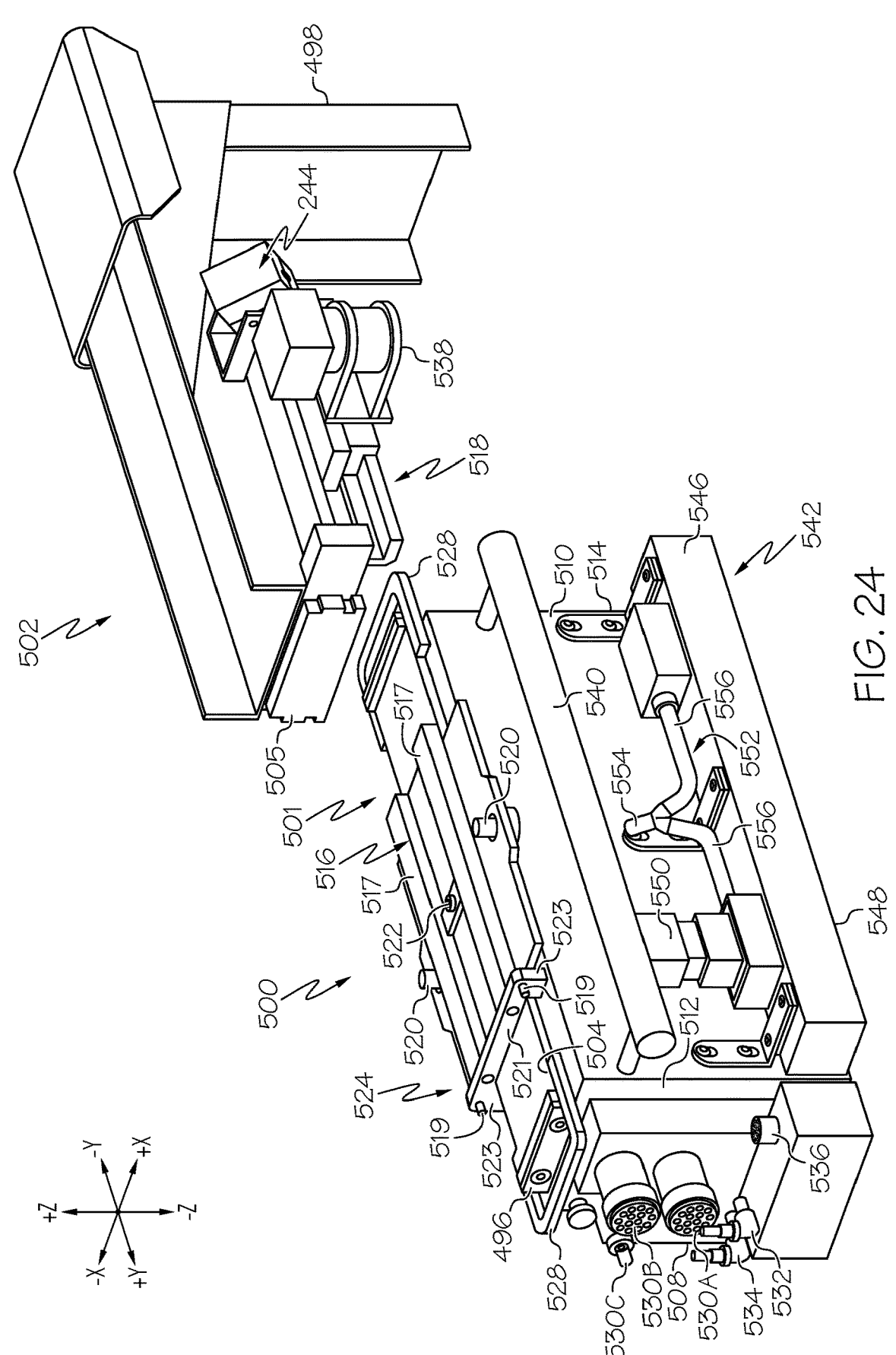
FIG. 24 schematically depicts a perspective view of an embodiment of a printing assembly and a printing head receptacle according to one or more embodiments shown and described herein.

Referring now to FIG. 24, an embodiment of a printing assembly 500 is illustrated. It should be appreciated that the printing assembly 500 is similar to the printing assembly 150 described herein, such that the printing assembly 500 includes a housing 501, such as the housing 201, in which the printing head 154, including the plurality of print heads 156, and the manifold assembly 160 (FIG. 27) are provided. However, the printing assembly 500 is a modular printing assembly that mates with a printing head receptacle 502 for coupling the printing assembly 500 to the rail 104 (FIG. 1). As shown, the printing assembly 500 is shown detached from the printing head receptacle 502, i.e., in a disassembled state. As such, the modular capabilities of the printing assembly 500 allows for the printing assembly 500 to be quickly removed from other components of a manufacturing apparatus for maintenance and/or repair.

It should be appreciated that the above disclosure regarding the structure and features of the printing assembly 150 discussed herein such as, for example, the powder plow assembly 314, the deflector plate 348, and the calibration guide 368, is equally applicable to the printing assembly 500 and may each be provided on the printing assembly 500.

The printing head receptacle 502 includes a mounting structure 498 for engaging a linear traversing stage, such as the linear traversing stage 212 (FIG. 4), and translating the printing head receptacle 502 along the rail 104, and thus, the printing assembly 500 along the working axis 116 (+/−Y axis of the coordinate axes depicted in the figures). As described in more detail herein, the printing head receptacle 502 includes a coupling 518 for engaging the printing assembly 500 and permitting the printing assembly 500 to translate in a direction transverse to the working axis 116 relative to the printing head receptacle 502.

Figure 25:
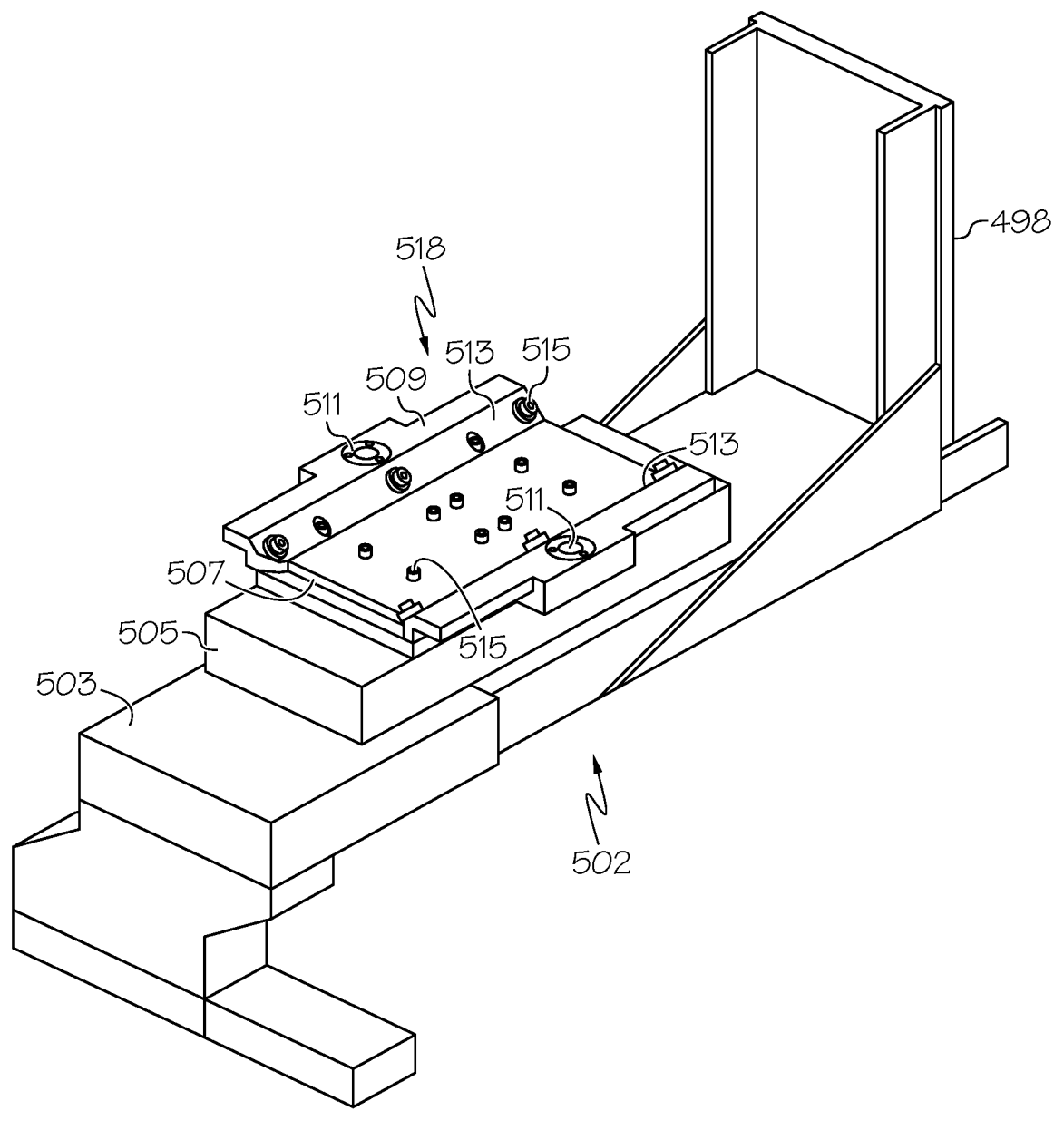
FIG. 25 schematically depicts a bottom perspective view of the printing head receptacle according to one or more embodiments shown and described herein.

As shown in FIG. 25, an underside 503 of the printing head receptacle 502 is shown illustrating the coupling 518 and a second traversing stage 505 mounted to the underside 503 of the printing head receptacle 502. The coupling 518 has a first surface 507 and an opposite second surface 509. The first surface 507 of the coupling 518 slidably engages the second traversing stage 505 and may be operated by the control system 10 (FIG. 1) to move the coupling 518 in a direction transverse to the working axis 116. The second surface 509 of the coupling 518 includes a pair of angular walls 513 defining a recess within the second surface 509. A pair of locking mechanisms 511 are provided on an outer side of the angular walls 513 for locking the coupling 518 to a receiver 516 of the printing assembly 500, as discussed herein. In embodiments, the coupling 518 also includes a plurality of roller bearings 515 provided on and between the pair of angular walls 513. As described herein, the coupling 518 forms a dovetail interface with the receiver 516 of the printing assembly 500.

Referring again to FIG. 24, the housing 501 of the printing assembly 500 includes a top end 504 a print home side wall 508, a build side wall 510, and a pair of end walls 512, 514 extending between the print home side wall 508 and the build side wall 510. The printing assembly 500 includes the receiver 516 mounted to the top end 504 of the printing assembly 500. The receiver 516 has a pair of tracks 517. Specifically, the receiver 516 includes a pair of tracks 517 protruding in a direction opposite the top end 504 of the housing 501, which forms a dovetail interface with the coupling 518. More particularly, when installing the printing assembly 500 onto the printing head receptacle 502, the tracks 517 of the receiver 516 are positioned between the pair of angular walls 513, as shown in FIG. 25, and thus within the recess and between the roller bearings 515 of the coupling 518, such that the roller bearings 515 are positioned on both sides of the tracks 517. As such, the roller bearings 515 function as locating features for positioning the received 516 within the coupling 518 when installing the printing assembly 500 onto the printing head receptacle 502. Further, the receiver 516 includes a pair of locking mechanisms 520 provided on opposite sides of the receiver 516 for engaging the locking mechanisms 511 of the coupling 518 of the printing head receptacle 502 for precise locating and locking the receiver 516 to the coupling 518. The locking mechanisms 520 of the receiver 516 may be any suitable mechanisms for mating with the locking mechanisms 511 of the coupling 518 and locking the receiver 516 to the coupling 518. As a non-limiting example, the locking mechanisms 520 may be latches, levers, clasps, retractable bearings, or the like. In embodiments, the locking mechanisms 520 may retractably or extendably engage respective mating cavities formed in the printing head receptacle 502 for securing the receiver 516 to the coupling 518. To disengage the printing assembly 500 from the printing head receptacle 502, the locking mechanisms 520 of the receiver 516 are disengaged from the locking mechanisms 511 of the coupling 518 and the receiver 516 may be slid out of the coupling 518. In embodiments, the receiver 516 includes one or more dampers 519 extending parallel to the tracks 517 to damp movement between the coupling 518 and the receiver 516 when installing the receiver 516 onto the coupling 518. As shown, a pair of dampers 519 are provided on outer sides of the tracks 517. As such, the dampers 519 prevent overextension of the receiver 516 onto the coupling 518, thereby potentially damaging the receiver 516 and/or the coupling 518 as the receiver 516 engages the coupling 518.

As shown in FIG. 24, the printing assembly 500 may include a pair of handles 528 to facilitate handling of the printing assembly 500 when separate from the printing head receptacle 502. The handles 528 may extend from the top end 504 of the housing 501 printing assembly 500 proximate opposite end walls 512, 514. The printing assembly 500 may include at least one utility port 530A, 530B. The utility ports 530A, 530B may be pneumatic quick connect couplings and may be referred to as such herein. Utility port 530A may be a pneumatic quick connect fitting, and referred to as such, for connecting an air supply to operate pneumatic components of the printing assembly 500, such as pneumatic valves, as discussed herein, or the like. The printing assembly 500 may also include a binder supply quick connect fitting 532 and a binder return quick connect fitting 534 for connecting the printing assembly 500, specifically the manifold assembly 160 of the printing assembly 500, to a binder supply reservoir and a binder return reservoir, such as the supply reservoir 110 and the return reservoir 112, respectively. When the manifold assembly 160 is provided within the printing assembly 500, the printing assembly 500 may include a manifold assembly quick connect electrical port 536 for connecting the manifold assembly 160 to a power supply for providing power to the manifold assembly 160. Power from the power supply may be utilized for operating electrical components of the manifold assembly 160, such as electric valves, fluid level monitoring devices, or the like. Further, in embodiments, a purge port connection 530C is provided in fluid communication with an interior of the printing assembly 500. The purge port connection 530C may be coupled to an external air supply for delivering air into the printing assembly 500. In use, air is delivered into the printing assembly 500 from the external air supply through the purge port connection 530C to prevent material and debris from entering the printing assembly 500. The air may be delivered into the printing assembly 500 on a continuous basis during operation of the printing assembly 500 or, alternatively, air may be delivered into the printing assembly 500 at periodic intervals.

As shown in FIG. 24, the imaging device assembly 244 illustrated and provided on the printing head receptacle 502. In embodiments, a detection camera 538 may also be provided on the printing head receptacle 502 proximate the imaging device assembly 244. When the detection camera 538 is provided in addition to the imaging device assembly 244, the imaging device assembly 244 may be configured to monitor a position of the printing assembly 500 while the detection camera 538 may be configured to detect defects and/or irregularities, such as defects in the build area 120. Alternatively, both the imaging device assembly 244 and the detection camera 538 may be configured to identify irregularities in the build area 120 and a position of the printing assembly 500, but be oriented at a different angle relative to one another to capture a wider field of view.

Figure 27:
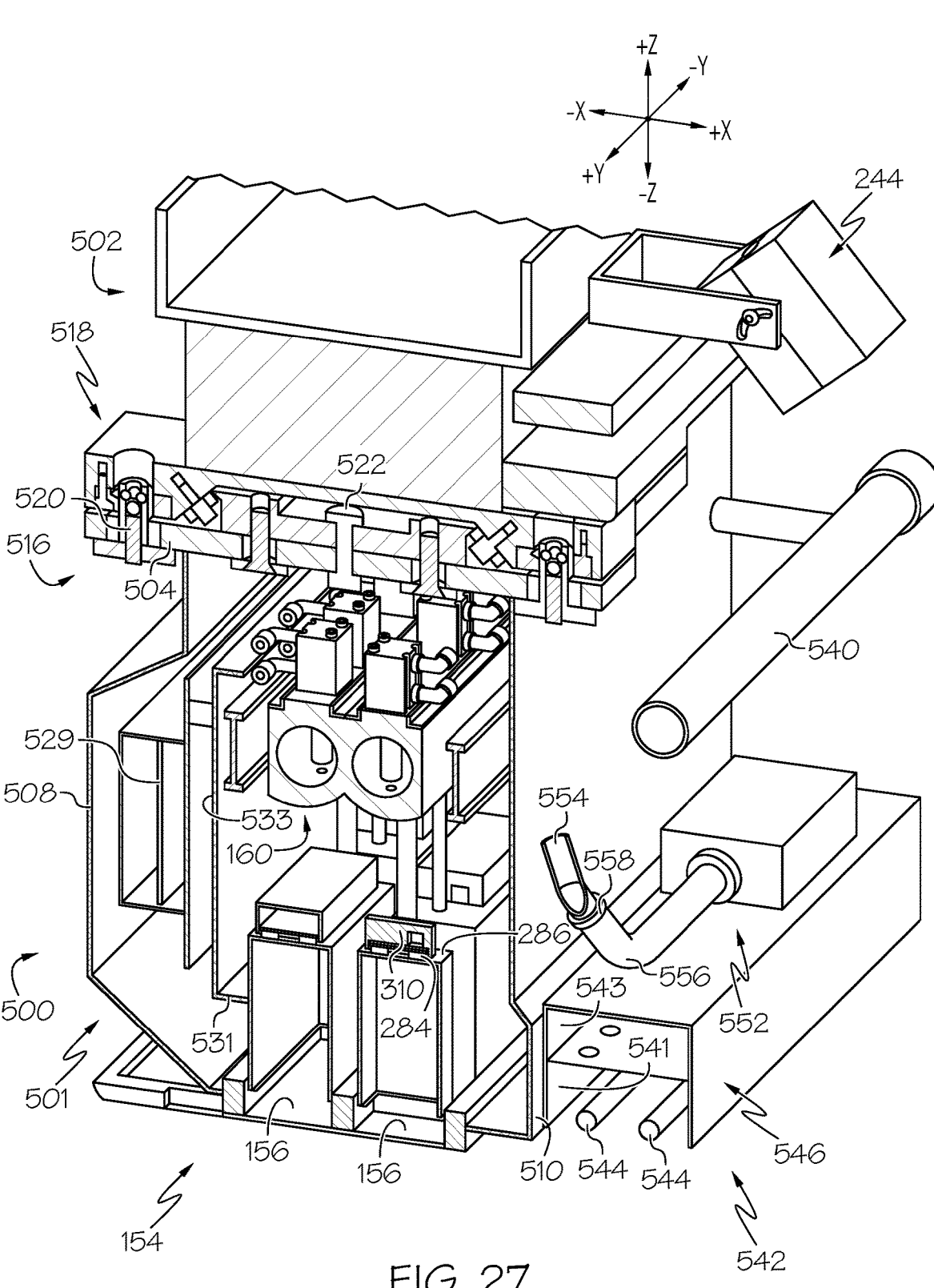
FIG. 27 schematically depicts a partial perspective view of the printing assembly and a printing head receptacle according to one or more embodiments shown and described herein.

As shown in FIG. 27, in embodiments, the printing assembly 500 may include a light source 540 extending in the +/−Y axis of the coordinate axes and mounted to the build side wall 510 of the printing assembly 500. The light source 540 is utilized to illuminate the build area 120 to assist the imaging device assembly 244 and the detection camera 538 in capturing an image of the build area 120. The light source 540 may be an LED light bulb or any other suitable light source such as, for example, an incandescent light bulb or a fluorescent light bulb.

In embodiments, a height of the printing assembly 500 may be adjustable. Specifically, the top end 504 of the housing 501 of the printing assembly 500 may be adjustable relative to the rest of the housing 501. As shown in FIG. 24, a clamp plate 496 is provided concealing access to an adjusting member such as, for example, an adjusting screw and dowel pin. By loosening the adjusting member, the printing assembly 500 is able to be lowered or raised in the +/−Z axis of the coordinate axes depicted in the drawings. By adjusting the position of the printing assembly 500 relative to the top end 504 of the housing 501, the printing assembly 500 is permitted to be moved closer to or away from the build area.

H3 Yaw Bar

Figure 26:
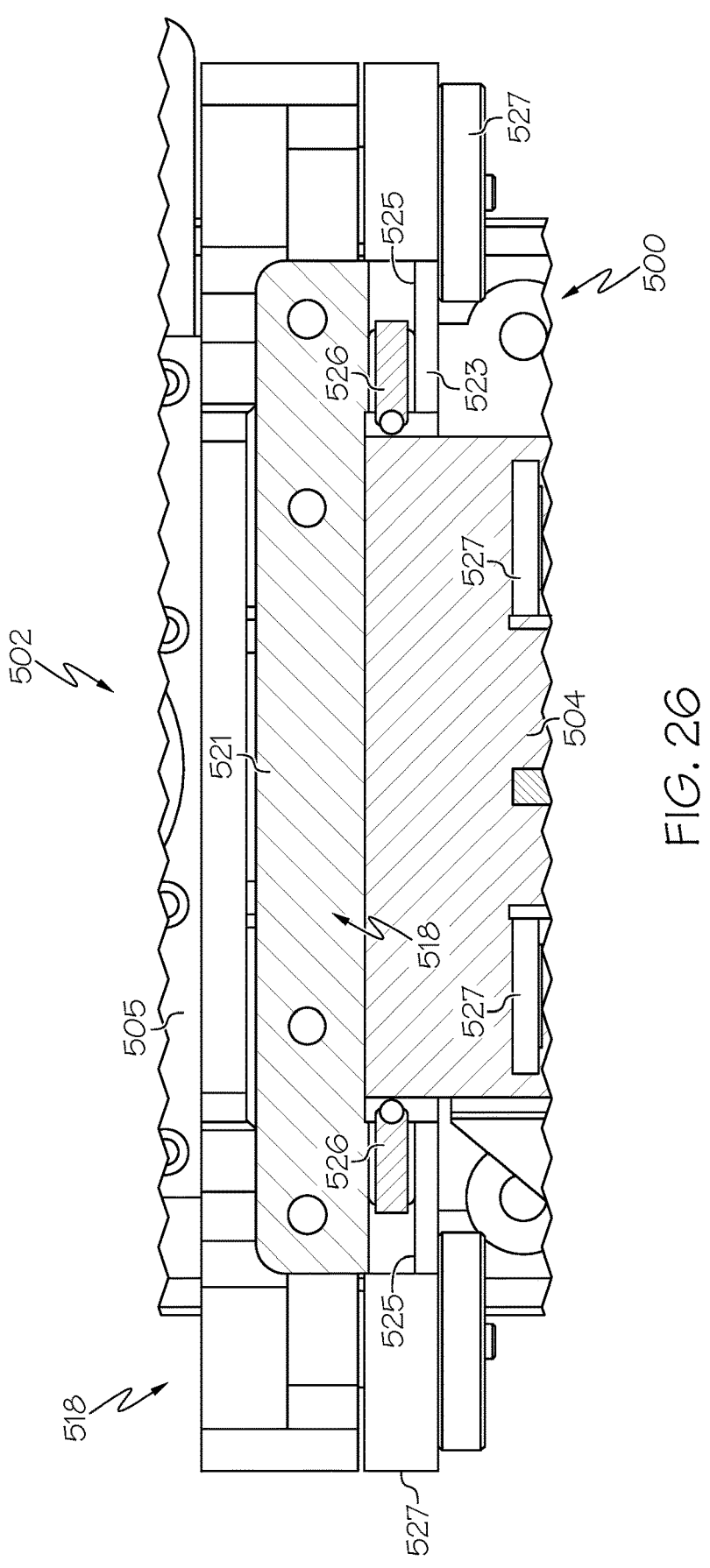
FIG. 26 schematically depicts a partial end view of the printing assembly and a printing head receptacle according to one or more embodiments shown and described herein.

Similar to embodiments described above in which the printing head 154 is pivotable relative to the support bracket 152, in embodiments, the receiver 516 may be configured to pivot relative to the housing 501 such that the printing assembly 500 may pivot relative to the printing head receptacle 502. This allows for alignment of print heads 156, as illustrated in FIG. 27, to be aligned prior to conducting a printing operation, such as during an initial setup of the printing assembly 500 or after maintenance in which the alignment of the printing assembly 500 may need to be readjusted. Thus, as shown in FIGS. 24 and 26, in embodiments, the receiver 516 is pivotally mounted to the top end 504 of the housing 501 printing assembly 500 by a pivot pin 522, which extends through the receiver 516 and the housing 501. Here, the receiver 516 includes a yaw bar 524 having an elongated member 521 extending across the top end 504 of the housing 501 and a pair of legs 523 extending from opposite ends of the elongated member 521. The dampers 519, as discussed above, are shown extending through the elongated member 521, parallel to the tracks 517, and in the same direction of the coupling 518. The yaw bar 524 includes a pair of adjustment members 526 extending through a respective bore 525 formed in each leg 523. The adjustment members 526 extend toward one another through the legs 523 to engage the top end 504 of the housing 501. It should be appreciated that the yaw bar 524 discussed herein and operation thereof is similar to the yaw bar 224 discussed herein.

As shown in FIG. 26, a plurality of restricting pins 527 extend through the top end 504 of the housing 501 and provide a clamp force between the top end 504 of the housing 501 and the receiver 516. It should be noted that the restricting pins 527 have a diameter tolerance of less than 13 micrometers to allow for repeatable re-installation after initial setup and alignment. As discussed above with respect to the restricting pins 240, each restricting pin 527 has a diameter less than that of a hole formed in the top end 504 of the housing 501 through which the restricting pin 240 extends. Thus, when the restricting pin 240 is partially retracted out of an associated hole to release a clamp load against the top end 504 of the housing 501, the housing 501 is free to pivot with respect to the receiver 516. Further, it should be noted that the restricting pins 527 may be adjustable within the holes during an initial setup to maintain a location of the housing 501 for repeatable re-installation of the printing assembly 500.

Referring to FIG. 26, in use, the adjustment members 526 are extended through the bores 525 to contact the top end 504 of the housing 501, and the restricting pins 527 are extended into the holes to provide the clamp force between the housing 501 and the receiver 516. To adjust the positioning of the printing assembly 500 relative to the printing head receptacle 502, the restricting pins 527 are each partially unscrewed to release the clamp force between the housing 501 and the receiver 516. Thereafter, one of the adjustment members 526 is retracted out of the bore 525, which permits the other adjustment member 526 to extend further into the opposite bore 525 and apply additional force against the top end 504 of the housing 501, thereby pivoting the housing 501 in a first direction relative to the receiver 516 about the pivot pin 522. To prevent further pivoting of the housing 501 once in an intended position, the retracted adjustment member 526 is extended into the bore 525 to contact the top end 504 of the housing 501. Additionally, the restricting pins 527 are extended back into the respective holes to apply a clamp force against the housing 501 and the receiver 516. To pivot the housing 501 in an opposite second direction about the pivot pin 522, the same steps are performed, but opposite adjustment members 526 are extended and retracted to apply a force in an opposite direction against the top end 504 of the housing 501.

Heating System

Figure 28:
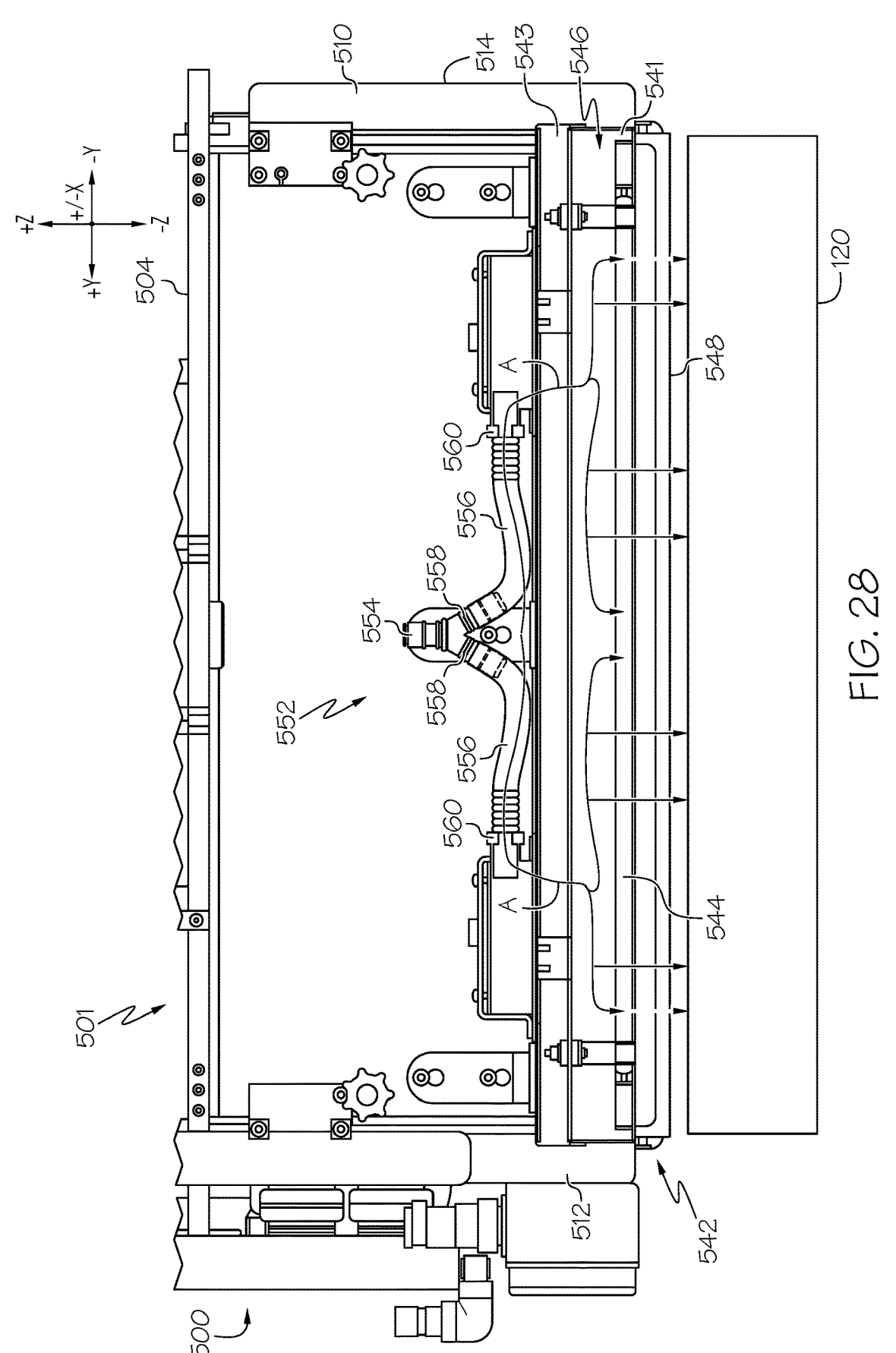
FIG. 28 schematically depicts a partial front view of the printing assembly including a heating system according to one or more embodiments shown and described herein.
Figure 29:
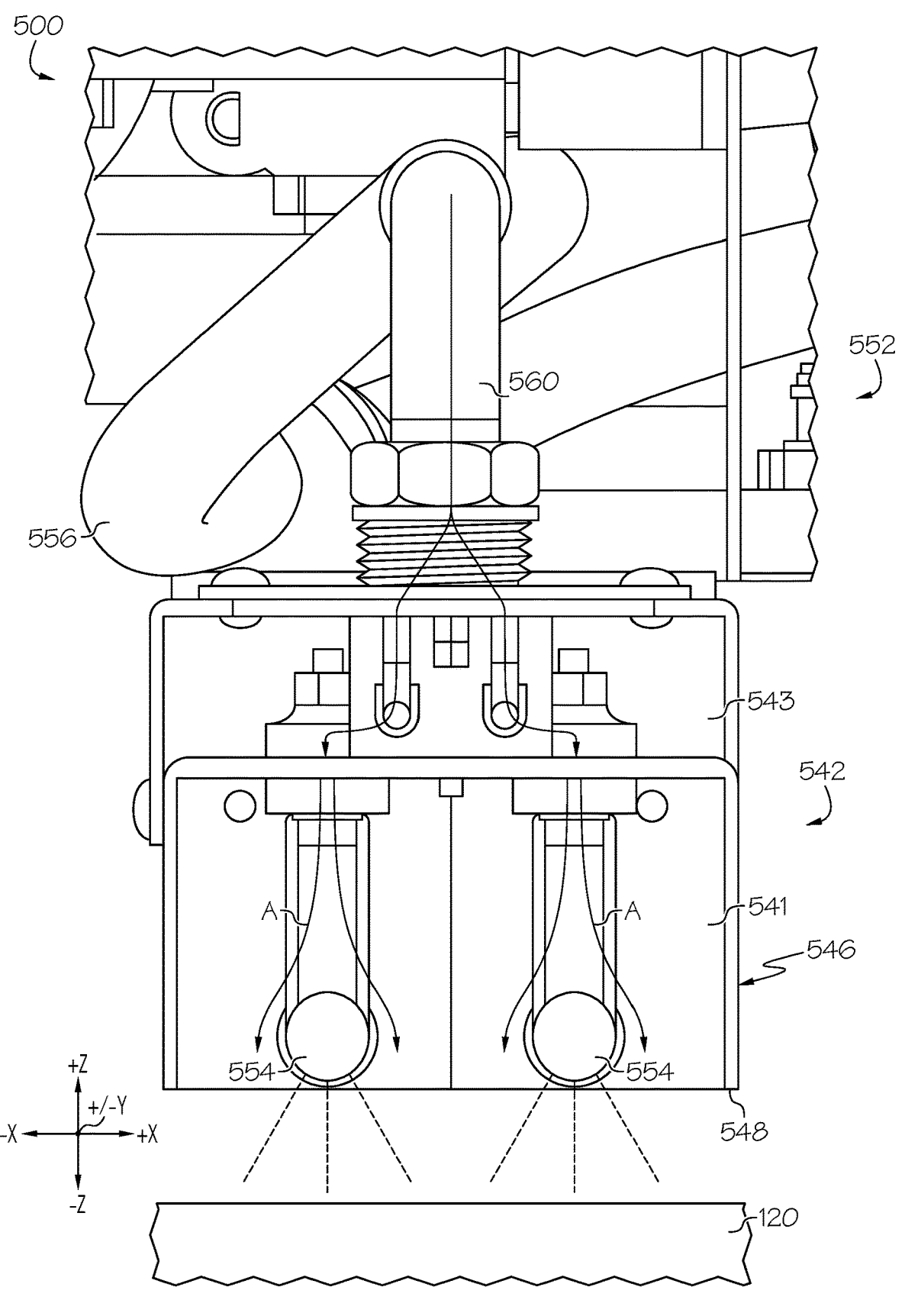
FIG. 29 schematically depicts a partial end view of the heating system according to one or more embodiments shown and described herein.

Referring now to FIGS. 27-29, in embodiments, the printing assembly 500 includes a heating system 542 for pre-heating build material and/or curing binder material in the build area 120 using convective heat transfer and radiation. The heating system 542 may be activated during a first or outward pass over the build area 120 to pre-heat the build material and/or a second or return pass over the build area 120 to cure the binder material. Initially pre-heating the build material in the build area 120 assists in curing the previously deposited build material before a subsequent layer of build material or binder material is provided. More particularly, initially pre-heating the build material allows the printing assembly 500 to perform a second pass and deposit a subsequent layer of binder material sooner, as well as permitting deposit of a subsequent layer of build material soon, thereby improving print speed and print quality. In embodiments, the printing assembly 500 may include a heating system 542 mounted on each side of the housing 501 such that previously deposited build material and/or binder material may be additionally pre-heated and/or cured with each pass of the printing assembly 500 over the build area 120.

The heating system 542 may be mounted to the build side wall 510 of the housing 501 and includes at least one energy source 544. However, it should be appreciated that, in embodiments, the heating system 542 may be mounted to the print home side wall 508 of the housing 501. The energy source 544 is provided proximate a lower end of the housing 501 and extends in the +/−Y axis of the coordinate axes to extend substantially across a width of the build area 120. The energy source 544 may be any suitable energy source that are structurally configured to emit electromagnetic radiation, such as infrared radiation, ultraviolet radiation, or the like below the printing assembly 500 when energized by a power supply. In embodiments, the heating system 542 includes a pair of energy sources 544 arranged parallel to one another and mounted within an enclosure 546 having an open bottom end 548 to expose the energy sources 544 toward the build area 120. Accordingly, one of the energy sources 544 is an outer energy source and the other energy source 544 is an inner energy source positioned closer to the build side wall 510 than the other energy source 544 (i.e., in the −X direction of the coordinate axes depicted in the drawings). It should be appreciated that including a pair of energy sources 544 provides additional energy, e.g., heat, to a larger surface area of the build area 120 as opposed to a single energy source 544. The heating system 542 may include an electrical quick connect 550 for connecting a power supply to the heating system 542 for powering the energy sources 544. In embodiments, the enclosure 546 includes a lower enclosure portion defining an energy source enclosure 541 and an upper enclosure portion defining a duct 543. In embodiments, the energy sources 544 are positioned at least partially within the energy source enclosure 541. The duct 543 is in communication with an air distribution system 552, described herein, that is structurally configured to pass a gas, such as air, an inert gas or gases, or the like to the duct 543.

In embodiments, the heating system 542 includes an air distribution system 552 configured to blow a supply of air across the energy sources 544 and directing heat from the energy sources 544 onto the build area 120. Although referred to herein as "air," it should be appreciated that the air distribution system 552 is configured to blow any suitable gas, such as air, an inert gas or gases, across the energy sources 544. The air distribution system 552 includes an air inlet 554 that directs air into at least one conduit 556. As shown in FIG. 28, the air distribution system 552 includes distribution hose, which splits into a pair of conduits 556, connected to the air inlet 554 at a first end 558 thereof. A second end 560 of each conduit 556 is coupled to the enclosure 546 housing the energy sources 544 for directing air from the air distribution system 552 into the enclosure 546 and around the energy sources 544.

Specifically, the duct 543 is in communication with the energy source enclosure 541, such that air passed from a pump (not shown) to the duct 543 can be passed from the duct 543 to the energy source enclosure 541. As air is passed from the pump to the duct 543, the air may be distributed along a length of the duct 543 (e.g., along the duct along the +/−Y axis) before being passed to the energy source enclosure 541. Air can flow from the duct 543 to the energy source enclosure 541, for example, through one or more apertures or vents (not shown) positioned between the duct 543 and the energy source enclosure 541. As shown, air flows around each of the energy sources 544, as indicated by arrows A, and draws the heat from the energy sources 544 onto the build area 120. In embodiments, the speed and density of the air being distributed by the air distribution system 552 may be adjustable to control the amount and direction of heat from the energy sources 544 delivered onto the build area 120. The air distribution system 552 may be configured to distribute the air across an entire width of the build area 120. It should be appreciated that, while the air distribution system 552 serves to direct the heat from the energy sources 544 toward the build area 120, the air distribution system 552 also facilitates cooling of the energy sources 544 to prevent overheating.

More particularly, as the air passes through the apertures, the air can then flow around the energy sources 544, as shown by arrows A in FIGS. 28 and 29. The air may transfer thermal energy from the energy sources 544 to the build material 40 and/or the binder material 50 positioned below the energy sources 544, for example, through forced convection. In this way, the air distribution system 552, the duct 543, and the energy source enclosure 541 may assist in transferring and/or distributing thermal energy from the energy sources 544 to the build material and/or the binder material 50. For example, the air distribution system 552 may increase the heat density applied to the build material 40 and/or the binder material 50 by the energy sources 544 and/or may increase the area of thermal energy applied by the energy sources 544. By more efficiently transferring thermal energy from the energy sources 544 to the build material 40 and/or binder material 50, the air distribution system 552 may assist in curing the binder material 50 more quickly and without overheating as compared to additive manufacturing systems that do not include an air distribution system 552.

For example, in embodiments in which the energy sources 544 are coupled to the printing assembly 500, the energy sources 544 move over the build material 40 and/or the binder material 50 as the printing assembly 500 moves along the working axis 116. Accordingly, the energy sources 544 generally apply thermal energy to the build material 40 and/or the binder material 50 while moving along the working axis 116. To minimize the amount of time to build an object, it may be desirable to move the printing assembly 500 along the working axis 116 as fast as practicable to adequately move the binder material 50 to the build area 120. However, as the speed of the printing assembly 500 along the working axis 116 increases, the time that the energy sources 544 are positioned over any particular portion of build material 40 and/or binder material 50 decreases. As the amount of time that the energy sources 544 are positioned over any particular portion of build material 40 and/or binder material 50 decreases, the amount of thermal energy transferred from the energy sources 544 to the build material 40 and binder material 50 decreases. Accordingly, while increasing the speed of the printing assembly 500 along the working axis 116 may reduce the amount of time to build an object, the build material 40 and the binder material 50 may not be adequately heated by the energy sources 544.

In particular, in embodiments, the build material 40 and/or the binder material 50 may receive thermal energy via radiation emitted from the energy sources 544. The air passed over the energy sources 544 may supplement the thermal energy applied to the build material 40 and/or the binder material 50 via radiation. In some embodiments, the build material 40 and/or the binder material 50 may be primarily heated via radiation from the energy sources 544, while the air passed over the energy sources 544 supplements the energy transferred via radiation. In some embodiments, the air distribution system 552 may assist in maintaining a stable boundary layer close to the build material 40 and/or the binder material 50, for example, by more evenly distributing thermal energy applied by the energy sources 544 as compared to systems that do not include an air distribution system 552. Furthermore, by passing air over the energy sources 544, heat that would otherwise dissipate and be lost may be utilized to heat the build material 40 and/or the build material 50, thereby increasing the energy efficiency of the energy sources 544.

However, because the air distribution system 552 assists in transferring thermal energy from the energy sources 544, sufficient thermal energy may be applied to the build material 40 and the binder material 50 while the printing assembly 500 is moved along the working axis 116 at high speeds, as compared to conventional additive manufacturing systems that do not include the air distribution system 552.

Further, in some instances, the air distribution system 552 may allow the energy sources 544 to be operated at a reduced power while still providing a similar amount of energy to the build material 40 and the binder material 50 as configurations that do not include the air distribution system 552. By operating the energy sources 544 at reduced power, a usable life of the energy sources 544 may be increased as compared to conventional configurations.

Furthermore, in embodiments, the air distribution system 552 may dissipate heat transferred from the energy sources 544 to the energy source enclosure 541 and/or the duct 543, thereby cooling the energy source enclosure 541 and/or the duct 543. In some embodiments, components such as, for example, sensors including pyrometers, thermocouples, RTDs, or the like, may be positioned proximate to and/or may be coupled to the energy source enclosure 541 and/or the duct 543. These components may provide real-time feedback to the control system 10 to determine process heat requirements and stability of the process of the printing assembly 500. By cooling the energy source enclosure 541 and/or the duct 543, the air distribution system 552 may reduce the likelihood of overheating and damaging components (e.g., sensors and the like) of the printing assembly 500 coupled to or positioned proximate to the energy source enclosure 541 and/or the duct 543. In embodiments in which the duct 543 and/or the energy source enclosure 541 define the vents formed therebetween, air may additionally be passed through the vents, which may also assist in cooling components (e.g., sensors and the like) of the printing assembly 500 coupled to or positioned proximate to the energy source enclosure 541 and/or the duct 543.

Due to the air distribution system 552 distributing air across the energy sources 544 to direct heat toward the build area 120, this allows for faster operating speeds of the printing assembly 500. Specifically, wait times between the printing assembly 500 making individual passes over the build area 120 to deliver additional material onto the build area 120 may be reduced due to the binder material being cured by the heating system 542. It should be noted that this technique of flowing a gas over the energy sources 544 can extend the life of the energy sources 544. Further, the gas flowing over the energy sources 544 utilizes what would be wasted heat energy thermally conducting through the housing 501. Additional information on heating systems in manufacturing apparatuses can be found in U.S. application Ser. No. 18/032,259, filed on Oct. 18, 2021, and entitled "Printing Assemblies And Methods For Using The Same," the entirety of which is hereby incorporated by reference.

Printing Head Interface Board

As shown in FIG. 27, an interior of the printing assembly 500 is shown illustrating the printing head 154 and the manifold assembly 160 located within the housing 501 of the printing assembly 500. As described herein with respect to the printing assembly 150 includes the plurality of print heads 156. Each print head 156 includes a print head interface board 284 provided on a top surface 286 of each print head 156 such as, for example, circuit boards, sensors, and the like. The print head interface boards 284 are electronic assemblies and utilized to communicate between the control system 10 and the print heads 156.

Referring still to FIG. 27, in embodiments, the printing head 154 includes one or more printing head interface boards 529 communicatively coupled to various components of the printing assembly 500 such as, for example, the print heads 156 via the print head interface boards 284. Accordingly, the printing head interface board 529 is also communicatively coupled to a power supply (not shown) and the control system 10 (FIG. 1), discussed herein, to receive instruction for operating the various components of the printing assembly 500. By providing the printing head interface board 529 communicatively coupled to the various components of the printing assembly 500, access may be easily provided to the internal components of the printing assembly 500 by pivoting the printing heat interface board 529 away from the print heads 156. As described herein, the printing head interface board 529 may be temporarily positioned to provide access to the interior of the printing head 154 without having to remove the printing head interface board 529 and disconnecting the internal components thereof. Although not shown, a plurality of printing head interface boards 529 may be provided within the housing and each electrically coupled to one or more of the print head interface boards 284. For example, each printing head interface board 529 may be electrically coupled to a pair of print head interface boards 284.

As shown, the printing head interface board 529 is positioned proximate the print home side wall 508 of the housing 501. By providing the printing head interface board 529 within the housing 501, the length of the cables extending between the printing head interface board 529 and the other components within the printing head 154 may be reduced and managed more efficiently during operation of the printing assembly 500. In embodiments, the printing head interface board 529 is mounted to a frame 531 pivotally attached to the printing head 154. Specifically, the frame 531 may be pivotally attached to a bracket 533 mounted to the printing head 154 proximate the top end 504 of the housing 501. Thus, the frame 531 may be pivoted away from the printing head 154 to provide access to an interior of the printing head 154, such as the print heads 156 and the manifold assembly 160, when the print home side wall 508 is removed from the housing 501. It should be appreciated that, since the printing head interface board 529 is pivotally attached to the printing head 154, via the frame 531 and the bracket 533, the printing head interface board 529 indexes with the printing head 154 within the housing 501 in embodiments in which the printing head 154 indexes.

Although the printing head interface board 529 is shown positioned at the print home side wall 508 of the housing 501, in embodiments, the printing head interface board 529 may be positioned on the build side wall 510 of the housing 501. In this embodiment, the frame 531 may be pivotally attached to the printing head 154 so that the print heads 156 and the manifold assembly 160 are accessible when the build side wall 510 of the housing 501 is removed.

Print Head Covers

If external material, such as binder material, build material, debris, or the like, enters the printing head 154, as discussed herein, the external material may contaminate the print head interface boards 284 and render a print head 156 defective or inoperable. Damage to the print head interface boards 284 may also be experienced during service of and potential fluid leaks within the printing head 154. Thus, as shown, a cover 310 may be provided to shield the print head interface boards 284 from being contaminated by external material particulates or fluid leaks, or otherwise damaged due to improperly handled or static protected personnel servicing the printing assembly 500. The cover 310 may be any suitable structure for at least partially concealing a portion of the top surface 286 of the print head 156. In embodiments, the cover 310 may include an access port for a cable to connect to or extend from the print head interface boards 284. In embodiments, the cover 310 may be removably attached to the top surface 286 of the print head 156 by any suitable mechanism, such as a threaded fastener, mating components, or the like.

By providing the printing assembly 500 including the above-described modular design, the printing assembly 500 may include all of the components described herein on the printing assembly 500 itself, and allow for the printing assembly 500 to be removed from the rest of a manufacturing apparatus to facilitate repair or replacement of the printing assembly 500 without interfering the rest of the manufacturing apparatus. It should be noted that the printing assembly 500 may be replaced by another printing assembly 500 in a reduced amount of time, for example, 15 minutes, and may be removed for service and reinstalled quickly due to the modularity and use of quick connections, as discussed herein.

From the above, it is to be appreciated that defined herein are additive manufacturing apparatuses, printing assemblies, and methods of using same which provide improved print speed, quality, and reliability by providing printing assemblies including various components to control binder material delivered to the print heads of the printing assemblies, a position of the print heads, prevent contamination, and the like. As described herein, the various features of the printing heads discussed herein improve upon at least the print quality, maintenance/accessibility, speed, and reliability of the printing heads. By allowing for positioning of the printing head relative to the manufacturing apparatus by including the yaw bar and/or the adjustment blocks, the print heads may be more accurately positioned for the intended object being printed to improve at least print quality. Moreover, the deflector plate and the heating assembly may be utilized in a printing assembly to improve speed and print quality by reducing print defects to the build area during operation. Further, as disclosed herein, modular printing assemblies including the printing head receptacle are provided to facilitate access to the printing head or removal of the printing head, thereby improving maintenance and accessibility of the printing assembly. It should be appreciated that the above examples are merely provided for illustrative purposes only and any combination of the features discussed herein may be utilized in one or more printing assemblies to achieve the improvements to the printing assembly discussed herein.

Further aspects of the invention are provided by the subject matter of the following clauses:

1. A printing assembly translatable along a working axis, the printing assembly comprising: a housing; a printing head provided within the housing, the printing head comprising a plurality of print heads; a base plate positioned proximate a bottom end of the housing, the base plate having a plurality of openings, each of the plurality of print heads provided within a corresponding one of the plurality of openings; and at least one adjustment block fixed to the base plate adjacent a corresponding one of the plurality of openings, the at least one adjustment block configured to adjust a position of a corresponding one of the plurality of print heads.

2. The printing assembly according to any preceding clause, further comprising: a support bracket coupled to the housing; and a yaw bar including at least one adjustment member extendable toward and retractable away from the support bracket to rotate the housing about a central axis extending through the housing normal to the working axis.

3. The printing assembly of any preceding clause, further comprising a central pivot extending through the support bracket and a linear traversing stage along the central axis, wherein the support bracket is pivotally fixed to the linear traversing stage, the yaw bar is fixed to the linear traversing stage.

4. The printing assembly of any preceding clause, wherein the housing is rotatable relative to the yaw bar +/−3 degrees.

5. The printing assembly of any preceding clause, further comprising a manifold assembly provided within the housing, the manifold assembly configured to provide binder material to the plurality of print heads and receive binder material from the plurality of print heads.

6. The printing assembly of any preceding clause, further comprising a holding bracket configured to secure the manifold assembly within the housing.

7. The printing assembly of any preceding clause, further comprising: a plurality of print head interface boards within the housing, each of the plurality of print head interface boards coupled to a corresponding one of the plurality of print heads; and at least one printing head interface board provided within the housing and electrically coupled to at least one of the plurality of print head interface boards.

8. The printing assembly of any preceding clause, wherein the printing head is translatable relative to the housing in a direction transverse to the working axis.

9. The printing assembly of any preceding clause, further comprising an imaging device provided on the printing assembly and directed toward a build surface extending below the printing assembly, the imaging device configured to scan across the build surface as the printing head moves along the working axis to identify an irregularity on the build surface.

10. A printing assembly translatable along a working axis, the printing assembly comprising: a housing; a printing head provided within the housing, the printing head comprising a plurality of print heads; and a heating system mounted to a build side wall of the housing, the heating system comprising at least one energy source for directing heat below the printing assembly.

11. The printing assembly of any preceding clause, wherein the heating system further comprises a pair of energy sources extending parallel to one another along the build side wall of the housing.

12. The printing assembly of any preceding clause, further comprising an air distribution system for delivering air across the at least one energy source, the at least one energy source provided within an enclosure, the air distribution system providing air through the enclosure.

13. The printing assembly of any preceding clause, wherein the air distribution system is configured to cool the energy sources.

14. The printing assembly of any preceding clause, further comprising: a printing head receptacle coupling the housing to a linear traversing stage and enabling motion of the housing relative to the printing head receptacle in a direction transverse to the working axis.

15. The printing assembly of any preceding clause, further comprising at least one hydraulic damper configured to absorb shock during loading of the housing onto the printing head receptacle.

16. The printing assembly of any preceding clause, further comprising a manifold assembly provided within the housing, the manifold assembly configured to provide binder material to the plurality of print heads and receive binder material from the plurality of print heads.

17. The printing assembly of any preceding clause, further comprising a holding bracket configured to secure the manifold assembly within the housing and prevent separation of an inlet manifold and an outlet manifold of the manifold assembly.

18. The printing assembly of any preceding clause, further comprising: a plurality of print head interface boards within the housing, each of the plurality of print head interface boards coupled to a corresponding one of the plurality of print heads; and at least one printing head interface board provided within the housing and electrically coupled to at least one of the plurality of print head interface boards, the at least one printing head interface board being pivotally attached to the printing head to permit access to the plurality of print heads.

19. The printing assembly of any preceding clause, further comprising an imaging device provided on the printing assembly and directed toward a build surface extending below the printing assembly, the imaging device configured to scan across the build surface as the printing head moves along the working axis to identify an irregularity on the build surface.

20. A printing assembly translatable along a working axis, the printing assembly comprising: a housing comprising an aperture formed at a bottom end thereof; a base plate positioned at the bottom end of the housing within the aperture, the base plate including a plurality of openings; a plurality of print heads positioned within the housing, wherein a printing face of each of the plurality of print heads is exposed via a corresponding one of the plurality of openings in the base plate; and a pair of flexible bellows extending between the base plate to which the plurality of print heads is mounted and the housing, the pair of flexible bellows deforming to account for movement of the base plate within the housing as the base plate moves in a direction transverse to the working axis.

21. The printing assembly of any preceding clause, wherein each of the pair of flexible bellows extends between one of a pair of end walls of the housing and an adjacent end of the base plate.

22. The printing assembly of any preceding clause, further comprising a gasket positioned about one of the plurality of openings of the base plate and compressed between the base plate and the print head received by the aperture about which the gasket is positioned.

23. The printing assembly of any preceding clause, further comprising a powder plow configured to prevent binder material from contacting the plurality of print heads, the powder plow provided proximate a side wall of the base plate, the powder plow movable between a lowered position in which a bottom edge of the powder plow extends below the base plate, and a raised position in which the bottom edge of the powder plow is above the bottom end of the base plate.

24. The printing assembly of any preceding clause, wherein the powder plow comprises a coating at least partially covering the powder plow, the coating having a coefficient of friction equal to or less than 0.2.

25. The printing assembly of any preceding clause, further comprising: a plow guide along which the powder plow moves between the lowered position and the raised position; and a hard stop coupled to the plow guide to limit vertical movement of the powder plow.

26. The printing assembly of any preceding clause, wherein the printing assembly comprises a sensor for detecting a position of the powder plow with respect to the bottom end of the housing.

27. The printing assembly of any preceding clause, further comprising: at least one electronic component provided on a top surface of each of the plurality of print heads; and a plurality of covers, each of the plurality of covers covering the at least one electronic component of a corresponding one of the plurality of print heads.

28. The printing assembly of any preceding clause, further comprising a deflector plate removably coupled to the base plate and extending in a direction opposite the base plate, a dimension of the deflector plate in a transverse direction perpendicular to the working axis is greater than a dimension of the base plate in the transverse direction.

29. The printing assembly of any preceding clause, wherein a bottom surface of the deflector plate lies in a plane with a bottom surface of the base plate.

30. The printing assembly of any preceding clause, wherein the bottom surface of the deflector plate has a surface roughness of equal to or less than 125 Ra (Roughness average).

31. The printing assembly of any preceding clause, further comprising a seal extending along an interface between the deflector plate and the base plate.

32. The printing assembly of any preceding clause, wherein the bottom surface of the deflector plate comprises has a coating at least partially covering the deflector plate, the coating having a coefficient of friction equal to or less than 0.2.

33. The printing assembly of any preceding clause, wherein the coating is formed from polytetrafluoroethylene.

34. The printing assembly of any preceding clause, further comprising a calibration guide removably coupled to the base plate of the printing head, the calibration guide comprising a first section at a first vertical position and a second section at a second vertical position, wherein the first section extends between the base plate and the second section when the printing assembly is mounted along the working axis, a step formed between the first section and the second section having a forward facing surface and a downward facing surface extending parallel to the first section.

35. The printing assembly of any preceding clause, wherein the calibration guide is removably mounted to the base plate of the printing head.

36. A printing assembly translatable along a working axis, the printing assembly comprising: a housing comprising an aperture formed at a bottom end thereof; a base plate positioned at the bottom end of the housing within the aperture, the base plate including a plurality of openings; a plurality of print heads positioned within the housing, wherein a printing face of each of the plurality of print heads is exposed via a corresponding one of the plurality of openings in the base plate; and a powder plow provided proximate a side wall of the housing, the powder plow movable between a lowered position in which a bottom edge of the powder plow extends below the bottom end of the housing, and a raised position in which the bottom edge of the powder plow is above the bottom end of the housing.

37. The printing assembly of any preceding clause, wherein each of the plurality of print heads are rigidly mounted to the base plate.

38. The printing assembly of any preceding clause, wherein the powder plow comprises a coating at least partially covering the powder plow, the coating having a coefficient of friction equal to or less than 0.2.

39. The printing assembly of any preceding clause, further comprising: a plow guide along which the powder plow moves between the lowered position and the raised position; and a hard stop coupled to the plow guide to limit vertical movement of the powder plow.

40. The printing assembly of any preceding clause, wherein the printing assembly comprises a sensor for detecting a position of the powder plow with respect to the bottom end of the housing.

41. The printing assembly of any preceding clause, further comprising: at least one electronic component provided on a top surface of each of the plurality of print heads; and a plurality of covers, each of the plurality of covers covering the at least one electronic component of a corresponding one of the plurality of print heads.

42. The printing assembly of any preceding clause, further comprising a deflector plate removably coupled to the base plate and extending in a direction opposite the base plate, a dimension of the deflector plate in a transverse direction perpendicular to the working axis is greater than a dimension of the base plate in the transverse direction.

43. The printing assembly of any preceding clause, wherein a bottom surface of the deflector plate lies in a plane with a bottom surface of the base plate.

44. The printing assembly of any preceding clause, wherein the bottom surface of the deflector plate has a surface roughness of equal to or less than 125 Ra (Roughness average).

45. The printing assembly of any preceding clause, further comprising a seal extending along an interface between the deflector plate and the base plate.

46. The printing assembly of any preceding clause, wherein the bottom surface of the deflector plate comprises has a coating at least partially covering the deflector plate, the coating having a coefficient of friction equal to or less than 0.2.

47. The printing assembly of any preceding clause, wherein the coating is formed from polytetrafluoroethylene.

48. The printing assembly of any preceding clause, further comprising a calibration guide removably coupled to the base plate, the calibration guide comprising a first section at a first vertical position and a second section at a second vertical position, wherein the first section extends between the base plate and the second section when the printing assembly is mounted along the working axis, a step formed between the first section and the second section having a forward facing surface and a downward facing surface extending parallel to the first section.

49. The printing assembly of any preceding clause, wherein the calibration guide is removably mounted to the base plate of the printing head.

50. A printing assembly for use in an additive manufacturing apparatus, the printing assembly comprising: a housing; a printing head comprising a plurality of print heads, the printing head provided within the housing; and at least one utility port provided through the housing and accessible from an exterior thereof.

51. The printing assembly of any preceding clause, further comprising at least one printing head interface board within the housing.

52. The printing assembly of any preceding clause, wherein the at least one printing head interface board is hingedly attached within the housing.

53. The printing assembly of any preceding clause, wherein the at least one utility port comprises at least one electrical quick connect arrangement coupled to the at least one printing head interface board.

54. The printing assembly of any preceding clause, further comprising a manifold assembly provided within the housing, the manifold assembly configured to provide binder material to the plurality of print heads and receive binder material from the plurality of print heads.

55. The printing assembly of any preceding clause, wherein the at least one utility port comprises at least one pneumatic quick connect arrangement coupled to the manifold assembly.

56. The printing assembly of any preceding clause, wherein the at least one utility port comprises a binder supply quick connect fitting and a binder return quick connect fitting provided on the housing for coupling a reservoir to the manifold assembly.

57. The printing assembly of any preceding clause, further comprising: a track positioned along an inside surface of the housing; and at least one track roller slidable along the track, the at least one track roller coupled to a base plate to which the plurality of print heads are mounted to enable movement of the base plate within the housing.

58. The printing assembly of any preceding clause, further comprising at least one lifting handle provided on the housing proximate a top end of the housing.

59. An additive manufacturing apparatus comprising: a rail extending along a working axis; a linear traversing stage coupled to and moveable along the rail; and the printing assembly of any preceding clause coupled to the linear traversing stage and translatable along the working axis.

60. The additive manufacturing apparatus of any preceding clause, further comprising a printing head receptacle fixed to the linear traversing stage, wherein the housing is removably coupled to the printing head receptacle, the housing translatable relative to the printing head receptacle in a direction transverse to the working axis.

61. The additive manufacturing apparatus of any preceding clause, wherein one of the printing head receptacle and the printing assembly comprises at least one locking member and the other of the printing head receptacle and the printing assembly comprises an engaging member, the locking member configured to engage the engaging member to removably lock the printing assembly to the printing head receptacle.

62. The additive manufacturing apparatus of any preceding clause, wherein the printing head receptacle comprises a plurality of roller bearings for receiving the printing assembly.

63. A method utilizing a printing assembly of an additive manufacturing apparatus, the method comprising: providing a linear traversing stage movable in a direction transverse to a rail extending along a working axis of the additive manufacturing apparatus; coupling a printing assembly to the linear traversing stage such that the printing assembly is movable along the linear traversing stage in a direction transverse to the working axis, the printing assembly comprising a housing including a printing head; and coupling at least one utility of the additive manufacturing apparatus to the printing assembly via a utility port through the housing.

64. The method of any preceding clause, wherein the printing assembly is cantilevered from the rail in a direction orthogonal to the working axis.

65. The method of any preceding clause, wherein the housing of the printing assembly is coupled to the linear traversing stage through a printing head receptacle.

66. The method of any preceding clause, further comprising: extending or retracting at least one adjustment member extending through a yaw bar to rotate the housing relative to a printing head receptacle, the yaw bar provided between the housing and the printing head receptacle.

67. The method of any preceding clause, further comprising: providing an adjustment block within a corresponding one of a plurality of openings formed in a base plate of the printing head; positioning a print head within each one of the plurality of openings; and adjusting an adjustment member of the adjustment block to engage a corresponding one of the plurality of print heads and translate the corresponding print head within a corresponding opening.

68. The method of any preceding clause, further comprising: attaching a calibration guide to the base plate of the printing head, the calibration guide comprising a first section at a first vertical position and a second section at a second vertical position, wherein the first vertical position is above the second vertical position and the first section extends between the housing and the second section when the printing assembly is mounted along the working axis; and adjusting a vertical position of a wiper blade of the additive manufacturing apparatus between the first section and the second section.

69. The method of any preceding clause, further comprising: generating heat from at least one energy source extending along a side wall of the printing assembly; and blowing air across the at least one energy source to heat the air and direct the heated air below the printing assembly.

70. The method of any preceding clause, further comprising: actuating a powder plow provided proximate a side wall of the base plate of the printing assembly between a lowered position in which a bottom edge of the powder plow extends below a bottom end of the base plate, and a raised position in which the bottom edge of the powder plow is above the bottom end of the base plate.

71. A method utilizing a printing assembly of an additive manufacturing apparatus, the method comprising: providing a linear traversing stage movable in a direction transverse to a rail extending along a working axis of the additive manufacturing apparatus; coupling a printing assembly to the linear traversing stage such that the printing assembly is movable along the linear traversing stage in a direction transverse to the working axis, the printing assembly comprising a housing including a printing head; and extending or retracting at least one adjustment member extending through a yaw bar to rotate the housing relative to a printing head receptacle coupling the printing assembly to the rail, the yaw bar provided between the housing and the printing head receptacle.

72. A method utilizing a printing assembly of an additive manufacturing apparatus, the method comprising: providing a linear traversing stage movable in a direction transverse to a rail extending along a working axis of the additive manufacturing apparatus; coupling a printing assembly to the linear traversing stage such that the printing assembly is movable along the linear traversing stage in a direction transverse to the working axis, the printing assembly comprising a housing including a printing head; attaching a calibration guide to a base plate of the printing head, the calibration guide comprising a first section at a first vertical position and a second section at a second vertical position, wherein the first vertical position is above the second vertical position and the first section extends between the housing and the second section when the printing assembly is mounted along the working axis; and adjusting a vertical position of a wiper blade of the additive manufacturing apparatus between the first section and the second section.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed:

1. A printing assembly translatable along a working axis, the printing assembly comprising:
   a housing;
   a printing head provided within the housing, the printing head comprising a plurality of print heads;
   a base plate positioned proximate a bottom end of the housing, the base plate having a plurality of openings, each of the plurality of print heads provided within a corresponding one of the plurality of openings; and
   at least one adjustment block fixed to the base plate adjacent a corresponding one of the plurality of openings, the at least one adjustment block including a fixed portion and a movable portion joined to the fixed portion by a hinge, the hinge permitting the movable portion to move relative to the fixed portion between an unflexed position to a flexed position to adjust a position of a corresponding one of the plurality of print heads.

2. The printing assembly according to claim 1, further comprising:
   a support bracket coupled to the housing; and
   a yaw bar including at least one adjustment member extendable toward and retractable away from the support bracket to rotate the housing about a central axis extending through the housing normal to the working axis.

3. The printing assembly of claim 2, further comprising a central pivot extending through the support bracket and a linear traversing stage along the central axis, wherein the support bracket is pivotally fixed to the linear traversing stage, the yaw bar is fixed to the linear traversing stage.

4. The printing assembly of claim 1, further comprising:
   a plurality of print head interface boards within the housing, each of the plurality of print head interface boards coupled to a corresponding one of the plurality of print heads; and
   at least one printing head interface board provided within the housing and electrically coupled to at least one of the plurality of print head interface boards.

5. The printing assembly of claim 1, wherein the printing head is translatable relative to the housing in a direction transverse to the working axis.

* * * * *